US012677218B2

(12) United States Patent
Ajaykumar et al.

(10) Patent No.: US 12,677,218 B2
(45) Date of Patent: Jul. 7, 2026

(54) DUAL TARGET WAKE TIME (TWT) WINDOWS FOR SPLIT EXTENDED REALITY (XR)

(71) Applicant: QUALCOMM Incorporated, San Diego, CA (US)

(72) Inventors: Sriram Ajaykumar, Bangalore (IN); Chirag Maheshkumar Pujara, Bangalore (IN); Vinay Melkote Krishnaprasad, Bangalore (IN)

(73) Assignee: QUALCOMM Incorporated, San Diego, CA (US)

( * ) Notice: Subject to any disclaimer, the term of this patent is extended or adjusted under 35 U.S.C. 154(b) by 370 days.

(21) Appl. No.: 18/433,321

(22) Filed: Feb. 5, 2024

(65) Prior Publication Data

US 2025/0254616 A1     Aug. 7, 2025

(51) Int. Cl.
*H04W 52/02* (2009.01)
*H04L 43/0888* (2022.01)

(52) U.S. Cl.
CPC ..... *H04W 52/0216* (2013.01); *H04L 43/0888* (2013.01); *H04W 52/0274* (2013.01)

(58) Field of Classification Search
CPC .......... H04W 52/0216; H04W 52/0274; H04L 43/0888; H04L 67/131
See application file for complete search history.

(56) References Cited

U.S. PATENT DOCUMENTS 11,523,306 B1 * 12/2022 Chu ...................... H04W 28/18
2022/0201606 A1    6/2022 Shafin et al.

| 2022/0217630 A1 * | 7/2022 | Chen ................. H04W 52/0216 |
| 2022/0264463 A1 | 8/2022 | Li et al. |
| 2022/0279602 A1 | 9/2022 | Xue et al. |
| 2023/0020265 A1 * | 1/2023 | Min ..................... H04L 45/851 |
| 2023/0108115 A1 | 4/2023 | Vrcelj et al. |

(Continued)

FOREIGN PATENT DOCUMENTS

| EP | 4178301 A1 | 5/2023 |
| WO | 2022131839 A1 | 6/2022 |
| WO | 2023121902 A1 | 6/2023 |

OTHER PUBLICATIONS

International Search Report and Written Opinion—PCT/US2025/010431—ISA/EPO—Apr. 14, 2025.

*Primary Examiner* — John Pezzlo
*Assistant Examiner* — Yewon Kim
(74) *Attorney, Agent, or Firm* — Procopio, Cory, Hargreaves & Savitch LLP

(57) ABSTRACT

Aspects presented herein relate to methods and devices for display processing including an apparatus, e.g., client or server. The apparatus may obtain a first indication of at least one of a set of rendering latencies, a set of encoding latencies, or a set of network latencies for a split XR process with a server. The apparatus may also calculate a first offset between a first rendering start time and a first TWT start time for a first TWT configuration and second offsets between second rendering start times and second TWT start times for a second TWT configuration, wherein the first TWT configuration includes one TWT window and the second TWT configuration includes two TWT windows. The apparatus may also select the first TWT configuration or the second TWT configuration for the split XR process with the client device.

30 Claims, 21 Drawing Sheets

(56)                    References Cited

U.S. PATENT DOCUMENTS

| | | | |
|---|---|---|---|
| 2023/0110088 A1* | 4/2023 | Ghosh | H04L 67/535 |
| | | | 709/232 |
| 2023/0309017 A1 | 9/2023 | Li et al. | |
| 2023/0379979 A1 | 11/2023 | Xue et al. | |
| 2024/0334326 A1* | 10/2024 | Li | H04W 52/0206 |
| 2025/0106760 A1* | 3/2025 | Ritesh | H04W 52/0216 |

* cited by examiner

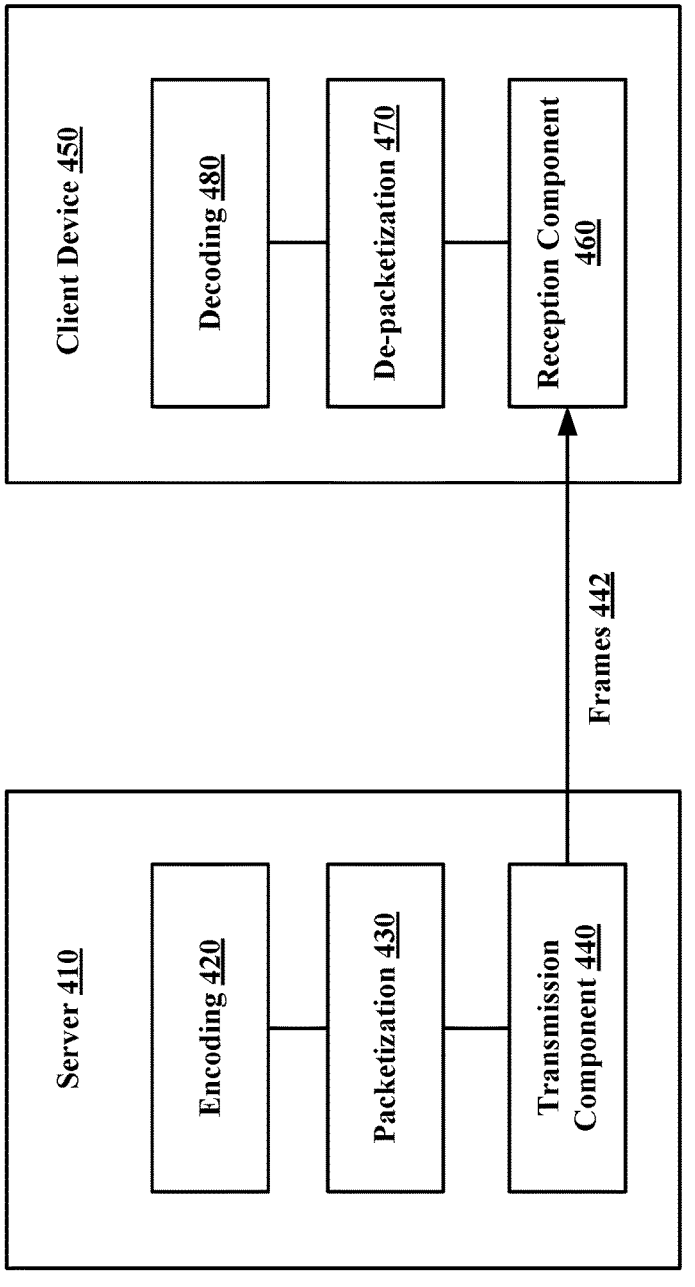
FIG. 4

Poses 510

Render 520

Encode 530

DL 540

Decode 550

Vsync 560

500

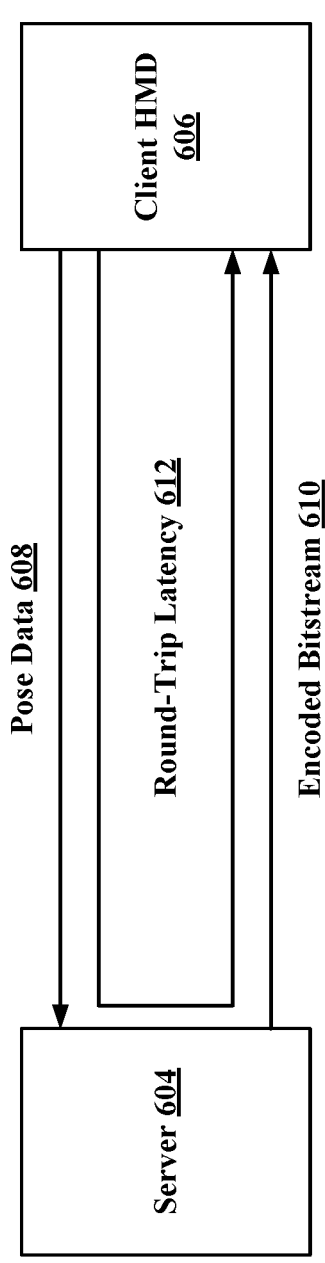
FIG. 6

FIG. 10

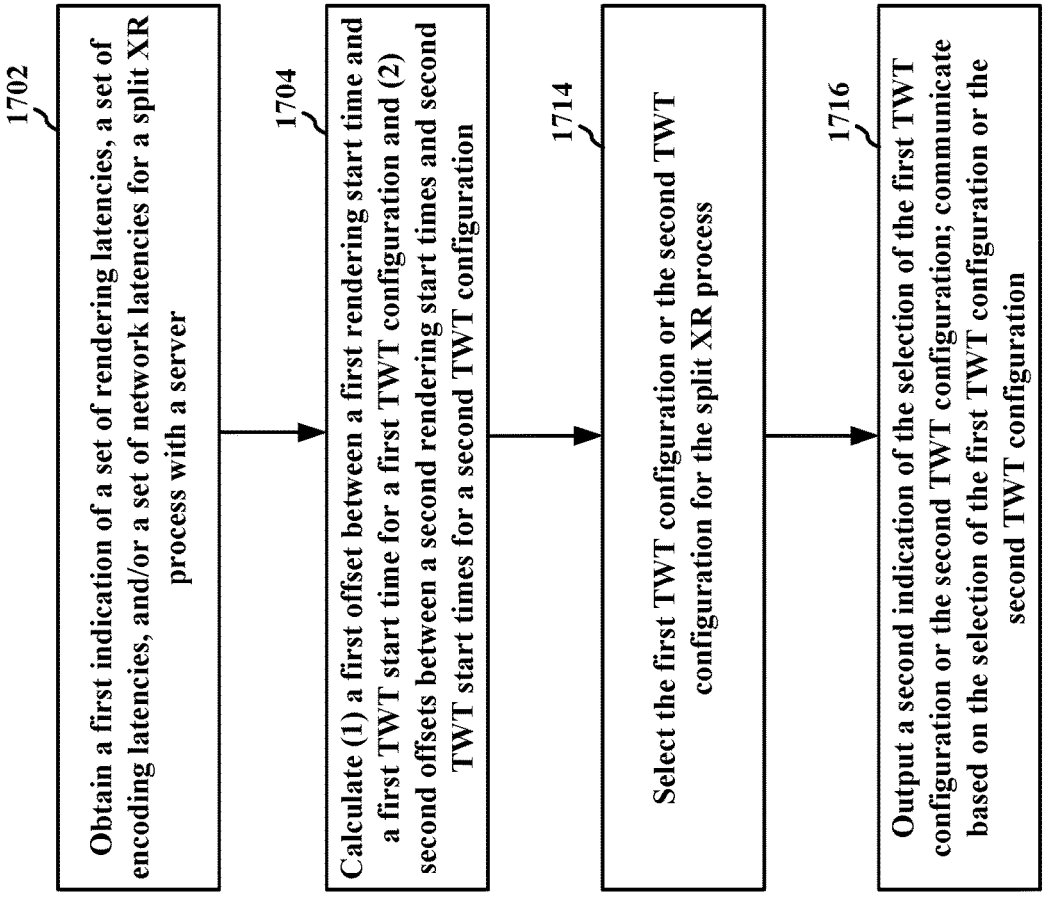

1702

Obtain a first indication of a set of rendering latencies, a set of encoding latencies, and/or a set of network latencies for a split XR process with a server

1704

Calculate (1) a first offset between a first rendering start time and a first TWT start time for a first TWT configuration and (2) second offsets between a second rendering start times and second TWT start times for a second TWT configuration

1714

Select the first TWT configuration or the second TWT configuration for the split XR process

1716

Output a second indication of the selection of the first TWT configuration or the second TWT configuration; communicate based on the selection of the first TWT configuration or the second TWT configuration

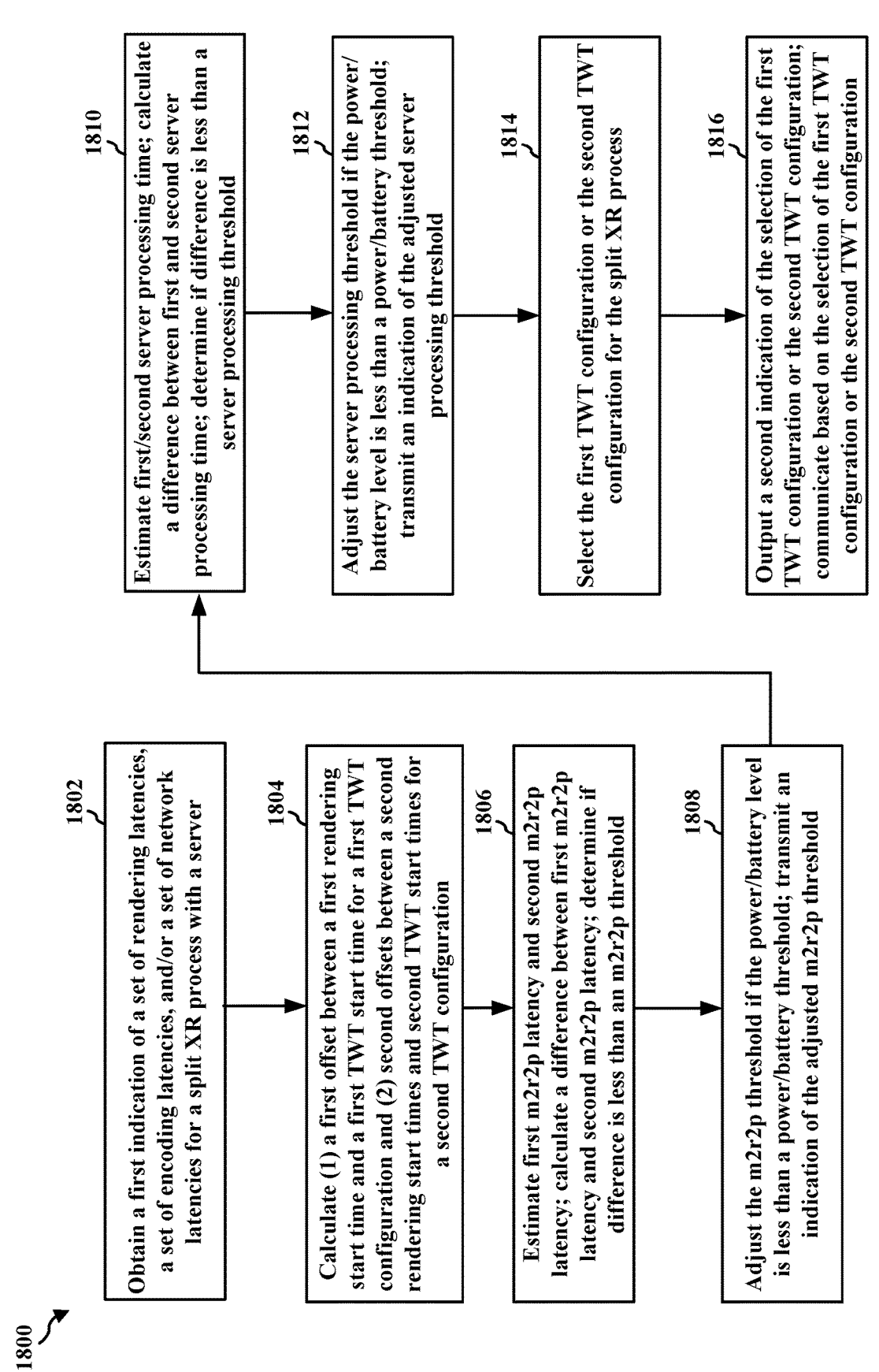

1800

1802

Obtain a first indication of a set of rendering latencies, a set of encoding latencies, and/or a set of network latencies for a split XR process with a server

1804

Calculate (1) a first offset between a first rendering start time and a first TWT start time for a first TWT configuration and (2) second offsets between a second rendering start times and second TWT start times for a second TWT configuration

1806

Estimate first m2r2p latency and second m2r2p latency; calculate a difference between first m2r2p latency and second m2r2p latency; determine if difference is less than an m2r2p threshold

1808

Adjust the m2r2p threshold if the power/battery level is less than a power/battery threshold; transmit an indication of the adjusted m2r2p threshold

1810

Estimate first/second server processing time; calculate a difference between first and second server processing time; determine if difference is less than a server processing threshold

1812

Adjust the server processing threshold if the power/battery level is less than a power/battery threshold; transmit an indication of the adjusted server processing threshold

1814

Select the first TWT configuration or the second TWT configuration for the split XR process

1816

Output a second indication of the selection of the first TWT configuration or the second TWT configuration; communicate based on the selection of the first TWT configuration or the second TWT configuration

FIG. 18

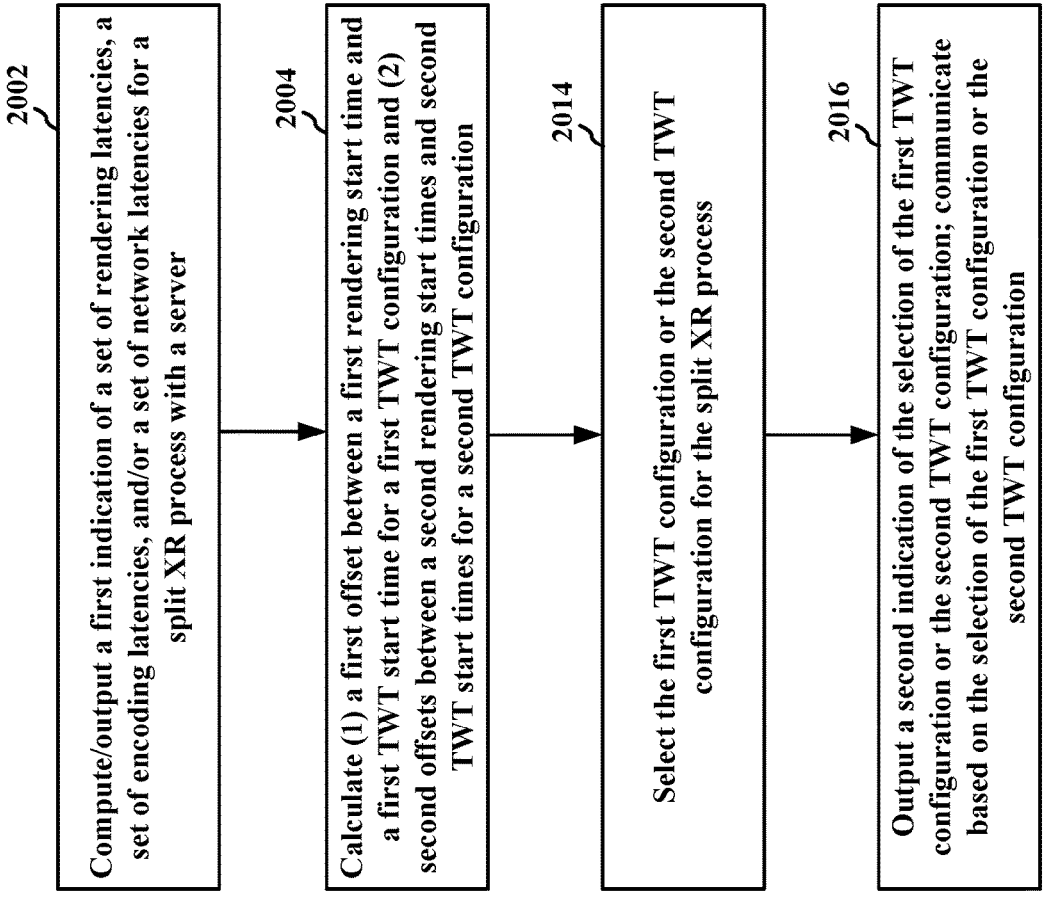

2002

Compute/output a first indication of a set of rendering latencies, a set of encoding latencies, and/or a set of network latencies for a split XR process with a server

2004

Calculate (1) a first offset between a first rendering start time and a first TWT start time for a first TWT configuration and (2) second offsets between a second rendering start times and second TWT start times for a second TWT configuration

2014

Select the first TWT configuration or the second TWT configuration for the split XR process

2016

Output a second indication of the selection of the first TWT configuration or the second TWT configuration; communicate based on the selection of the first TWT configuration or the second TWT configuration

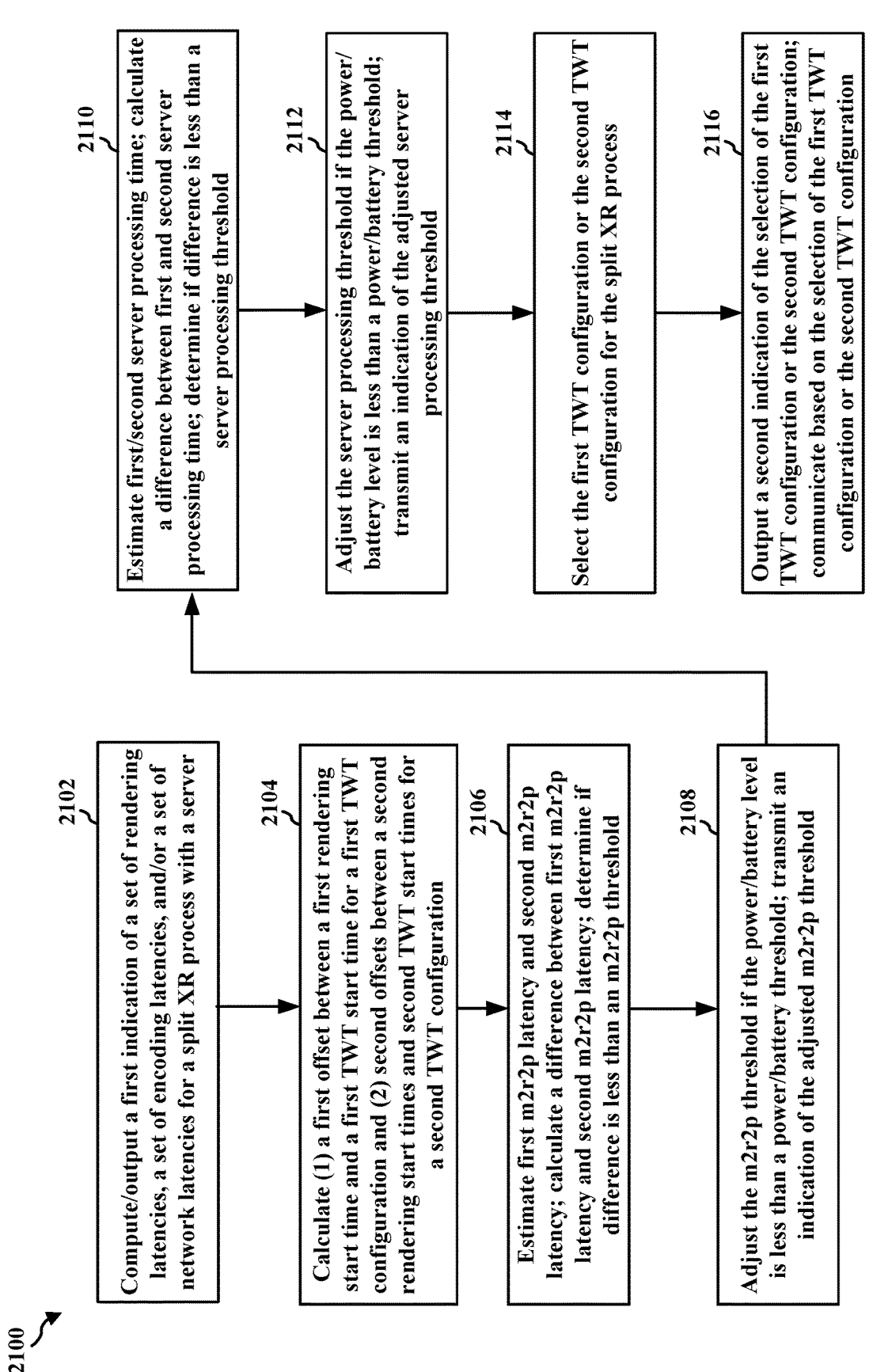

2102 — Compute/output a first indication of a set of rendering latencies, a set of encoding latencies, and/or a set of network latencies for a split XR process with a server 2104 — Calculate (1) a first offset between a first rendering start time and a first TWT start time for a first TWT configuration and (2) second offsets between a second rendering start times and second TWT start times for a second TWT configuration 2106 — Estimate first m2r2p latency and second m2r2p latency; calculate a difference between first m2r2p latency and second m2r2p latency; determine if difference is less than an m2r2p threshold 2108 — Adjust the m2r2p threshold if the power/battery level is less than a power/battery threshold; transmit an indication of the adjusted m2r2p threshold 2110 — Estimate first/second server processing time; calculate a difference between first and second server processing time; determine if difference is less than a server processing threshold 2112 — Adjust the server processing threshold if the power/battery level is less than a power/battery threshold; transmit an indication of the adjusted server processing threshold 2114 — Select the first TWT configuration or the second TWT configuration for the split XR process 2116 — Output a second indication of the selection of the first TWT configuration or the second TWT configuration; communicate based on the selection of the first TWT configuration or the second TWT configuration

DUAL TARGET WAKE TIME (TWT) WINDOWS FOR SPLIT EXTENDED REALITY (XR)

TECHNICAL FIELD

The present disclosure relates generally to processing systems and, more particularly, to one or more techniques for split extended reality (XR) applications.

INTRODUCTION

Computing devices often perform graphics and/or display processing (e.g., utilizing a graphics processing unit (GPU), a central processing unit (CPU), a display processor, etc.) to render and display visual content. Such computing devices may include, for example, computer workstations, mobile phones such as smartphones, embedded systems, personal computers, tablet computers, and video game consoles. GPUs are configured to execute a graphics processing pipeline that includes one or more processing stages, which operate together to execute graphics processing commands and output a frame. A central processing unit (CPU) may control the operation of the GPU by issuing one or more graphics processing commands to the GPU. Modern day CPUs are typically capable of executing multiple applications concurrently, each of which may need to utilize the GPU during execution. A display processor is configured to convert digital information received from a CPU to analog values and may issue commands to a display panel for displaying the visual content. A device that provides content for visual presentation on a display may utilize a GPU and/or a display processor.

A display processor or display processing unit (DPU) may be configured to perform the processes of display processing. However, with the advent of wireless communication and smaller, handheld devices, there has developed an increased need for improved display processing. For instance, current techniques for split rendering may not sufficiently address target wake time (TWT) issues. There is a need for improved techniques for TWT in split rendering.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a client device, a server, a display processing unit (DPU), a graphics processing unit (GPU), or any apparatus that may perform display processing. The apparatus may obtain a first indication of at least one of a set of rendering latencies, a set of encoding latencies, or a set of network latencies for a split extended reality (XR) process with a server. The apparatus may also calculate, based on the first indication, (1) a first offset between a first rendering start time and a first target wake time (TWT) start time for a first TWT configuration and (2) a set of second offsets between a set of second rendering start times and a set of second TWT start times for a second TWT configuration, where the first TWT configuration includes one TWT window and the second TWT configuration includes two TWT windows. Additionally, the apparatus may estimate, based on the calculation of the first offset and the set of second offsets, a first motion-to-render-to-photon (m2r2p) latency for the first TWT configuration and a second m2r2p latency for the second TWT configuration. The apparatus may also calculate a difference between the first m2r2p latency for the first TWT configuration and the second m2r2p latency for the second TWT configuration; and determine whether the difference is less than an m2r2p threshold. The apparatus may also adjust the m2r2p threshold if the power level at the client device is less than a power threshold or if the battery level at the client device is less than a battery threshold; and transmit, to the server, an indication of the adjusted m2r2p threshold if the power level at the client device is less than the power threshold or if the battery level at the client device is less than the battery threshold. Moreover, the apparatus may estimate, based on the calculation of the first offset and the set of second offsets, a first server processing time for the first TWT configuration and a second server processing time for the second TWT configuration. The apparatus may calculate a difference between the first server processing time for the first TWT configuration and the second server processing time for the second TWT configuration; and determine whether the difference is less than a server processing threshold. The apparatus may also adjust the server processing threshold if the power level at the client device is less than a power threshold or if the battery level at the client device is less than a battery threshold; and transmit, to the server, an indication of the adjusted server processing threshold if the power level at the client device is less than the power threshold or if the battery level at the client device is less than the battery threshold. Further, the apparatus may select, based on the calculation of the first offset and the set of second offsets, the first TWT configuration or the second TWT configuration for the split XR process with the server. The apparatus may output a second indication of the selection of the first TWT configuration or the second TWT configuration. The apparatus may also communicate, with the server via the split XR process, based on the selection of the first TWT configuration or the second TWT configuration.

In another aspect of the disclosure, a method, a computer-readable medium, and an apparatus are provided. The apparatus may be a server, a client device, a display processing unit (DPU), a graphics processing unit (GPU), or any apparatus that may perform display processing. The apparatus may compute at least one of a set of rendering latencies, a set of encoding latencies, or a set of network latencies for a split extended reality (XR) process with a client device. The apparatus may also output a first indication of at least one of the set of rendering latencies, the set of encoding latencies, or the set of network latencies for the split XR process with the client device. Additionally, the apparatus may calculate, based on the first indication, (1) a first offset between a first rendering start time and a first target wake time (TWT) start time for a first TWT configuration and (2) a set of second offsets between a set of second rendering start times and a set of second TWT start times for a second TWT configuration, where the first TWT configuration includes one TWT window and the second TWT configuration includes two TWT windows. The apparatus may also estimate, based on the calculation of the first offset and the set of second offsets, a first motion-to-render-to-photon (m2r2p) latency for the first TWT configuration and a second m2r2p latency for the second TWT configuration.

The apparatus may also calculate a difference between the first m2r2p latency for the first TWT configuration and the second m2r2p latency for the second TWT configuration; and determine whether the difference is less than an m2r2p threshold. Moreover, the apparatus may estimate, based on the calculation of the first offset and the set of second offsets, a first server processing time for the first TWT configuration and a second server processing time for the second TWT configuration. The apparatus may calculate a difference between the first server processing time for the first TWT configuration and the second server processing time for the second TWT configuration; and determine whether the difference is less than a server processing threshold. The apparatus may also adjust the server processing threshold if the power level at the client device is less than a power threshold or if the battery level at the client device is less than a battery threshold; and transmit, to the client device, an indication of the adjusted server processing threshold if the power level at the client device is less than the power threshold or if the battery level at the client device is less than the battery threshold. Further, the apparatus may select, based on the calculation of the first offset and the set of second offsets, the first TWT configuration or the second TWT configuration for the split XR process with the client device. The apparatus may output a second indication of the selection of the first TWT configuration or the second TWT configuration. The apparatus may also communicate, with the client device via the split XR process, based on the selection of the first TWT configuration or the second TWT configuration.

The details of one or more examples of the disclosure are set forth in the accompanying drawings and the description below. Other features, objects, and advantages of the disclosure will be apparent from the description and drawings, and from the claims.

BRIEF DESCRIPTION OF DRAWINGS

FIG. 4 is a diagram illustrating example communication of content/data in accordance with a split rendering process.

FIG. 6 is a diagram illustrating an example of a split extended reality (XR) system.

FIG. 10 is a diagram illustrating an example timeline of a rendering process.

FIG. 17 is a flowchart of an example method of display processing.

FIG. 18 is a flowchart of an example method of display processing.

FIG. 20 is a flowchart of an example method of display processing.

FIG. 21 is a flowchart of an example method of display processing.

DETAILED DESCRIPTION

Figure 1:
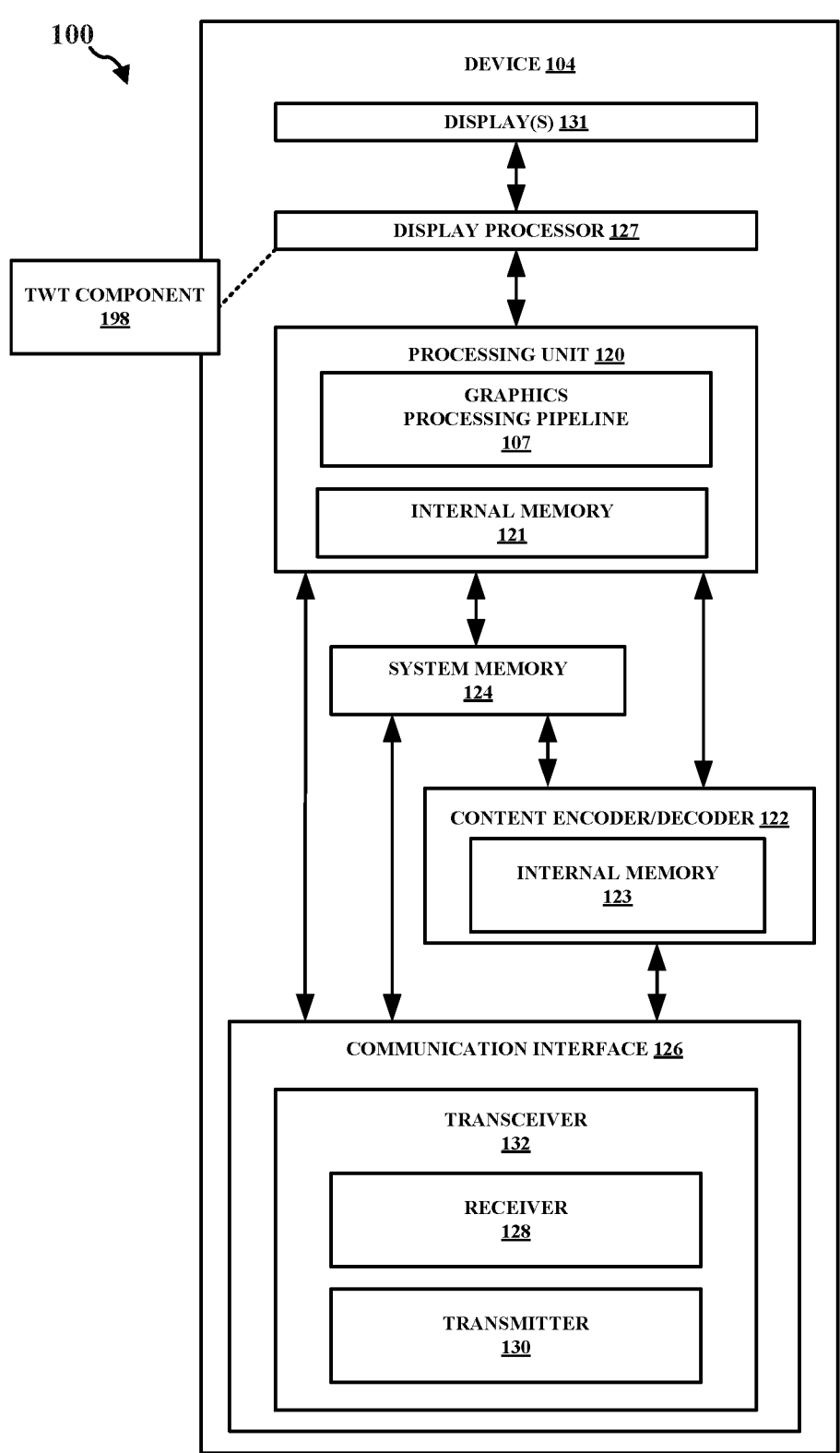
FIG. 1 is a block diagram that illustrates an example content generation system.

In some aspects, when using a TWT window, sending a single pose within the TWT window may increase the latency. For example, if the pose is sent at the beginning or the end of the TWT window, this may result in increased latency. That is, uplink (UL) and downlink (DL) may be sent together within the TWT window, which may increase the latency between the pose reception (Rx) to render start time. Also, if the DL can be transmitted when the next TWT window opens, there may be some additional latency that is added. Based on the above, it may be beneficial to transmit a pose multiple times during a TWT window. For instance, it may be beneficial to transmit a pose at a beginning of a TWT window and at an end of the TWT window. Also, it may be beneficial to utilize multiple TWT windows for pose transmission. Aspects of the present disclosure may transmit a pose multiple times during a TWT window. For instance, aspects presented herein may transmit a pose at a beginning of a TWT window and at an end of the TWT window.

Aspects of the present disclosure may include a number of benefits or advantages. For instance, aspects presented herein may allow a renderer to select one of multiple poses at a beginning and an end of a TWT window. By doing so, aspects presented herein may allow a renderer to select a latest pose, which may result in reduced latency. Additionally, aspects of the present disclosure may utilize multiple TWT windows for pose transmission. For example, aspects of the present disclosure may transmit a pose during a first TWT window, and then transmit another pose during a second TWT window. That is, aspects presented herein may allow a renderer to select one pose within a first TWT window or another pose within a second TWT window. By doing so, aspects presented herein may allow a renderer to select a latest pose, which may result in reduced latency.

Various aspects of systems, apparatuses, computer program products, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of this disclosure to those skilled in the art. Based on the teachings herein one skilled in the art should appreciate that the scope of this disclosure is intended to cover any aspect of the systems, apparatuses, computer program products, and methods disclosed herein, whether implemented independently of, or combined with, other aspects of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. Any aspect disclosed herein may be embodied by one or more elements of a claim.

Although various aspects are described herein, many variations and permutations of these aspects fall within the scope of this disclosure. Although some potential benefits and advantages of aspects of this disclosure are mentioned, the scope of this disclosure is not intended to be limited to particular benefits, uses, or objectives. Rather, aspects of this disclosure are intended to be broadly applicable to different wireless technologies, system configurations, networks, and transmission protocols, some of which are illustrated by way of example in the figures and in the following description. The detailed description and drawings are merely illustrative of this disclosure rather than limiting, the scope of this disclosure being defined by the appended claims and equivalents thereof.

Several aspects are presented with reference to various apparatus and methods. These apparatus and methods are described in the following detailed description and illustrated in the accompanying drawings by various blocks, components, circuits, processes, algorithms, and the like (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors (which may also be referred to as processing units). Examples of processors include microprocessors, microcontrollers, graphics processing units (GPUs), general purpose GPUs (GPGPUs), central processing units (CPUs), application processors, digital signal processors (DSPs), reduced instruction set computing (RISC) processors, systems-on-chip (SOC), baseband processors, application specific integrated circuits (ASICs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software may be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise. The term application may refer to software. As described herein, one or more techniques may refer to an application, i.e., software, being configured to perform one or more functions. In such examples, the application may be stored on a memory, e.g., on-chip memory of a processor, system memory, or any other memory. Hardware described herein, such as a processor may be configured to execute the application. For example, the application may be described as including code that, when executed by the hardware, causes the hardware to perform one or more techniques described herein. As an example, the hardware may access the code from a memory and execute the code accessed from the memory to perform one or more techniques described herein. In some examples, components are identified in this disclosure. In such examples, the components may be hardware, software, or a combination thereof. The components may be separate components or sub-components of a single component.

Accordingly, in one or more examples described herein, the functions described may be implemented in hardware, software, or any combination thereof. If implemented in software, the functions may be stored on or encoded as one or more instructions or code on a computer-readable medium. Computer-readable media includes computer storage media. Storage media may be any available media that may be accessed by a computer. By way of example, and not limitation, such computer-readable media may comprise a random access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that may be used to store computer executable code in the form of instructions or data structures that may be accessed by a computer.

In general, this disclosure describes techniques for having a graphics processing pipeline in a single device or multiple devices, improving the rendering of graphical content, and/or reducing the load of a processing unit, i.e., any processing unit configured to perform one or more techniques described herein, such as a GPU. For example, this disclosure describes techniques for graphics processing in any device that utilizes graphics processing. Other example benefits are described throughout this disclosure.

As used herein, instances of the term "content" may refer to "graphical content," "image," and vice versa. This is true regardless of whether the terms are being used as an adjective, noun, or other parts of speech. In some examples, as used herein, the term "graphical content" may refer to a content produced by one or more processes of a graphics processing pipeline. In some examples, as used herein, the term "graphical content" may refer to a content produced by a processing unit configured to perform graphics processing. In some examples, as used herein, the term "graphical content" may refer to a content produced by a graphics processing unit.

In some examples, as used herein, the term "display content" may refer to content generated by a processing unit configured to perform displaying processing. In some examples, as used herein, the term "display content" may refer to content generated by a display processing unit. Graphical content may be processed to become display content. For example, a graphics processing unit may output graphical content, such as a frame, to a buffer (which may be referred to as a framebuffer). A display processing unit may read the graphical content, such as one or more frames from the buffer, and perform one or more display processing techniques thereon to generate display content. For example, a display processing unit may be configured to perform composition on one or more rendered layers to generate a frame. As another example, a display processing unit may be configured to compose, blend, or otherwise combine two or more layers together into a single frame. A display processing unit may be configured to perform scaling, e.g., upscaling or downscaling, on a frame. In some examples, a frame may refer to a layer. In other examples, a frame may refer to two or more layers that have already been blended together to form the frame, i.e., the frame includes two or more layers, and the frame that includes two or more layers may subsequently be blended.

FIG. 1 is a block diagram that illustrates an example content generation system 100 configured to implement one or more techniques of this disclosure. The content generation system 100 includes a device 104. The device 104 may include one or more components or circuits for performing various functions described herein. In some examples, one or more components of the device 104 may be components of an SOC. The device 104 may include one or more components configured to perform one or more techniques of this disclosure. In the example shown, the device 104 may include a processing unit 120, a content encoder/decoder 122, and a system memory 124. In some aspects, the device 104 may include a number of components, e.g., a communication interface 126, a transceiver 132, a receiver 128, a transmitter 130, a display processor 127, and one or more displays 131. Reference to the display 131 may refer to the one or more displays 131. For example, the display 131 may include a single display or multiple displays. The display 131 may include a first display and a second display. The first display may be a left-eye display and the second display may be a right-eye display. In some examples, the first and second display may receive different frames for presentment thereon. In other examples, the first and second display may receive the same frames for presentment thereon. In further examples, the results of the graphics processing may not be displayed on the device, e.g., the first and second display may not receive any frames for presentment thereon. Instead, the frames or graphics processing results may be transferred to another device. In some aspects, this may be referred to as split-rendering.

The processing unit 120 may include an internal memory 121. The processing unit 120 may be configured to perform graphics processing, such as in a graphics processing pipeline 107. The content encoder/decoder 122 may include an internal memory 123. In some examples, the device 104 may include a display processor, such as the display processor 127, to perform one or more display processing techniques on one or more frames generated by the processing unit 120 before presentment by the one or more displays 131. The display processor 127 may be configured to perform display processing. For example, the display processor 127 may be configured to perform one or more display processing techniques on one or more frames generated by the processing unit 120. The one or more displays 131 may be configured to display or otherwise present frames processed by the display processor 127. In some examples, the one or more displays 131 may include one or more of: a liquid crystal display (LCD), a plasma display, an organic light emitting diode (OLED) display, a projection display device, an augmented reality display device, a virtual reality display device, a head-mounted display, or any other type of display device.

Memory external to the processing unit 120 and the content encoder/decoder 122, such as system memory 124, may be accessible to the processing unit 120 and the content encoder/decoder 122. For example, the processing unit 120 and the content encoder/decoder 122 may be configured to read from and/or write to external memory, such as the system memory 124. The processing unit 120 and the content encoder/decoder 122 may be communicatively coupled to the system memory 124 over a bus. In some examples, the processing unit 120 and the content encoder/decoder 122 may be communicatively coupled to each other over the bus or a different connection.

The content encoder/decoder 122 may be configured to receive graphical content from any source, such as the system memory 124 and/or the communication interface 126. The system memory 124 may be configured to store received encoded or decoded graphical content. The content encoder/decoder 122 may be configured to receive encoded or decoded graphical content, e.g., from the system memory 124 and/or the communication interface 126, in the form of encoded pixel data. The content encoder/decoder 122 may be configured to encode or decode any graphical content.

The internal memory 121 or the system memory 124 may include one or more volatile or non-volatile memories or storage devices. In some examples, internal memory 121 or the system memory 124 may include RAM, SRAM, DRAM, erasable programmable ROM (EPROM), electrically erasable programmable ROM (EEPROM), flash memory, a magnetic data media or an optical storage media, or any other type of memory.

The internal memory 121 or the system memory 124 may be a non-transitory storage medium according to some examples. The term "non-transitory" may indicate that the storage medium is not embodied in a carrier wave or a propagated signal. However, the term "non-transitory" should not be interpreted to mean that internal memory 121 or the system memory 124 is non-movable or that its contents are static. As one example, the system memory 124 may be removed from the device 104 and moved to another device. As another example, the system memory 124 may not be removable from the device 104.

The processing unit 120 may be a central processing unit (CPU), a graphics processing unit (GPU), a general purpose GPU (GPGPU), or any other processing unit that may be configured to perform graphics processing. In some examples, the processing unit 120 may be integrated into a motherboard of the device 104. In some examples, the processing unit 120 may be present on a graphics card that is installed in a port in a motherboard of the device 104, or may be otherwise incorporated within a peripheral device configured to interoperate with the device 104. The processing unit 120 may include one or more processors, such as one or more microprocessors, GPUs, application specific integrated circuits (ASICs), field programmable gate arrays (FPGAs), arithmetic logic units (ALUs), digital signal processors (DSPs), discrete logic, software, hardware, firmware, other equivalent integrated or discrete logic circuitry, or any combinations thereof. If the techniques are implemented partially in software, the processing unit 120 may store instructions for the software in a suitable, non-transitory computer-readable storage medium, e.g., internal memory 121, and may execute the instructions in hardware using one or more processors to perform the techniques of this disclosure. Any of the foregoing, including hardware, software, a combination of hardware and software, etc., may be considered to be one or more processors.

The content encoder/decoder 122 may be any processing unit configured to perform content decoding. In some examples, the content encoder/decoder 122 may be integrated into a motherboard of the device 104. The content encoder/decoder 122 may include one or more processors, such as one or more microprocessors, application specific integrated circuits (ASICs), field programmable gate arrays (FPGAs), arithmetic logic units (ALUs), digital signal processors (DSPs), video processors, discrete logic, software, hardware, firmware, other equivalent integrated or discrete logic circuitry, or any combinations thereof. If the techniques are implemented partially in software, the content encoder/decoder 122 may store instructions for the software in a suitable, non-transitory computer-readable storage medium, e.g., internal memory 123, and may execute the instructions in hardware using one or more processors to perform the techniques of this disclosure. Any of the foregoing, including hardware, software, a combination of hardware and software, etc., may be considered to be one or more processors.

In some aspects, the content generation system 100 may include a communication interface 126. The communication interface 126 may include a receiver 128 and a transmitter 130. The receiver 128 may be configured to perform any receiving function described herein with respect to the device 104. Additionally, the receiver 128 may be configured to receive information, e.g., eye or head position information, rendering commands, or location information, from another device. The transmitter 130 may be configured to perform any transmitting function described herein with respect to the device 104. For example, the transmitter 130 may be configured to transmit information to another device, which may include a request for content. The receiver 128 and the transmitter 130 may be combined into a transceiver 132. In such examples, the transceiver 132 may be configured to perform any receiving function and/or transmitting function described herein with respect to the device 104.

Referring again to FIG. 1, in certain aspects, the display processor 127 may include a TWT component 198 configured to obtain a first indication of at least one of a set of rendering latencies, a set of encoding latencies, or a set of network latencies for a split extended reality (XR) process with a server. The TWT component 198 may also be configured to calculate, based on the first indication, (1) a first offset between a first rendering start time and a first target wake time (TWT) start time for a first TWT configuration and (2) a set of second offsets between a set of second rendering start times and a set of second TWT start times for a second TWT configuration, where the first TWT configuration includes one TWT window and the second TWT configuration includes two TWT windows. The TWT component 198 may also be configured to estimate, based on the calculation of the first offset and the set of second offsets, a first motion-to-render-to-photon (m2r2p) latency for the first TWT configuration and a second m2r2p latency for the second TWT configuration. The TWT component 198 may also be configured to calculate a difference between the first m2r2p latency for the first TWT configuration and the second m2r2p latency for the second TWT configuration; and determine whether the difference is less than an m2r2p threshold. The TWT component 198 may also be configured to adjust the m2r2p threshold if the power level at the client device is less than a power threshold or if the battery level at the client device is less than a battery threshold; and transmit, to the server, an indication of the adjusted m2r2p threshold if the power level at the client device is less than the power threshold or if the battery level at the client device is less than the battery threshold. The TWT component 198 may also be configured to estimate, based on the calculation of the first offset and the set of second offsets, a first server processing time for the first TWT configuration and a second server processing time for the second TWT configuration. The TWT component 198 may also be configured to a difference between the first server processing time for the first TWT configuration and the second server processing time for the second TWT configuration; and determine whether the difference is less than a server processing threshold. The TWT component 198 may also be configured to adjust the server processing threshold if the power level at the client device is less than a power threshold or if the battery level at the client device is less than a battery threshold; and transmit, to the server, an indication of the adjusted server processing threshold if the power level at the client device is less than the power threshold or if the battery level at the client device is less than the battery threshold. The TWT component 198 may also be configured to select, based on the calculation of the first offset and the set of second offsets, the first TWT configuration or the second TWT configuration for the split XR process with the server. The TWT component 198 may also be configured to output a second indication of the selection of the first TWT configuration or the second TWT configuration. The TWT component 198 may also be configured to communicate, with the server via the split XR process, based on the selection of the first TWT configuration or the second TWT configuration.

Referring again to FIG. 1, in certain aspects, the display processor 127 may include the TWT component 198 configured to compute at least one of a set of rendering latencies, a set of encoding latencies, or a set of network latencies for a split extended reality (XR) process with a client device. The TWT component 198 may also be configured to output a first indication of at least one of the set of rendering latencies, the set of encoding latencies, or the set of network latencies for the split XR process with the client device. The TWT component 198 may also be configured to calculate, based on the first indication, (1) a first offset between a first rendering start time and a first target wake time (TWT) start time for a first TWT configuration and (2) a set of second offsets between a set of second rendering start times and a set of second TWT start times for a second TWT configuration, where the first TWT configuration includes one TWT window and the second TWT configuration includes two TWT windows. The TWT component 198 may also be configured to estimate, based on the calculation of the first offset and the set of second offsets, a first motion-to-render-to-photon (m2r2p) latency for the first TWT configuration and a second m2r2p latency for the second TWT configuration. The TWT component 198 may also be configured to calculate a difference between the first m2r2p latency for the first TWT configuration and the second m2r2p latency for the second TWT configuration; and determine whether the difference is less than an m2r2p threshold. The TWT component 198 may also be configured to estimate, based on the calculation of the first offset and the set of second offsets, a first server processing time for the first TWT configuration and a second server processing time for the second TWT configuration. The TWT component 198 may also be configured to calculate a difference between the first server processing time for the first TWT configuration and the second server processing time for the second TWT configuration; and determine whether the difference is less than a server processing threshold. The TWT component 198 may also be configured to adjust the server processing threshold if the power level at the client device is less than a power threshold or if the battery level at the client device is less than a battery threshold; and transmit, to the client device, an indication of the adjusted server processing threshold if the power level at the client device is less than the power threshold or if the battery level at the client device is less than the battery threshold. The TWT component 198 may also be configured to select, based on the calculation of the first offset and the set of second offsets, the first TWT configuration or the second TWT configuration for the split XR process with the client device. The TWT component 198 may also be configured to output a second indication of the selection of the first TWT configuration or the second TWT configuration. The TWT component 198 may also be configured to communicate, with the client device via the split XR process, based on the selection of the first TWT configuration or the second TWT configuration. Although the following description may be focused on display processing, the concepts described herein may be applicable to other similar processing techniques.

As described herein, a device, such as the device 104, may refer to any device, apparatus, or system configured to perform one or more techniques described herein. For example, a device may be a server, a base station, user equipment, a client device, a station, an access point, a computer, e.g., a personal computer, a desktop computer, a laptop computer, a tablet computer, a computer workstation, or a mainframe computer, an end product, an apparatus, a phone, a smart phone, a server, a video game platform or console, a handheld device, e.g., a portable video game device or a personal digital assistant (PDA), a wearable computing device, e.g., a smart watch, an augmented reality device, or a virtual reality device, a non-wearable device, a display or display device, a television, a television set-top box, an intermediate network device, a digital media player, a video streaming device, a content streaming device, an in-car computer, any mobile device, any device configured to generate graphical content, or any device configured to perform one or more techniques described herein. Processes herein may be described as performed by a particular component (e.g., a GPU), but, in further embodiments, may be performed using other components (e.g., a CPU), consistent with disclosed embodiments.

GPUs may process multiple types of data or data packets in a GPU pipeline. For instance, in some aspects, a GPU may process two types of data or data packets, e.g., context register packets and draw call data. A context register packet may be a set of global state information, e.g., information regarding a global register, shading program, or constant data, which may regulate how a graphics context will be processed. For example, context register packets may include information regarding a color format. In some aspects of context register packets, there may be a bit that indicates which workload belongs to a context register. Also, there may be multiple functions or programming running at the same time and/or in parallel. For example, functions or programming may describe a certain operation, e.g., the color mode or color format. Accordingly, a context register may define multiple states of a GPU.

Context states may be utilized to determine how an individual processing unit functions, e.g., a vertex fetcher (VFD), a vertex shader (VS), a shader processor, or a geometry processor, and/or in what mode the processing unit functions. In order to do so, GPUs may use context registers and programming data. In some aspects, a GPU may generate a workload, e.g., a vertex or pixel workload, in the pipeline based on the context register definition of a mode or state. Certain processing units, e.g., a VFD, may use these states to determine certain functions, e.g., how a vertex is assembled. As these modes or states may change, GPUs may need to change the corresponding context. Additionally, the workload that corresponds to the mode or state may follow the changing mode or state.

Figure 2:
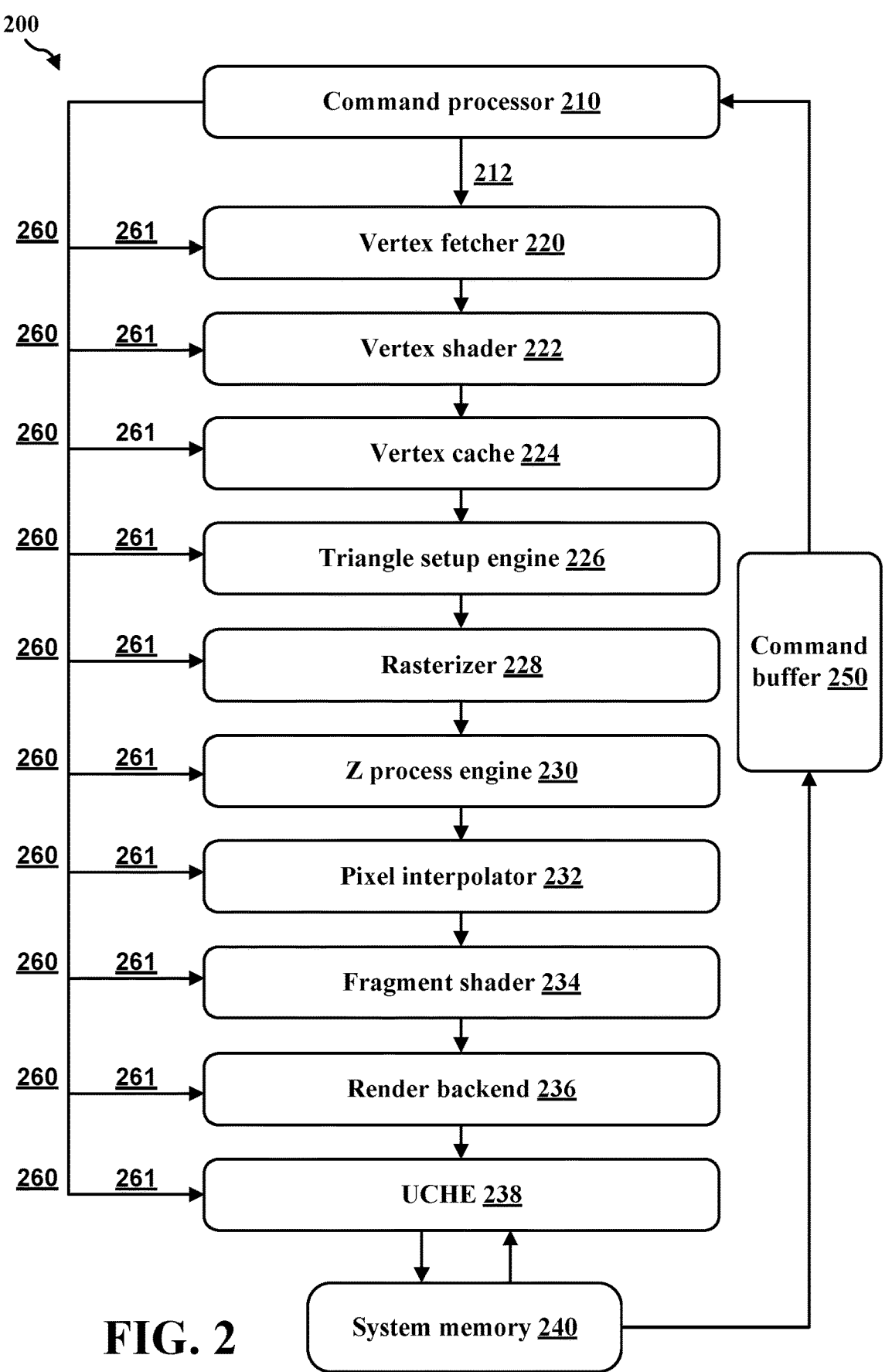
FIG. 2 illustrates an example graphics processing unit (GPU).

FIG. 2 illustrates an example GPU 200 in accordance with one or more techniques of this disclosure. As shown in FIG. 2, GPU 200 includes command processor (CP) 210, draw call packets 212, VFD 220, VS 222, vertex cache (VPC) 224, triangle setup engine (TSE) 226, rasterizer (RAS) 228, Z process engine (ZPE) 230, pixel interpolator (PI) 232, fragment shader (FS) 234, render backend (RB) 236, level 2

(L2) cache (UCHE) 238, and system memory 240. Although FIG. 2 displays that GPU 200 includes processing units 220-238, GPU 200 may include a number of additional processing units. Additionally, processing units 220-238 are merely an example and any combination or order of processing units may be used by GPUS according to the present disclosure. GPU 200 also includes command buffer 250, context register packets 260, and context states 261.

As shown in FIG. 2, a GPU may utilize a CP, e.g., CP 210, or hardware accelerator to parse a command buffer into context register packets, e.g., context register packets 260, and/or draw call data packets, e.g., draw call packets 212. The CP 210 may then send the context register packets 260 or draw call packets 212 through separate paths to the processing units or blocks in the GPU. Further, the command buffer 250 may alternate different states of context registers and draw calls. For example, a command buffer may be structured in the following manner: context register of context N, draw call(s) of context N, context register of context N+1, and draw call(s) of context N+1.

GPUs may render images in a variety of different ways. In some instances, GPUs may render an image using rendering and/or tiled rendering. In tiled rendering GPUs, an image may be divided or separated into different sections or tiles. After the division of the image, each section or tile may be rendered separately. Tiled rendering GPUs may divide computer graphics images into a grid format, such that each portion of the grid, i.e., a tile, is separately rendered. In some aspects, during a binning pass, an image may be divided into different bins or tiles. In some aspects, during the binning pass, a visibility stream may be constructed where visible primitives or draw calls may be identified. In contrast to tiled rendering, direct rendering does not divide the frame into smaller bins or tiles. Rather, in direct rendering, the entire frame is rendered at a single time. Additionally, some types of GPUs may allow for both tiled rendering and direct rendering.

Figure 3:
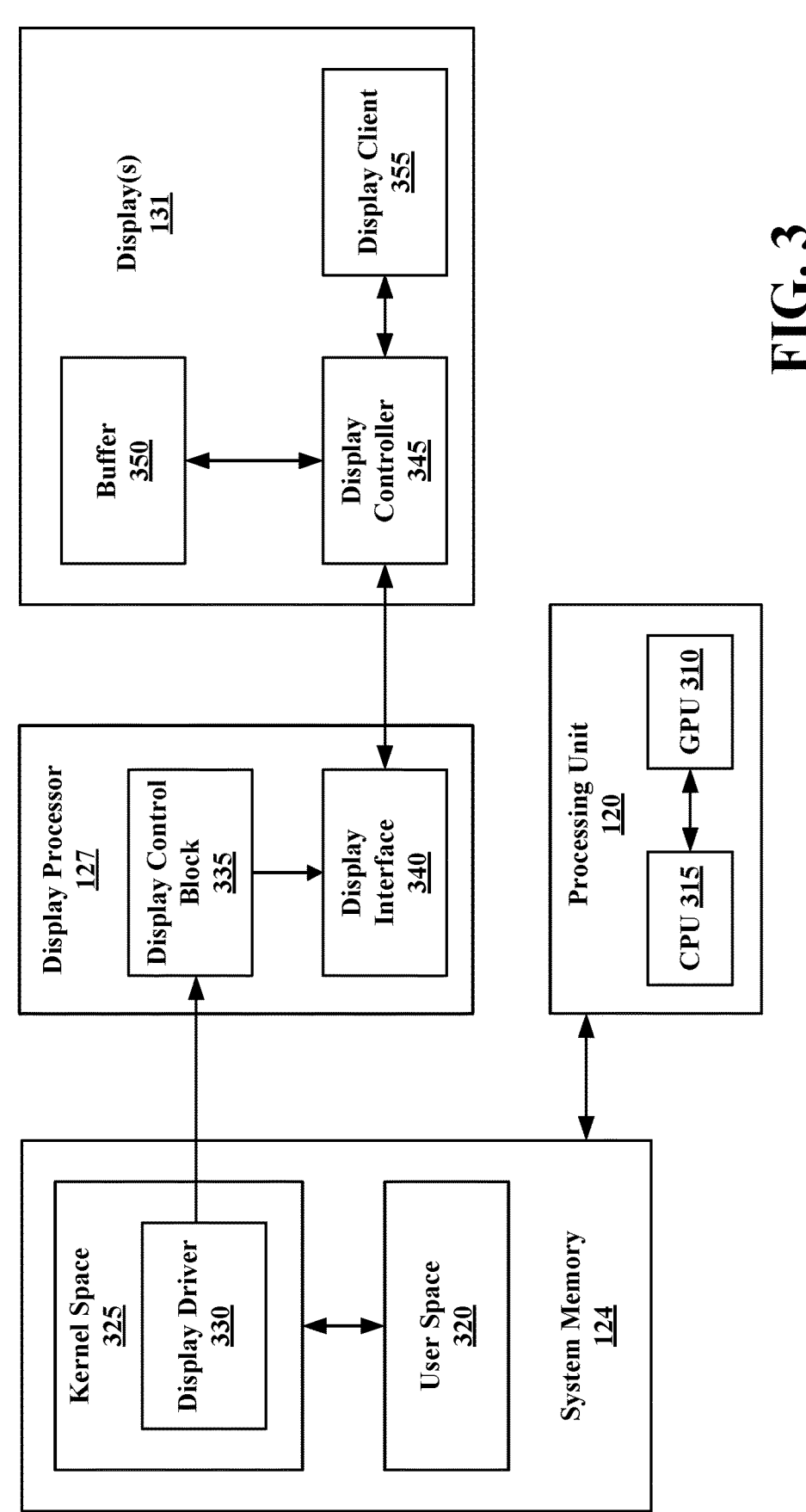
FIG. 3 illustrates an example display framework including a display processor and a display.

FIG. 3 is a block diagram 300 that illustrates an example display framework including the processing unit 120, the system memory 124, the display processor 127, and the display(s) 131, as may be identified in connection with the device 104.

A GPU may be included in devices that provide content for visual presentation on a display. For example, the processing unit 120 may include a GPU 310 configured to render graphical data for display on a computing device (e.g., the device 104), which may be a computer workstation, a mobile phone, a smartphone or other smart device, an embedded system, a personal computer, a tablet computer, a video game console, and the like. Operations of the GPU 310 may be controlled based on one or more graphics processing commands provided by a CPU 315. The CPU 315 may be configured to execute multiple applications concurrently. In some cases, each of the concurrently executed multiple applications may utilize the GPU 310 simultaneously. Processing techniques may be performed via the processing unit 120 output a frame over physical or wireless communication channels.

The system memory 124, which may be executed by the processing unit 120, may include a user space 320 and a kernel space 325. The user space 320 (sometimes referred to as an "application space") may include software application(s) and/or application framework(s). For example, software application(s) may include operating systems, media applications, graphical applications, workspace applications, etc. Application framework(s) may include frameworks used by one or more software applications, such as libraries, services (e.g., display services, input services, etc.), application program interfaces (APIs), etc. The kernel space 325 may further include a display driver 330. The display driver 330 may be configured to control the display processor 127. For example, the display driver 330 may cause the display processor 127 to compose a frame and transmit the data for the frame to a display.

The display processor 127 includes a display control block 335 and a display interface 340. The display processor 127 may be configured to manipulate functions of the display(s) 131 (e.g., based on an input received from the display driver 330). The display control block 335 may be further configured to output image frames to the display(s) 131 via the display interface 340. In some examples, the display control block 335 may additionally or alternatively perform post-processing of image data provided based on execution of the system memory 124 by the processing unit 120.

The display interface 340 may be configured to cause the display(s) 131 to display image frames. The display interface 340 may output image data to the display(s) 131 according to an interface protocol, such as, for example, the MIPI DSI (Mobile Industry Processor Interface, Display Serial Interface). That is, the display(s) 131, may be configured in accordance with MIPI DSI standards. The MIPI DSI standard supports a video mode and a command mode. In examples where the display(s) 131 is/are operating in video mode, the display processor 127 may continuously refresh the graphical content of the display(s) 131. For example, the entire graphical content may be refreshed per refresh cycle (e.g., line-by-line). In examples where the display(s) 131 is/are operating in command mode, the display processor 127 may write the graphical content of a frame to a buffer 350.

In some such examples, the display processor 127 may not continuously refresh the graphical content of the display(s) 131. Instead, the display processor 127 may use a vertical synchronization (Vsync) pulse to coordinate rendering and consuming of graphical content at the buffer 350. For example, when a Vsync pulse is generated, the display processor 127 may output new graphical content to the buffer 350. Thus, generation of the Vsync pulse may indicate that current graphical content has been rendered at the buffer 350.

Frames are displayed at the display(s) 131 based on a display controller 345, a display client 355, and the buffer 350. The display controller 345 may receive image data from the display interface 340 and store the received image data in the buffer 350. In some examples, the display controller 345 may output the image data stored in the buffer 350 to the display client 355. Thus, the buffer 350 may represent a local memory to the display(s) 131. In some examples, the display controller 345 may output the image data received from the display interface 340 directly to the display client 355.

The display client 355 may be associated with a touch panel that senses interactions between a user and the display(s) 131. As the user interacts with the display(s) 131, one or more sensors in the touch panel may output signals to the display controller 345 that indicate which of the one or more sensors have sensor activity, a duration of the sensor activity, an applied pressure to the one or more sensor, etc. The display controller 345 may use the sensor outputs to determine a manner in which the user has interacted with the display(s) 131. The display(s) 131 may be further associated with/include other devices, such as a camera, a microphone, and/or a speaker, that operate in connection with the display client 355.

Some processing techniques of the device 104 may be performed over three stages (e.g., stage 1: a rendering stage; stage 2: a composition stage; and stage 3: a display/transfer stage). However, other processing techniques may combine the composition stage and the display/transfer stage into a single stage, such that the processing technique may be executed based on two total stages (e.g., stage 1: the rendering stage; and stage 2: the composition/display/transfer stage). During the rendering stage, the GPU 310 may process a content buffer based on execution of an application that generates content on a pixel-by-pixel basis. During the composition and display stage(s), pixel elements may be assembled to form a frame that is transferred to a physical display panel/subsystem (e.g., the displays 131) that displays the frame.

Instructions executed by a CPU (e.g., software instructions) or a display processor may cause the CPU or the display processor to search for and/or generate a composition strategy for composing a frame based on a dynamic priority and runtime statistics associated with one or more composition strategy groups. A frame to be displayed by a physical display device, such as a display panel, may include a plurality of layers. Also, composition of the frame may be based on combining the plurality of layers into the frame (e.g., based on a frame buffer). After the plurality of layers are combined into the frame, the frame may be provided to the display panel for display thereon. The process of combining each of the plurality of layers into the frame may be referred to as composition, frame composition, a composition procedure, a composition process, or the like.

A frame composition procedure or composition strategy may correspond to a technique for composing different layers of the plurality of layers into a single frame. The plurality of layers may be stored in doubled data rate (DDR) memory. Each layer of the plurality of layers may further correspond to a separate buffer. A composer or hardware composer (HWC) associated with a block or function may determine an input of each layer/buffer and perform the frame composition procedure to generate an output indicative of a composed frame. That is, the input may be the layers and the output may be a frame composition procedure for composing the frame to be displayed on the display panel.

In some aspects, a display device may present frames at different frame rates on the first display panel and the second display panel. For instance, a display panel may present frames at 60 frames per second (FPS) on both the first display panel and the second display panel, 45 FPS on both the first display panel and the second display panel, etc. The display device may synchronize frame rates of content with refresh rates of the display panels (via a vertical synchronization process, which may be referred to as vsync, Vsync, VSync, or VSYNC). For instance, content may be available at 60 FPS and the first display panel and the second display panel may have a refresh rate of 95 Hz. Via Vsync, the refresh rate of the first display panel and the second display panel may be set to 60 Hz to match the 60 FPS content.

As indicated herein, VSync is a graphics technology that synchronizes the frame rate of an application/game with a refresh rate at a display (e.g., a display on a client device). Vsync may be utilized as a manner in which to deal with screen tearing (i.e., the screen displays portions of multiple frames at once). That can result in the display appearing to be split along a line. Tearing may occur when the display refresh rate (i.e., how many times the display updates per second) is not in synchronization with the frames per second (FPS). VSync signals may synchronize the display pipeline (e.g., the pipeline including application rendering, compositor, and a hardware composer (HWC) that presents images on the display). For instance, VSync signals may help to synchronize the time in which applications wake up to start rendering, the time the compositor wakes up to composite the screen, and the display refresh cycle. This synchronization may help to eliminate display refresh issues and improve visual performance. In some examples, the HWC may generates VSync events/signals and send the events/ signals to the compositor.

In some aspects of graphics processing, the rendering of content may be performed in multiple locations and/or on multiple devices, e.g., in order to divide the rendering workload between different devices. For example, the rendering may be split between a server and a client device, which may be referred to as "split rendering." In some instances, split rendering may be a method for bringing content to client devices, where a portion of the graphics processing may be performed outside of the client device, e.g., at a server. In some aspects, the server may be at least one of: a phone, a smart phone, a computer, or a cloud server. Further, the client device may be at least one of: a headset, a head mounted display (HMD), display glasses, or smart glasses.

Split rendering may be performed for a number of different types of applications (e.g., virtual reality (VR) applications, augmented reality (AR) applications, mixed reality (MR) applications, and/or extended reality (XR) applications). In VR applications, the content displayed at the client device may correspond to man-made or animated content. In XR, AR, or MR content, a portion of the content displayed at the client device may correspond to real-world content (e.g., objects in the real world), and a portion of the content may be man-made or animated content. Also, the man-made or animated content and real-world content may be displayed in an optical see-through or a video see-through device, such that the user may view real-world objects and man-made or animated content simultaneously. In some aspects, man-made or animated content may be referred to as augmented content, or vice versa. Split XR, AR, or MR systems may also introduce latency when delivering the rendered content to the client display. In some aspects, this latency may be even higher when rendering occurs on a server than compared to client rendering, but it can also enable more complex XR, AR, or MR applications. In addition, there may be non-negligible latency between the time a camera pose is computed and the time the content appears on the client display. For instance, a certain amount of latency may be present in split XR, AR, or MR systems.

FIG. 4 illustrates diagram 400 including communication of content/data in accordance with a split rendering process. As shown in FIG. 4, diagram 400 includes server 410 and client device 450 associated with the split rendering process. FIG. 4 shows a number of processes that are performed at the server 410 and the client device 450 including an encoding process 420, a packetization process 430, a de-packetization process 470, and a decoding process 480. Server 410 and client device 450 also include a transmission component 440 and a reception component 460, respectively.

As shown in FIG. 4, on the server 410, data/content associated with images/frames may be encoded during encoding process 420. After encoding process 420, the data/content may then undergo a packetization process 430, e.g., a real-time transport protocol (RTP) packetization process. During the packetization process, the data/content may be converted to one or more frames 442. The frames 442 may then be transmitted from the transmission component 440 of server 410 to the reception component 460 of client device 450. In some instances, the frames may be transmitted via a user datagram protocol (UDP) internet protocol (IP) (UDP/IP) network protocol, a transmission control protocol (TCP) IP (TCP/IP) network protocol, or any other network protocol. On the client device 450, the frames 442 may be received via the reception component 460 (e.g., received via a UDP/IP network protocol, a TCP/IP network protocol, or any other network protocol). The frames 442 may also undergo a de-packetization process 470 (e.g., a real-time transport protocol (RTP) de-packetization process or any other protocol de-packetization process), which may convert the data packets into data/content. After de-packetization, the data/content may be decoded during decoding process 480. Finally, the decoded data/content may be sent to a display or HMD of client device 450 for display of the data/content.

As indicated above, aspects of graphics processing may deal with rendering or displaying different types of content (e.g., virtual reality (VR) applications, augmented reality (AR) applications, mixed reality (MR) applications, and/or extended reality (XR) applications). The content may be rendered or created on a server, e.g., a computer or phone. To display this content, users may utilize different types of headsets or display glasses, which may be referred to as a client device. In some instances, when a user wants to use XR glasses for a long duration in the absence of a charging facility, it is desirable to save power at the server or client device. Also, when the battery of either the client device or the server is getting low (i.e., beyond a threshold percentage decided by the user) it is desirable to save power at the server or client device. Moreover, if a user wants to extent battery life voluntarily, then it is desirable to save power at the server or client device and provide a long battery life to either device.

In split rendering applications, content may be rendered on servers and encoded/streamed to XR-based HMDs over Wi-Fi. As indicated above, split rendering means the XR workload may be split between two devices, i.e., the host/ server and the client/HMD. For example, one use case may be a smartphone connected to HMD/AR glasses. AR glasses may not have high processing capabilities, and heat dissipation may be an issue if all the processing is performed on the client/glasses. Accordingly, it is beneficial to split the rendering between the server and the client device. In one aspect, a pose (e.g., a six degree of freedom (6DOF) pose) may be generated on the client device. The client/HMD may send the 6DOF pose data to the server via an uplink connection. An application or game may then render the content using the transmitted 6DOF pose on the server/ phone. Also, the encoding of rendered content may occur on the server/phone. The encoded and compressed bit stream may then be transmitted from the server/phone to the HMD/client via a downlink connection. After this, video decoding and time warp processing may be performed on the HMD/client using the latest 6DOF pose. Finally, the HMD/client may display the re-projected content.

Figure 5:
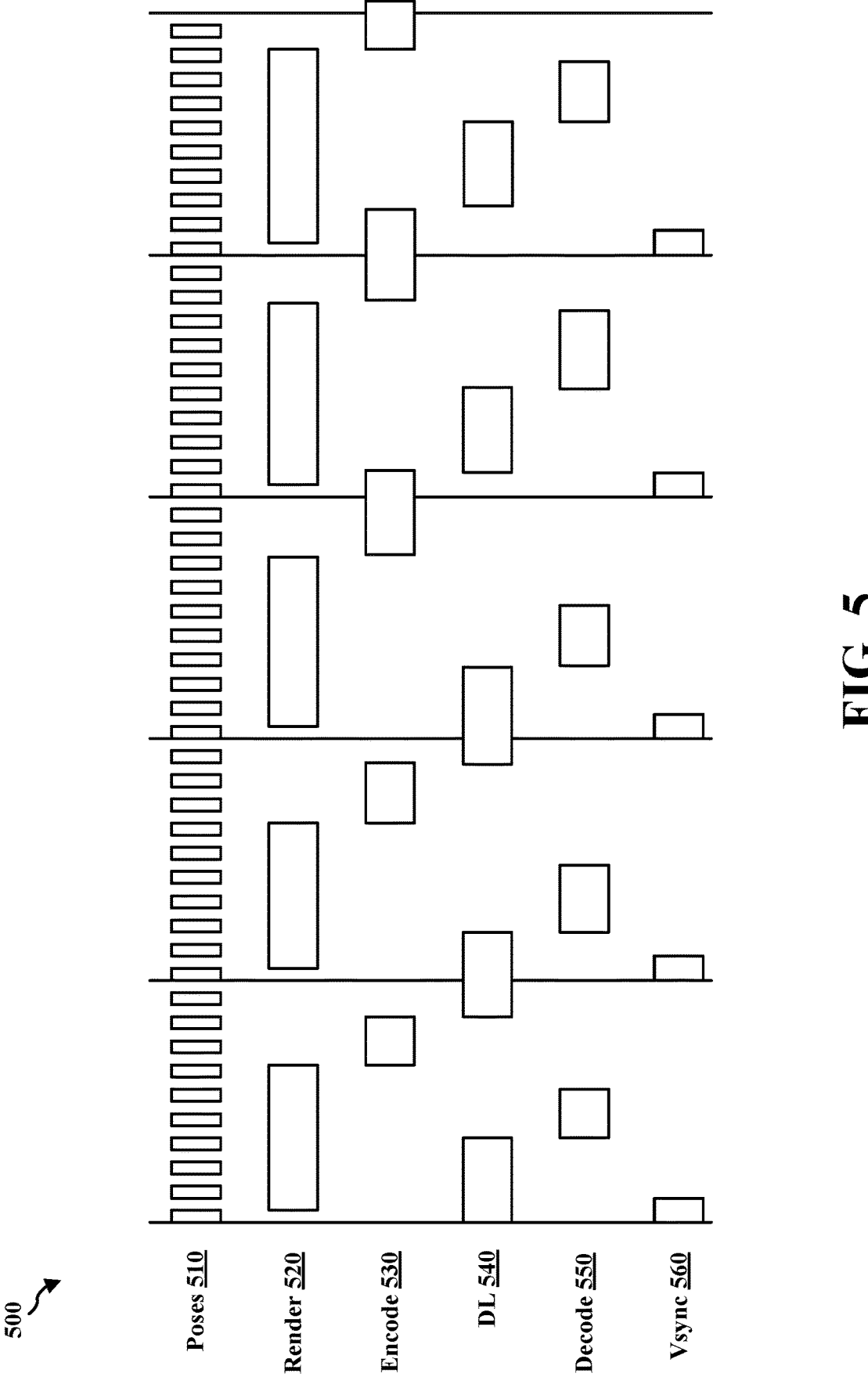
FIG. 5 is a diagram illustrating an example timeline of a split rendering process.

FIG. 5 illustrates a diagram 500 of an example timeline of a split rendering process. More specifically, FIG. 5 shows a diagram 500 of a timeline of different processing steps at a server (e.g., phone, smart phone, or computer) and a client device (e.g., headset, HMD, or smart glasses). For instance, a client device may transmit a number of poses 510 (e.g., head poses) to the server. The server may then render content for a frame at render process 520, as well as encode the frame at encode process 530. Also, the server may transmit the frame to the client device via downlink (DL) 540. After receiving the frame, the client device may decode the frame at decode process 550. FIG. 5 also shows a vertical synchronization (VSync) 560 that is associated with each of the transmissions.

As shown in FIG. 5, head pose data may be transmitted from the client device to the server (via uplink (UL)) at a high rate (e.g., 500 Hz) and/or a low latency. The client device (e.g., HMD/glasses) may be unaware of the rendering start time on the server (e.g., phone). The rendering of the first frame on the server may start at an arbitrary time using the latest pose followed by the rendering of future frames at a preconfigured frames-per-second (fps or FPS) rate. A rendering thread may render frames as fast as a GPU allows without any wait time, and in order to limit the fps, the wait time may be added at the end of each rendering. Also, the rendering thread may sleep until the wait time before starting the rendering for the next frame. Further, upon rendering, each rendered frame may be immediately queued for encoding. Once the encoding is completed, encoded frames may be packetized and transmitted (via downlink (DL)) at an arbitrary time (e.g., the post-rendering time plus the encode time). In some examples, a Wi-Fi modem may be always "on" so that the pose and frames may be transmitted with a minimum latency. Also, in some examples, on the UL side, a number of different types of information or data may also be transmitted (e.g., camera streaming data, color data or red (R) green (G) blue (B) (RGB) data, hand tracking data, and/or three-dimensional (3D) rendering (3DR) data).

Some aspects of split rendering may utilize a number of different features, such as a target wake time (TWT) and a timing synchronization function (TSF). The TWT feature may allow a modem/radio frequency (RF) to be switched on at a fixed cadence and for a known service period. This TWT feature may be utilized to save power on the server and the client device. While TWT may ensure a power reduction on the modem side, the selection of TWT parameters may influence XR performance, such as the latency and frame reuse (i.e., judder). In some instances, the TWT feature may allow UL (pose) data and DL (rendered+encoded) frame data to be aligned with a TWT service period (on period), i.e., the transmission (Tx) and reception (Rx) on the client device and the server may occur consecutively. When data is transmitted consecutively within the same service period, it may provide the modem a chance to sleep for a certain time (e.g., a duration that is greater than a threshold duration), which may reduce power and thermal issues. In some split XR scenarios, each client may have a timer synchronized with a timing synchronized function (TSF), e.g., associated with a server. Additionally, early termination may allow a service period to be terminated early on detection of inactivity of DL/UL data. Early termination processes may include an end of service period (EOSP). For example, the ESOP may terminate a service interval (i.e., transition the service interval from an "on" period to an "off" period). TWT may allow a modem to turn on and off at a defined cadence. TWT may also support early termination, such as if data is not present for transmission for a defined time period, the modem may turn off.

As indicated herein, there may be multiple subsystems that are involved in an XR pipeline from end to end. For example, a CPU, a GPU, an encoder, a decoder, a network, a server (e.g., a smartphone), and/or a client device (e.g., a headset, HMD, or AR glasses) may be involved in an end-to-end XR pipeline. Some types of client devices (e.g., wireless AR glasses) may need to have a sleek and lightweight design/form factor, which may pose a number of different issues, such as battery consumption (e.g., around 800 mW for system-on-chip (SOC) and double data rate (DDR) memory for some devices) and/or thermal dissipation. Additionally, in order to achieve a high quality user experience, certain display characteristics or conditions may be desired by the server and/or client device. For example, for a high quality user experience, a minimal amount of motion-to-render-to-photon (M2R2P) latency may be desired (i.e., m2r2p latency may be the wait time between a frame being ready and the frame being transmitted). Further, a minimal amount of frame loss or repeat may be desired by the server and/or client device.

FIG. 6 is a diagram 600 illustrating an example of a split extended reality (XR) system 602 in accordance with one or more techniques of this disclosure. As used herein, split XR may refer to a paradigm whereby a client device (e.g., an HMD) and a remote device (e.g., a server) collaborate to facilitate the display of graphical content on a display of the client device, where the client device and the remote device may be in wired communication and/or in wireless communication with one another. For instance, a portion of rendering tasks (or other tasks) may be offloaded to the server. The server may perform the rendering tasks (or the other tasks). The server may transmit an output of the rendering tasks (or the other tasks) to the client device. The client device may perform additional processing based on the received output in order to display the graphical content. Split XR may enable the client device to present relatively high quality graphical content on a display while conserving battery life of the client device.

The split XR system 602 may include a server 604 and a client HMD 606. The server 604 may also be referred to as a companion device, a remote device, etc. In an example, the server 604 may be a cloud server, a desktop computing device (i.e., a personal computer (PC)), a server computing device, a gaming console, or a phone. In an example, the server 604 may be or include the device 104. The client HMD 606 may also be referred to as XR glasses, glasses, a client device, a client, an HMD, a wearable display device, etc. In an example, the client HMD 606 may be the device 104. In an example, the client HMD 606 may be worn over/around/near one or more eyes of a user. For instance, the client HMD 606 may include display(s) that are located several centimeters from one or more eyes of the user when the user wears the client HMD 606. The client HMD 606 may be capable of presenting XR content to the user.

The server 604 and the client HMD 606 may be in wired communication with one another and/or the server 604 and the client HMD 606 may be in wireless communication with one another. In an example, the server 604 and the client HMD 606 may be in communication with one another via a wireless local area network (WLAN) link, a cellular link (e.g., 5G New Radio (NR)), and/or a Bluetooth™ link (Bluetooth is a trademark of the Bluetooth Special Interest Group (SIG). The server 604 may have relatively greater computational capabilities compared to computational capabilities of the client HMD 606. For instance, the server 604 may have a faster processor and/or a greater amount of memory in comparison to a processor and/or memory of the client HMD 606. Furthermore, the client HMD 606 may have a limited battery capacity, whereas the server 604 may not have a limited battery capacity.

In the split XR system 602, the client HMD 606 may transmit pose data 608 (i.e., HMD pose data, such as orientation information, hand/head pose information, etc.) to the server 604, where the pose data 608 is for the client HMD 606. The pose data 608 may be a six-degrees of freedom (6DOF) pose that includes location information (e.g., an x-coordinate, a y-coordinate, and a z-coordinate) and orientation information (e.g., a roll, a pitch, and a yaw) of the client HMD 606. The client HMD 606 may also transmit other data to the server 604, such as state information of an application executing on the client HMD 606. For example, the client HMD 606 may transmit perception data (e.g., hand tracking data, image tracking/object tracking (IT/OT) data, etc.) to the server 604. The client HMD 606 may also transmit a camera video stream to the server 604.

The server 604 may render XR content based on the pose data 608 (e.g., based on various poses). The server 604 may also render the XR content additionally based on the other data transmitted to the server 604. The server 604 may compress the rendered XR content, encode the XR content, and transmit the rendered XR content (along with the render pose) to the client HMD 606 in an encoded bitstream 610. Furthermore, the server 604 may extrapolate a render pose based on the pose data 608 and the encoded bitstream 610 may also include an indication of the render pose. The client HMD 606 may receive and decompress the encoded bitstream 610 to obtain the rendered XR content. The client HMD 606 may warp the rendered XR content based on the render pose and a latest display pose of the client HMD 606. The client HMD 606 may perform additional rendering on the rendered XR content in order to present the rendered XR content on a display of the client HMD 606. The pose data 608 and the encoded bitstream 610 may be associated with a round-trip latency 612. The round-trip latency 612 may be a total time that elapses from a time at which the pose data 608 is transmitted to the server 604 to a time at which the encoded bitstream 610 is received at the client HMD 606.

In some aspects, uplink and downlink communication may transmit data independently, so the modem may necessarily remain ON for the entire duration as it can Rx packets at any time. The communication duration may be restricted between server and client for a short time and then let the modem (at both the server and client) be in sleep mode for remaining time in a time cycle (considering a frames-per-second (fps) render cycle, the time cycle may be equal to 1/fps). The uplink data and the downlink data may be sent back-to-back so that the modem can sleep for the remaining duration. The modem will be ON just for a target wake time (TWT) and it may sleep in the other time, thus saving power. Therefore, the target wake time may allot a fixed amount of time for the modem to be on. That is, the TWT may allow a modem to optimize the amount of power utilized. Since there may be a constraint applied on the transmission of uplink and downlink data it may result in higher end-to-end (e2e) latency (motion-to-render-to-photon (m2r2p) latency). Also, the impact on latency may vary based on the rendering time taken. For example, when an application is asked to render at 45 fps, the rendering time can vary anywhere from 6 ms to 20 ms based on the content complexity. In order to meet TWT, the rendering should start at some offset relative to the TWT start, such that the target wake times may be met.

Figure 7:
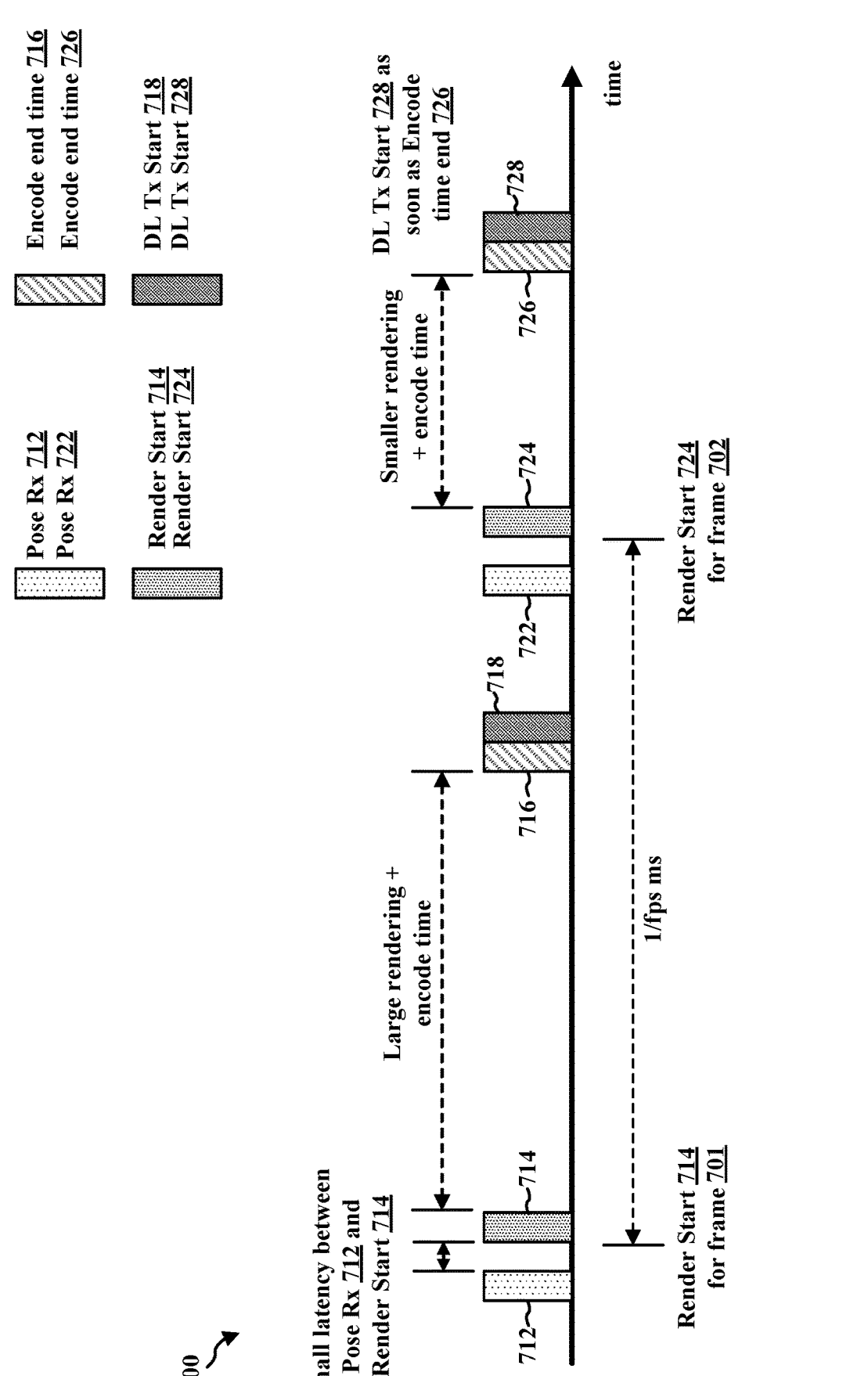
FIG. 7 is a diagram illustrating an example timeline of a rendering process.

FIG. 7 is a diagram 700 illustrating an example timeline of a rendering process. More specifically, diagram 700 depicts a timeline of a split rendering process with a varying rendering time. As shown in FIG. 7, diagram 700 includes pose reception (Rx) 712, pose Rx 722, render start time 714 for frame 701, render start time 724 for frame 702, encode end time 716, encode end time 726, downlink transmission start time 718, and downlink transmission start time 728. FIG. 7 depicts that there is a certain time (1/fps) between render start time 714 for frame 701 and render start time 724 for frame 702. There is a small latency between pose Rx 712 and render start 714. Also, there is a large rendering and encode time between render start time 714 for frame 701 and encode end time 716. Further, there is a smaller rendering and encode time between render start time 724 for frame 702 and encode end time 726. Moreover, the downlink transmission start time 728 will begin as soon as encode end time 726.

FIG. 7 depicts an impact TWT on m2r2p with a varied rendering time (V0). As shown in FIG. 7, since the pose (part of UL) can be sent independently of the DL, the pose Rx may be synchronized to minimize latency between the pose Rx to render start time. For instance, the DL may be transmitted as soon as the encode ends, so there is no additional latency. In the design in FIG. 7, there is a considerable power impact as the modem is always kept in listening mode.

Figure 8:
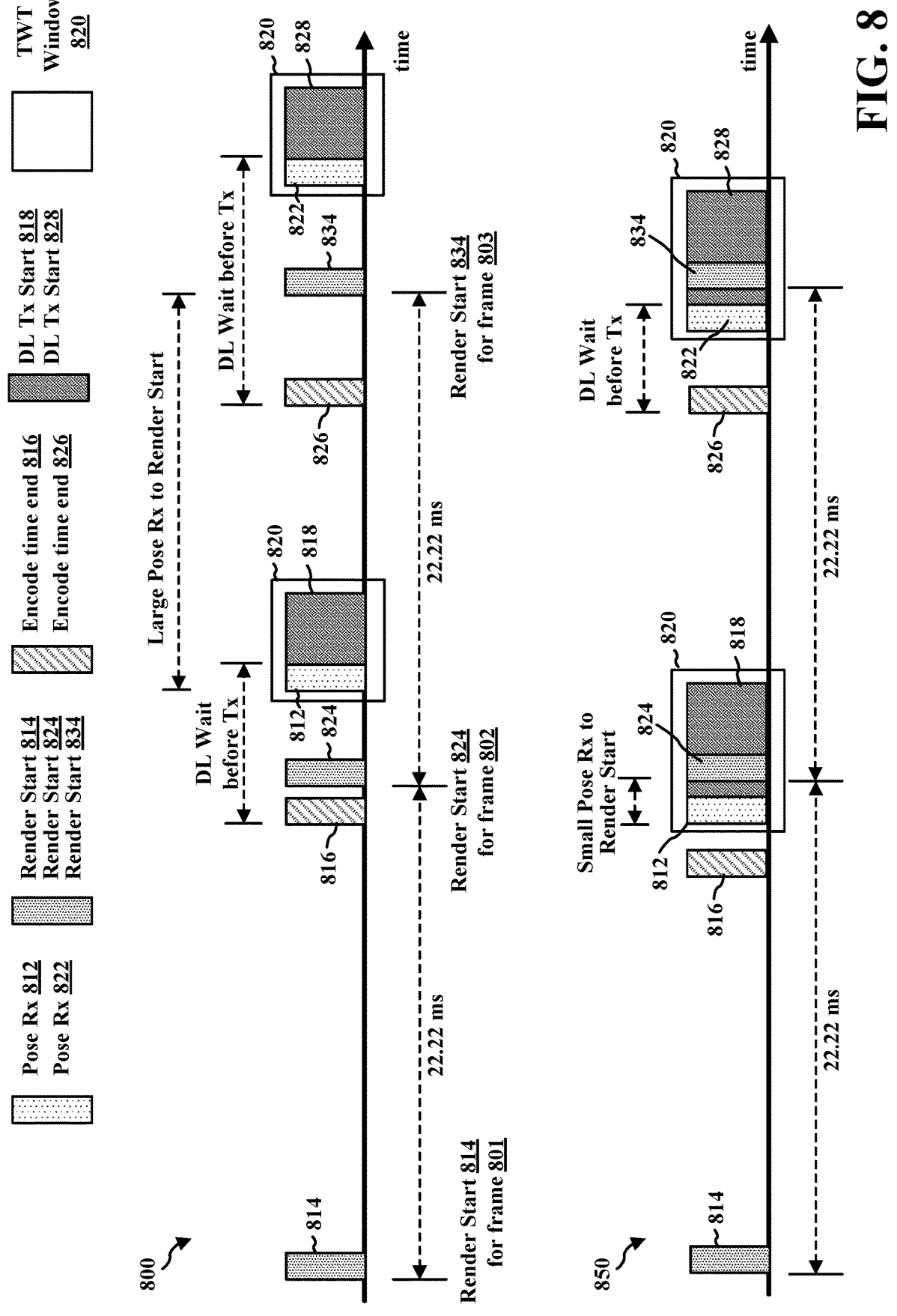
FIG. 8 includes diagrams illustrating example timelines of a rendering process.

FIG. 8 includes diagram 800 and diagram 850 illustrating example timelines of a rendering process. More specifically, diagram 800 and diagram 850 depict timelines of a split rendering process with varying rendering times and a target wake time. As shown in FIG. 8, diagram 800 includes pose reception (Rx) 812, pose Rx 822, render start time 814 for frame 801, render start time 824 for frame 802, render start time 834 for frame 803, encode time end 816, encode time end 826, downlink transmission start time 818, downlink transmission start time 828, and TWT window 820. Diagram 800 depicts that there is a 22.22 ms time between render start time 814 for frame 801 and render start time 824 for frame 802, as well as between render start time 824 for frame 802 and render start time 834 for frame 803. There is a DL wait time between encode time end 816 and pose Rx 812. Also, there is a DL wait time between encode time end 826 and pose Rx 822. Further, there is a large latency between pose Rx 812 and render start time 834 for frame 803. Moreover, TWT window 820 includes pose Rx 812 and downlink transmission start time 818, as well as pose Rx 822 and downlink transmission start time 828.

Diagram 800 depicts a default TWT design where a pose is sent first and then a downlink is sent. For instance, uplink (UL) and downlink (DL) may be sent together within the TWT window 820, so this increases the pose Rx to Render start latency. The DL can be transmitted when the next TWT window 820 opens, and thus, there may be some additional latency that is added. Also, diagram 800 illustrates that rendering may start before or after the TWT window 820. Diagram 850 depicts that there is a small latency between pose Rx to render start time. Also, there is a DL wait before the transmission. Diagram 850 depicts that rendering may start in between TWT window 820. So during runtime, if there is a switch between sending poses before or after DL, that may need a renegotiation of the TWT window and that comes at a cost of some latency.

FIG. 8 shows the impact of TWT on the latency of pose transmission and rendering. For instance, when using a TWT window, sending a single pose within the TWT window may increase the latency. For example, if the pose is sent at the beginning or the end of the TWT window, this may result in increased latency (e.g., m2r2p latency). That is, UL and DL may be sent together within the TWT window, which may increase the latency between the pose Rx to render start time. Also, if the DL can be transmitted when the next TWT window opens, there may be some additional latency that is added. Based on the above, it may be beneficial to transmit a pose multiple times during a TWT window. For instance, it may be beneficial to transmit a pose at a beginning of a TWT window and at an end of the TWT window. Also, it may be beneficial to utilize multiple TWT windows for pose transmission.

Aspects of the present disclosure may transmit a pose multiple times during a TWT window. For instance, aspects presented herein may transmit a pose at a beginning of a TWT window and at an end of the TWT window. That is, aspects presented herein may allow a renderer to select one of multiple poses at a beginning and an end of a TWT window. By doing so, aspects presented herein may allow a renderer to select a latest pose, which may result in reduced latency. Additionally, aspects of the present disclosure may utilize multiple TWT windows for pose transmission. For example, aspects of the present disclosure may transmit a pose during a first TWT window, and then transmit another pose during a second TWT window. That is, aspects presented herein may allow a renderer to select one pose within a first TWT window or another pose within a second TWT window. By doing so, aspects presented herein may allow a renderer to select a latest pose, which may result in reduced latency.

Figure 9:
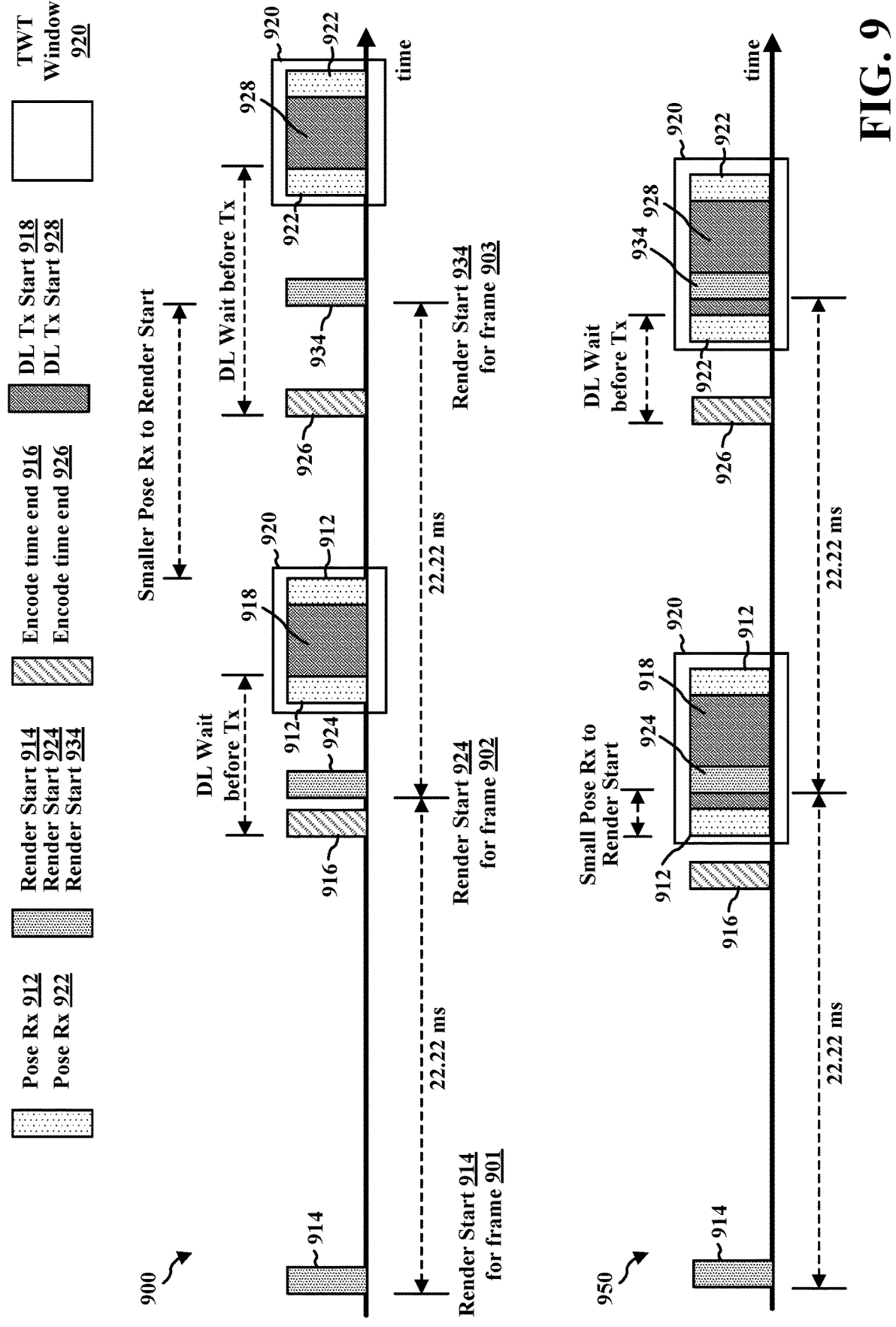
FIG. 9 includes diagrams illustrating example timelines of a rendering process.

FIG. 9 includes diagram 900 and diagram 950 illustrating example timelines of a rendering process. More specifically, diagram 900 and diagram 950 depict timelines of a split rendering process with varying rendering times and a target wake time. As shown in FIG. 9, diagram 900 includes pose reception (Rx) 912, pose Rx 922, render start time 914 for frame 901, render start time 924 for frame 902, render start time 934 for frame 903, encode time end 916, encode time end 926, downlink transmission start time 918, downlink transmission start time 928, and TWT window 920. Diagram 900 depicts that there is a 22.22 ms time between render start time 914 for frame 901 and render start time 924 for frame 902, as well as between render start time 924 for frame 902 and render start time 934 for frame 903. There is a DL wait time between encode time end 916 and pose Rx 912. Also, there is a DL wait time between encode time end 926 and pose Rx 922. Further, there is a small latency between pose Rx 912 and render start time 934 for frame 903. Moreover, TWT window 920 includes two instances of pose Rx 912, as well as downlink transmission start time 918. For example, pose Rx 912 is at the beginning of TWT window 920 and at the end of TWT window 920. Further, TWT window 920 includes two instances of pose Rx 922, as well as downlink transmission start time 928. For example, pose Rx 922 is at the beginning of TWT window 920 and at the end of TWT window 920.

Diagram 900 depicts a TWT design where a pose Rx 912 is sent at a beginning of TWT window 920, then a downlink is sent, and then another pose Rx 912 is sent at an end of TWT window 920. For instance, multiple pose Rx 912 may be sent together within the TWT window 920, so this may reduce the latency. That is, aspects presented herein may allow a renderer to select one pose within a first TWT window or another pose within a second TWT window. By doing so, aspects presented herein may allow a renderer to select a latest pose, which may result in reduced latency. The DL can be transmitted between the pose Rx 912 in the TWT window 920. Diagram 900 depicts that a pose may be sent, then a DL, and another pose again, then the latest pose may be selected by the renderer, which may reduce latency. The renderer may start before or after the TWT window. Diagram 900 illustrates that UL and DL may be sent together within the TWT window 920. Also, the DL may be transmitted when the next TWT window opens.

Diagram 950 depicts that rendering may start in between TWT window 920. For instance, TWT window may include two instances of pose Rx 912, downlink transmission start time 918, and render start time 924. For example, the pose Rx 912 may be sent at the beginning and the end of TWT window 920. There is a small latency between pose Rx 912 and render start time 924 for frame 902. There is also a DL wait time between encode time end 926 and pose Rx 922. As shown in diagram 950, by sending poses at a beginning and end of TWT window, aspects presented herein may achieve a best pose Rx to render start latency irrespective of where render starts. If the pose is just sent at the beginning of the TWT window 920, then the latency may be large. However, sending a pose at the beginning and end of TWT window 920 reduces the latency. That is, FIG. 9 shows that aspects presented herein may allow a renderer to select one pose within a TWT window 920 or another pose within the TWT window. By doing so, aspects presented herein may allow a renderer to select a latest pose, which may result in reduced latency. Indeed, sending a pose at the beginning and end of TWT window 920 reduces latency because the TWT window may be aligned close to the rendering start, such that the pose receiver render start latency may be reduced. FIG. 9 depicts the impact of TWT on M2R2P with a varied rendering time.

Figure 10:
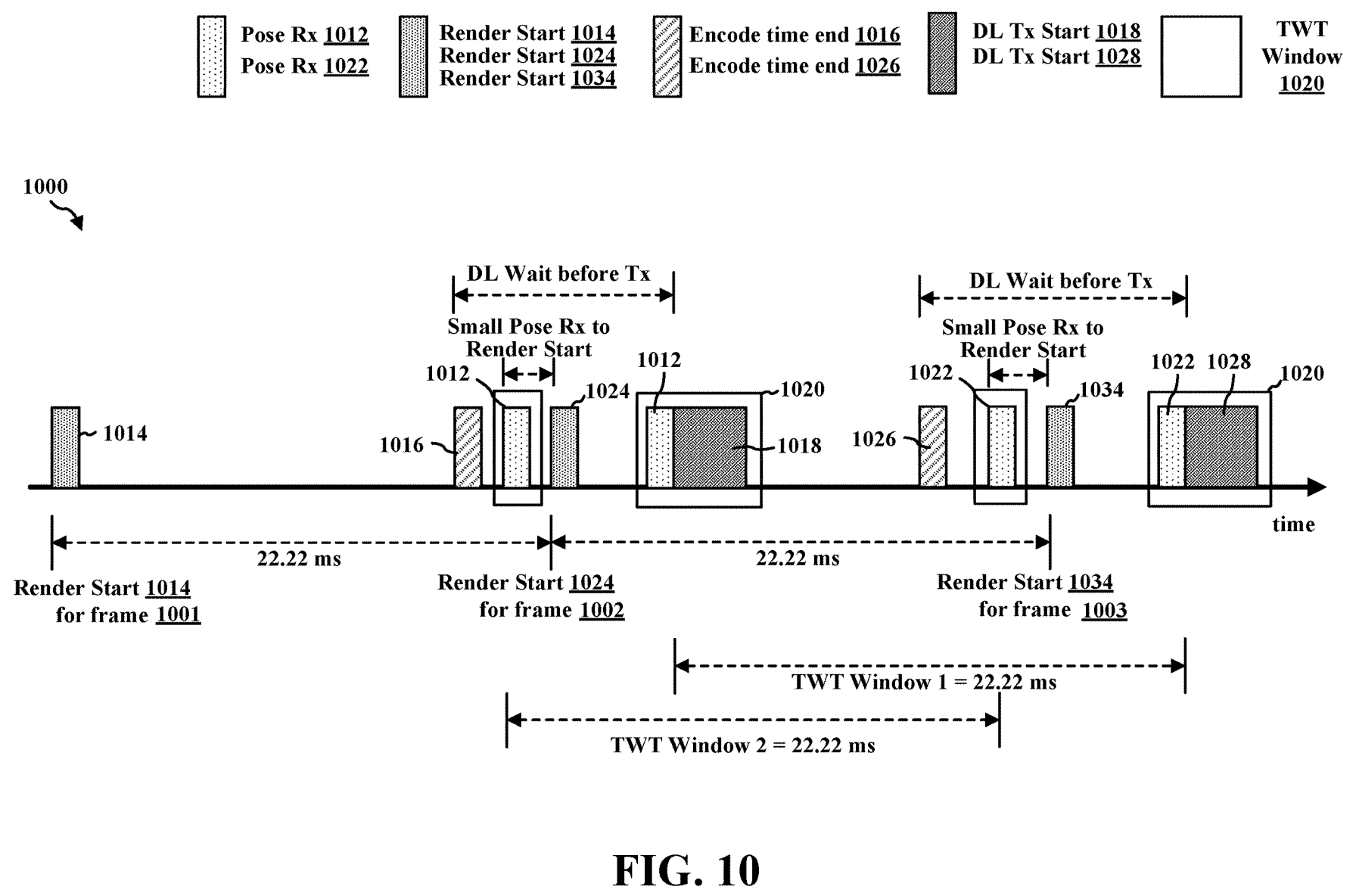

FIG. 10 includes diagram 1000 illustrating an example timeline of a rendering process. More specifically, diagram 1000 depicts a timeline of a split rendering process with varying rendering times and a target wake time. As shown in FIG. 10, diagram 1000 includes pose reception (Rx) 1012, pose Rx 1022, render start time 1014 for frame 1001, render start time 1024 for frame 1002, render start time 1034 for frame 1003, encode time end 1016, encode time end 1026, downlink transmission start time 1018, downlink transmission start time 1028, and TWT window 1020. Diagram 1000 depicts that there is a 22.22 ms time between render start time 1014 for frame 1001 and render start time 1024 for frame 1002, as well as between render start time 1024 for frame 1002 and render start time 1034 for frame 1003. There is a DL wait time between encode time end 1016 and pose Rx 1012. Also, there is a DL wait time between encode time end 1026 and pose Rx 1022. There is a small latency between pose Rx 1012 and render start time 1024 for frame 1002. Further, there is a small latency between pose Rx 1022 and render start time 1034 for frame 1003. Moreover, there are multiple instances of TWT window 1020 each including an instance of pose Rx 1012, as well as downlink transmission start time 1018 in one instance of TWT window 1020. For example, pose Rx 1012 is at the first instance of TWT window 1020 and pose Rx 1012 is at the second instance of TWT window 1020. Further, there are multiple instances of TWT window 1020 each including an instance of pose Rx 1022, as well as downlink transmission start time 1028 in one instance of TWT window 1020. For example, pose Rx 1022 is at the first instance of TWT window 1020 and pose Rx 1022 is at the second instance of TWT window 1020.

FIG. 10 depicts that aspects presented herein may send pose and DL in one TWT window 1020 and another pose in another TWT window 1020. By sending poses in two TWT windows, aspects presented herein may minimize the render start latency. The first TWT window 1020 may be aligned with the render start such that the pose receive time-to-render start time is minimized. The second TWT window is aligned with the DL start to reduce the DL wait time. Moreover, since UL has a separate TWT window 1020, aspects presented herein may synchronize this window to render start and minimize the latency between pose Rx time to render start time. As shown in FIG. 10, by sending poses in multiple TWT windows, aspects presented herein may achieve a best pose Rx to render start latency irrespective of where render starts. If the pose is just sent in one TWT window 1020, then the latency may be large. However, sending a pose in multiple instances of TWT window 1020 reduces the latency. That is, FIG. 10 shows that aspects presented herein may allow a renderer to select one pose within a TWT window 1020 or another pose within another TWT window 1020. By doing so, aspects presented herein may allow a renderer to select a latest pose, which may result in reduced latency. Indeed, sending a pose in multiple instances of TWT window 1020 reduces latency because the TWT window may be aligned close to the rendering start, such that the pose receiver render start latency may be reduced. FIG. 10 also depicts the impact of TWT on M2R2P with a varied rendering time.

In some aspects, both pose Rx to render start time and encoded frame being ready (render frame) to its transmission may be optimized for overall m2r2p optimization. Aspects presented herein may optimize the impact of various server processing time (render+encode+socket write time) on M2R2P. Also, aspects presented herein may optimize m2r2p by jointly optimizing pose Rx to render time and also DL wait time (frame ready to frame Tx). That is, if it is optimized jointly pose Rx to render time and also DL wait time, then the optimal point may be dependent on both pose Rx to render start and DL wait time. In some instances, aspects presented herein may relate to power optimization using TWT for split XR. For instance, aspects presented herein may optimize the processing time between a server and a client, and then allow a modem to remain in sleep mode for a remaining time period. In order to meet TWT, aspects presented herein may propose that rendering should start at some offset relative to the TWT start.

Figure 11:
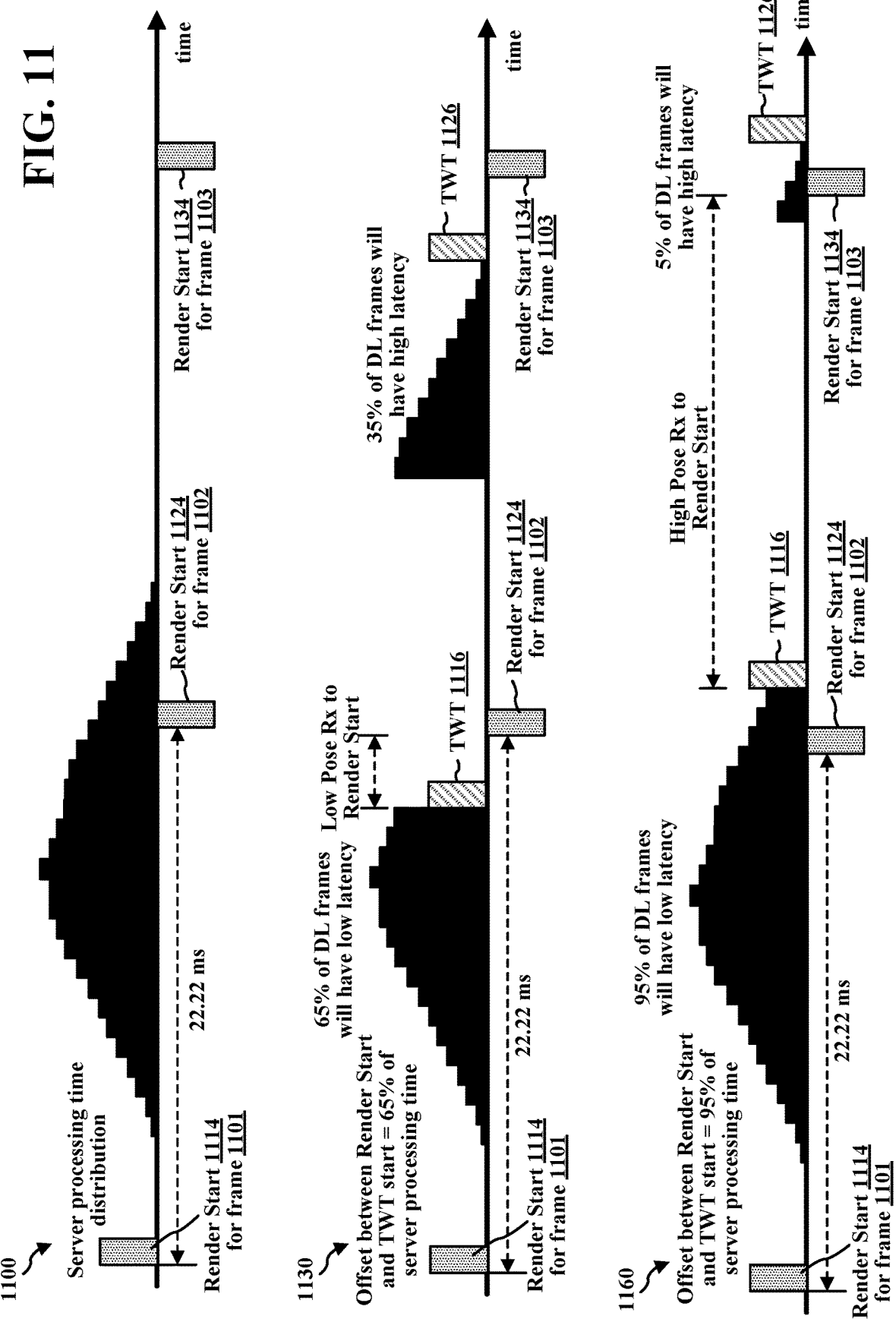
FIG. 11 includes diagrams illustrating example timelines of a rendering process.

FIG. 11 includes diagram 1100, diagram 1130, and diagram 1160 illustrating example timelines of a rendering process. More specifically, diagram 1100, diagram 1130, and diagram 1160 depict timelines of a split rendering process with varying rendering times and a target wake time. As shown in FIG. 11, diagram 1100, diagram 1130, and diagram 1160 include render start time 1114 for frame 1101, render start time 1124 for frame 1102, render start time 1134 for frame 1103, TWT 1116, and TWT 1126. Diagram 1100, diagram 1130, and diagram 1160 depict that there is a 22.22 ms time between render start time 1114 for frame 1101 and render start time 1124 for frame 1102, as well as between render start time 1124 for frame 1102 and render start time 1134 for frame 1103. Diagram 1100 depicts a server processing time distribution without any offset. Diagram 1130 depicts an offset between the render start time and the TWT start time of 65% of a server processing time distribution. Thus, 65% of DL frames may have a low latency, while 35% of DL frames may have a high latency. Diagram 1160 depicts an offset between the render start time and the TWT start time of 95% of a server processing time distribution. Thus, 95% of DL frames may have a low latency, while 5% of DL frames may have a high latency. There is also a high pose Rx to render start time in diagram 1160.

FIG. 11 depicts the impact of choosing different percentiles for offset between render start times and TWT start times. As shown in FIG. 11, aspects presented herein may determine an optimal point to minimize the pose Rx to Render start+DL wait in order to achieve the best latency for any TWT system design. Additionally, FIG. 11 shows that aspects presented herein may select the offset between the rendering start and the TWT start, such that aspects presented herein may minimize the pose received-to-render start latency and the DL wait latency. So aspects presented herein may try to minimize both of these latencies. Aspects presented herein may do this by observing the server processing latencies and the channel characteristics, and then determine the optimal point based on these latencies.

Figure 12:
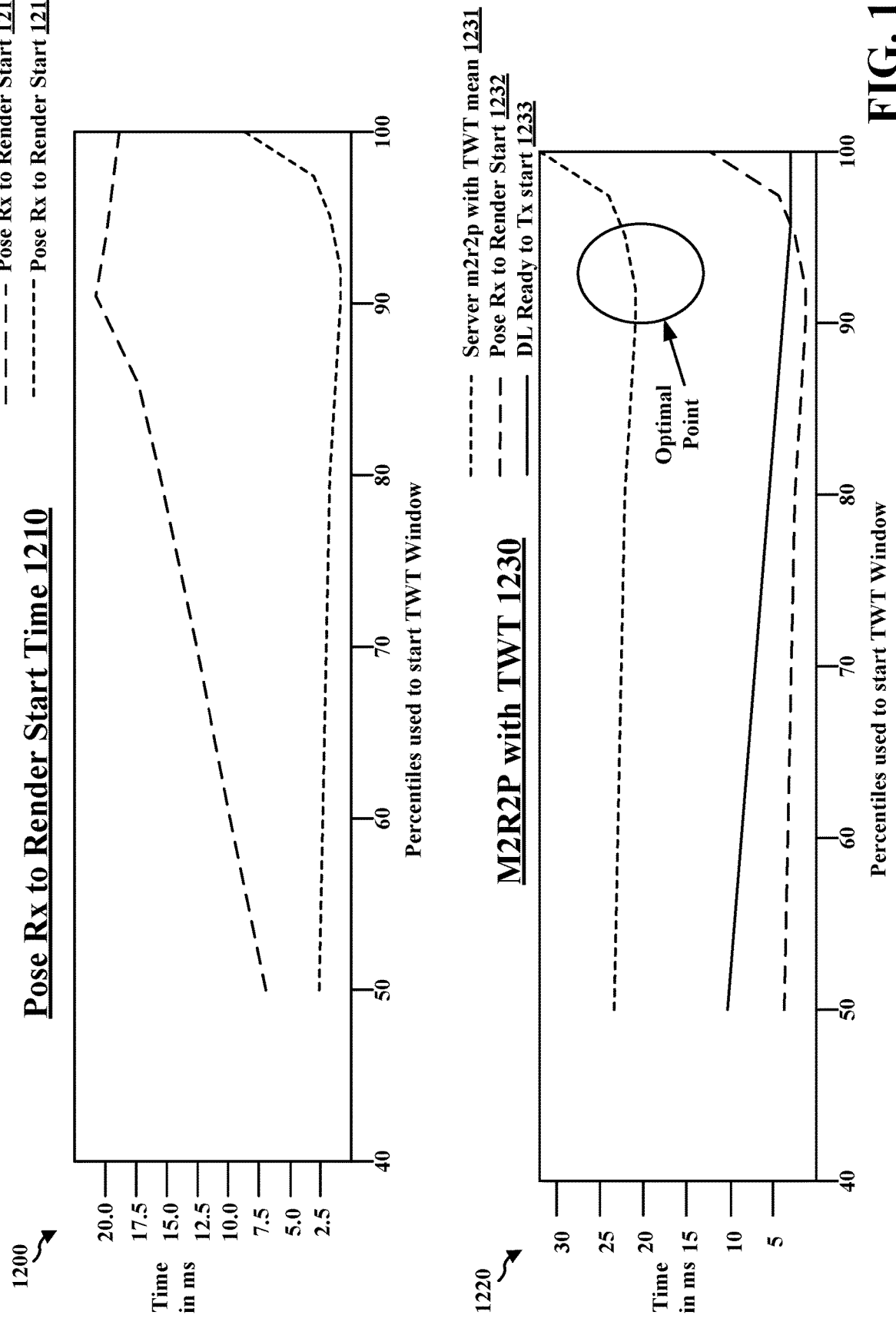
FIG. 12 includes graphs illustrating examples of a server processing time.

FIG. 12 includes graph 1200 and graph 1220 illustrating an example of a server processing time. More specifically, graph 1200 depicts a pose Rx to render start time 1210 and graph 1220 depicts a m2r2p time with a TWT window 1230. As shown in FIG. 12, graph 1200 and graph 1220 include a percentile used to start a TWT window on the x-axis and a time in ms on the y-axis. Graph 1200 depicts a pose Rx to render start time 1211, as well as pose Rx to render start time 1212. Graph 1220 depicts a server m2r2p with a TWT mean 1231, a pose Rx to render start time 1232, and a DL ready to Tx start time 1233. FIG. 12 shows that by observing the server processing latencies and the channel characteristics, aspects presented herein may determine the optimal point based on these latencies (e.g., the optimal point on server m2r2p with a TWT mean 1231). Also, aspects presented herein may optimize m2r2p by jointly optimizing pose Rx to render time and DL wait time (i.e., frame ready to frame Tx time). Further, FIG. 12 shows that with joint optimization, the M2R2P may be optimized compared to M2R2P without joint optimization.

Figure 13:
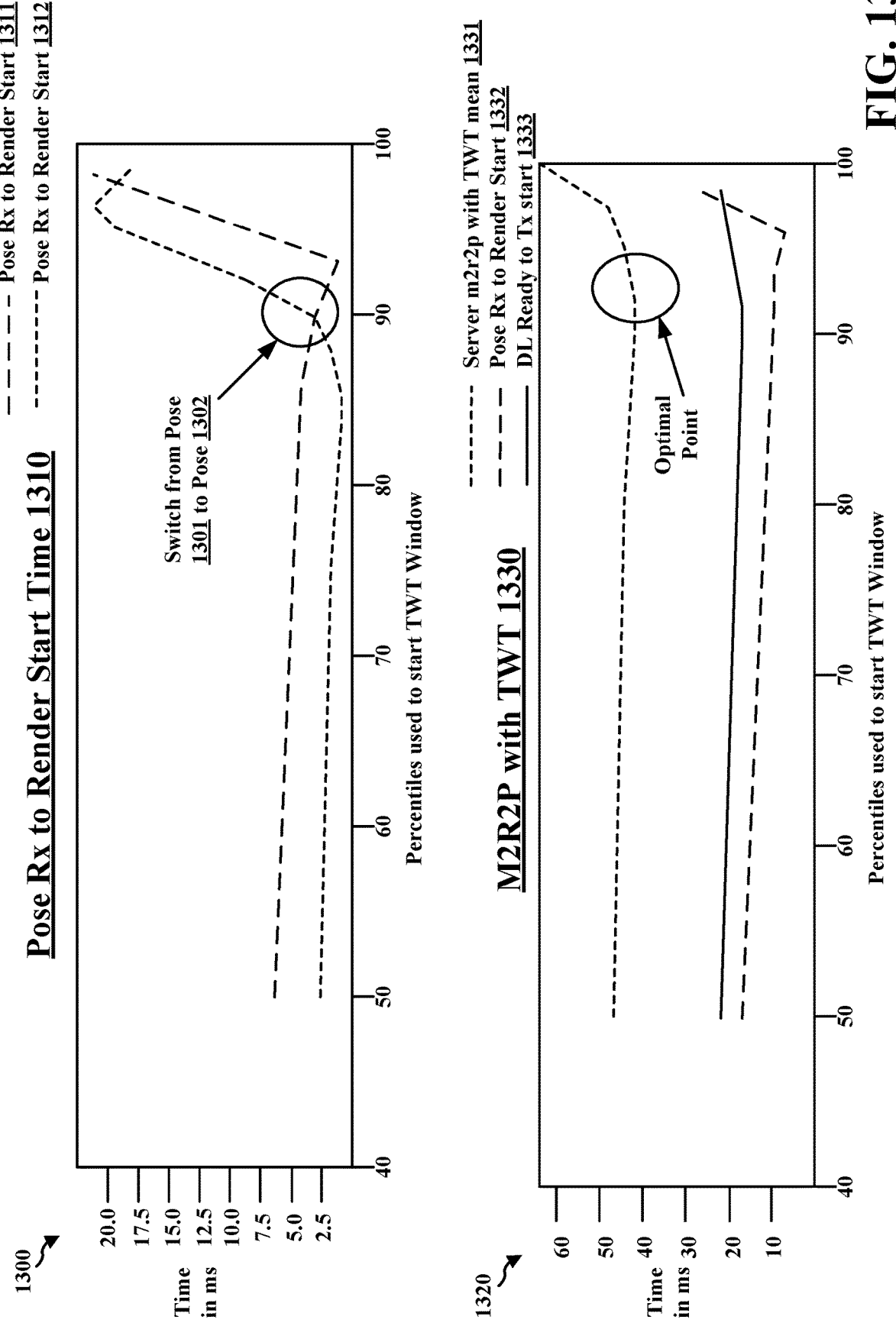
FIG. 13 includes graphs illustrating examples of a server processing time.

FIG. 13 includes graph 1300 and graph 1320 illustrating an example of a server processing time. More specifically, graph 1300 depicts a pose Rx to render start time 1310 and graph 1320 depicts a m2r2p time with a TWT window 1330. As shown in FIG. 13, graph 1300 and graph 1320 include a percentile used to start a TWT window on the x-axis and a time in ms on the y-axis. Graph 1300 depicts a pose 1301 Rx to render start time 1311, as well as pose 1302 Rx to render start time 1312. Graph 1320 depicts a server m2r2p with a TWT mean 1331, a pose Rx to render start time 1332, and a DL ready to Tx start time 1333. FIG. 13 shows that two poses may help to reduce the latency and achieve the best pose Rx to render start latency irrespective of when the render starts.

Additionally, FIG. 13 depicts that aspects presented herein may optimize m2r2p by jointly optimizing pose Rx to render time and DL wait time (i.e., frame ready to frame Tx time). Moreover, FIG. 13 shows that with joint optimization, the M2R2P may be optimized compared to M2R2P without joint optimization.

Figure 14:
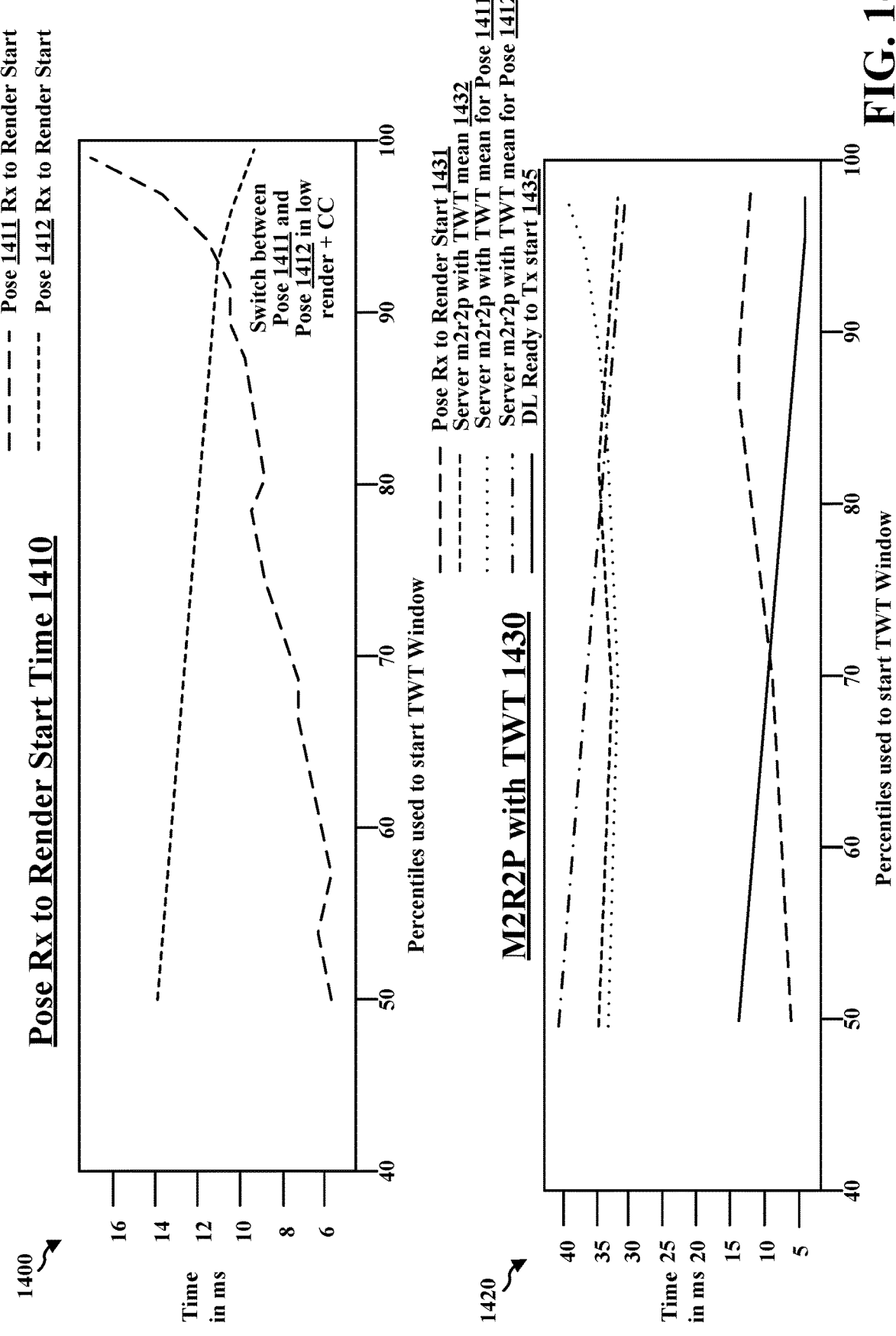
FIG. 14 includes graphs illustrating examples of a server processing time.

FIG. 14 includes graph 1400 and graph 1420 illustrating an example of a server processing time. More specifically, graph 1400 depicts a pose Rx to render start time 1410 and graph 1420 depicts a m2r2p time with a TWT window 1430. As shown in FIG. 14, graph 1400 and graph 1420 include a percentile used to start a TWT window on the x-axis and a time in ms on the y-axis. Graph 1400 depicts a pose 1411 Rx to render start time, as well as pose 1412 Rx to render start time. Graph 1420 depicts a pose Rx to render start time 1431, a server m2r2p with a TWT mean 1432, a server m2r2p with a TWT mean for pose 1411, a server m2r2p with a TWT mean for pose 1412, and a DL ready to Tx start time 1435. FIG. 14 shows that two poses may help to reduce the latency and jitter (e.g., interference at the network), such as latency with varying latencies (e.g., network latencies). By doing so, aspects presented herein may achieve the best pose Rx to render start latency irrespective of when the render starts. Also, aspects presented herein may optimize m2r2p by jointly optimizing pose Rx to render time and DL wait time (i.e., frame ready to frame Tx time).

Figure 15:
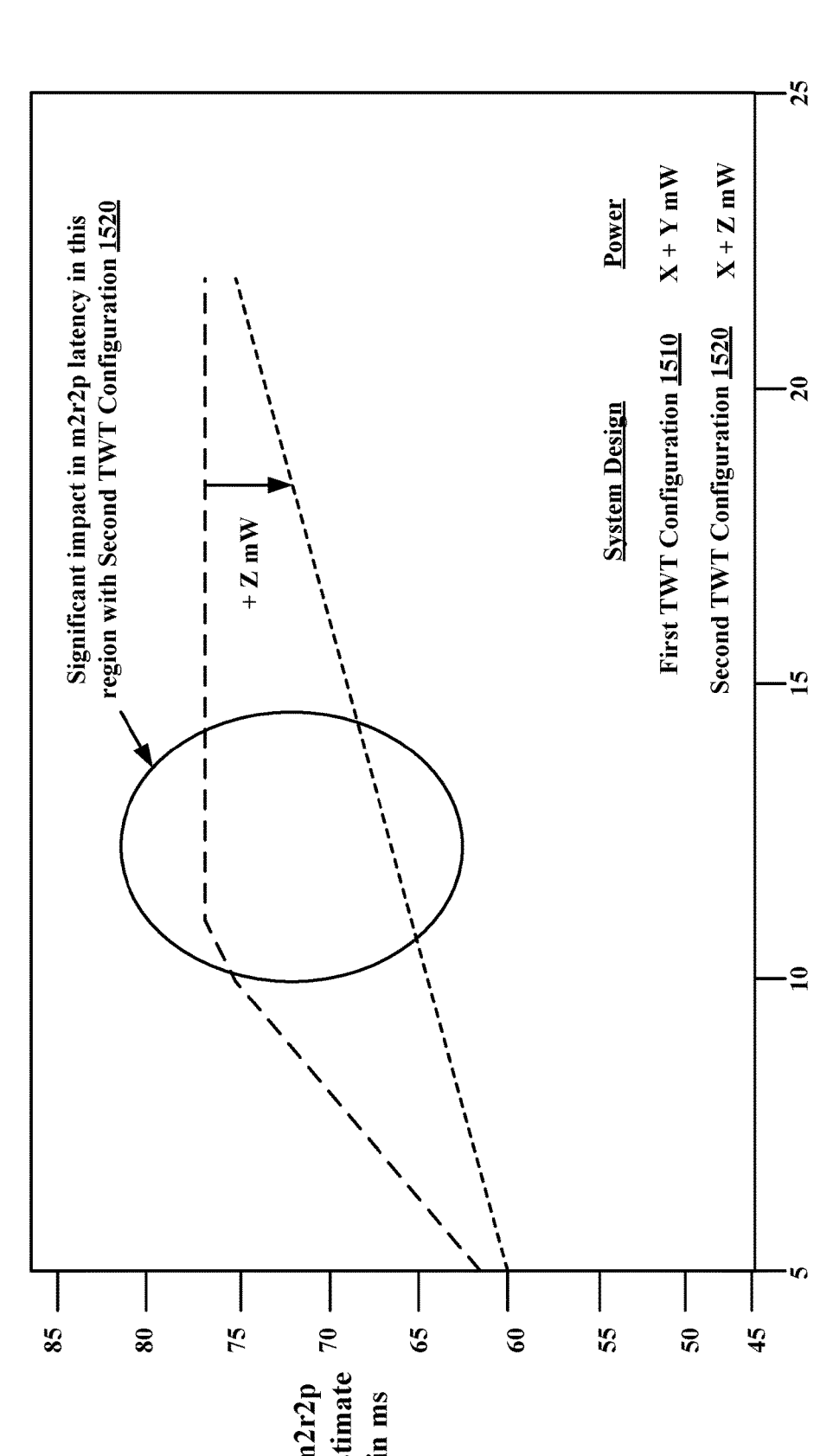
FIG. 15 is a graph illustrating an example of a rendering time compared to a motion-to-render-to-photon (m2r2p) time.

FIG. 15 is a graph 1500 illustrating an example of a rendering time compared to a motion-to-render-to-photon (m2r2p) time. More specifically, graph 1500 depicts the impact of rendering time on m2r2p with different TWT system designs. As shown in FIG. 15, graph 1500 includes first TWT configuration 1510 and second TWT configuration 1520. Graph 1500 includes a rendering time in ms on the x-axis and a m2r2p estimate in ms on the y-axis. FIG. 15 depicts that aspects presented herein may dynamically select between first TWT configuration 1510 and second TWT configuration 1520 in order to achieve the ideal latency. FIG. 15 depicts that aspects presented herein may optimize the latency and the power utilized. Indeed, first TWT configuration 1510 and second TWT configuration 1520 both have a low latency and a low power utilized. For instance, in first TWT configuration 1510, the power may be equivalent to a certain amount of power (e.g., X+Y mW). Also, in second TWT configuration 1520, the power may be equivalent to another amount of power (e.g., X+Z mW). A TWT configuration may refer to a configuration that is associated with a TWT. For instance, a TWT configuration may refer to a TWT window or a pose within a TWT window. For example, selecting a first TWT configuration or a second TWT configuration may refer to selecting a pose within a first TWT window or another pose within a second TWT window.

Based on the rendering time of the application which can vary (e.g., from 6 ms to 20 ms for 45 fps use case), aspects presented herein may decide on the number of TWT windows that need to be used in a cycle. From simulations, aspects presented herein may determine that 2 TWT windows provides maximum benefit in latency depending on the rendering time (e.g., when rendering time is between 11 ms to 15 ms). When rendering time is not a certain duration (e.g., between 11 ms to 15 ms) aspects presented herein may use a single TWT window. When aspects presented herein use single TWT window, aspects presented herein may decide on the numbers of poses to Tx based on the rendering time. When aspects presented herein use 2 TWT windows, aspects presented herein may send Pose and DL in a 1st window and another pose in a 2nd window. Also, when aspects presented herein use 2 TWT windows, aspects presented herein may send Pose, UL camera frames, and DL in a 1st window and another pose in a 2nd window. Aspects presented herein may also send Pose and DL in a 1st window and another pose and UL camera frames in a 2nd window. The offset between rendering and a 1st TWT window may be determined based on an optimization. Also, the offset between 1st and 2nd TWT windows may be decided based on Pose Rx to render start latency or UL camera latency. When aspects presented herein use 1 TWT window, aspects presented herein may send a Pose and UL at the beginning of the TWT window, then the DL and then send another pose at the end of the TWT window. Aspects presented herein can determine that a system design may have similar latencies during a certain rendering time (e.g., when rendering time is around 7-10 ms). This may indicate that the pose at the beginning of the window is used when rendering latencies are low (less than 10 ms). Also, aspects presented herein may determine that there is an improvement with certain designs during a certain rendering time (e.g., when rendering time is between 10-20 ms). This may indicate that the pose at the end of the window is used when rendering latencies are high (greater than 10 ms).

Aspects of the present disclosure may include a number of benefits or advantages. For instance, aspects presented herein may allow a renderer to select one of multiple poses at a beginning and an end of a TWT window. By doing so, aspects presented herein may allow a renderer to select a latest pose, which may result in reduced latency. Additionally, aspects of the present disclosure may utilize multiple TWT windows for pose transmission. For example, aspects of the present disclosure may transmit a pose during a first TWT window, and then transmit another pose during a second TWT window. That is, aspects presented herein may allow a renderer to select one pose within a first TWT window or another pose within a second TWT window. By doing so, aspects presented herein may allow a renderer to select a latest pose, which may result in reduced latency.

Figure 16:
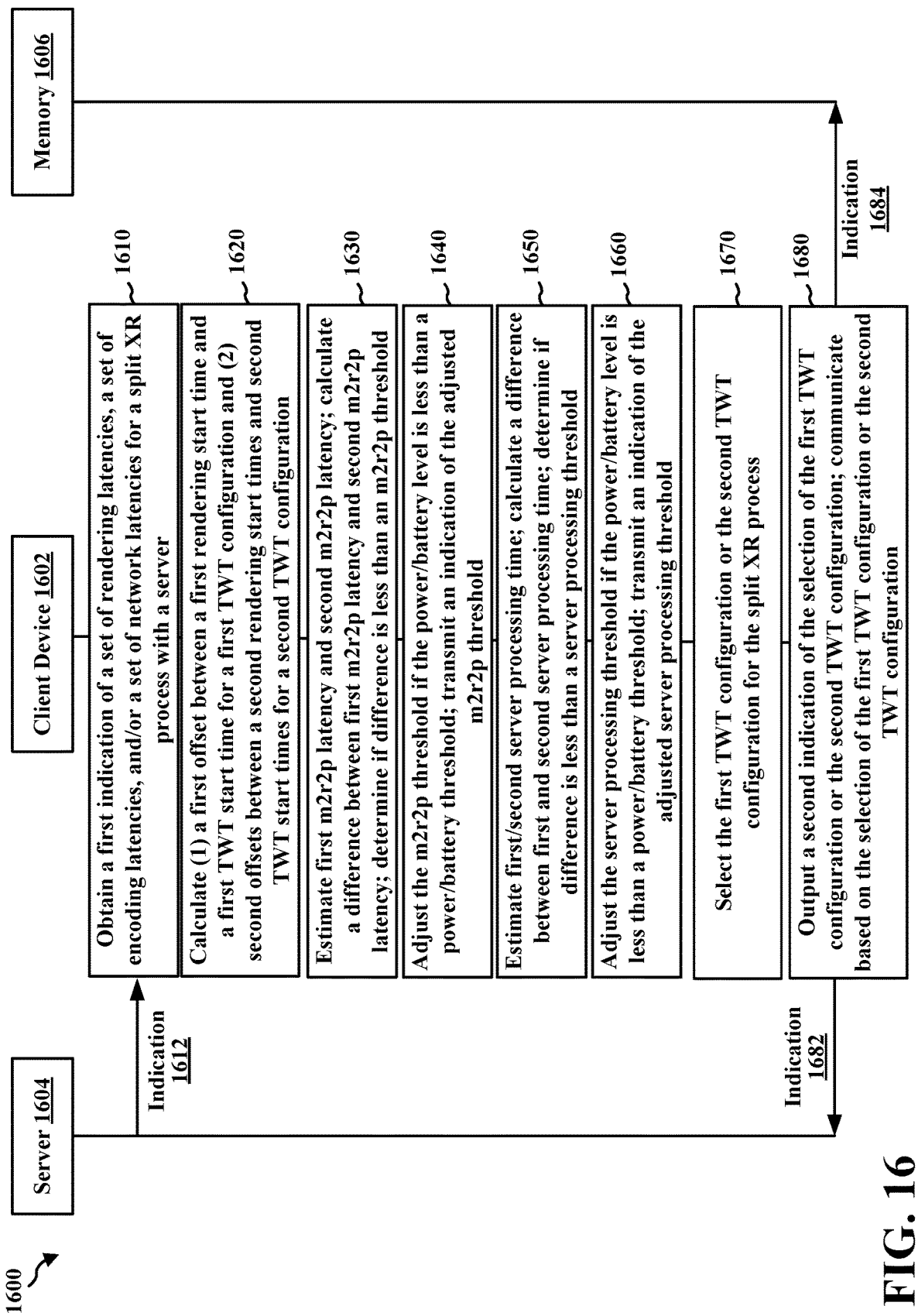
FIG. 16 is a communication flow diagram illustrating example communications between a client device, a server, and a memory.

FIG. 16 is a communication flow diagram 1600 of display processing in accordance with one or more techniques of this disclosure. As shown in FIG. 16, diagram 1600 includes example communications between client device 1602 (e.g., a client, a headset, an HMD, AR glasses, a server, a phone, or a smartphone), server 1604 (e.g., a server, a phone, a smartphone, a client, a headset, an HMD, or AR glasses), and memory 1606 (e.g., a memory or a cache), in accordance with one or more techniques of this disclosure.

At 1610, client device 1602 may obtain a first indication of at least one of a set of rendering latencies, a set of encoding latencies, or a set of network latencies for a split extended reality (XR) process with a server (e.g., client device 1602 may obtain indication 1612 from server 1604). In some aspects, obtaining the first indication of at least one of the set of rendering latencies, the set of encoding latencies, or the set of network latencies may comprise receiving, from the server or at least one compute device, the first indication of at least one of the set of rendering latencies, the set of encoding latencies, or the set of network latencies. Also, the split XR process may include at least one of (1) a split XR pipeline between the client device and the server or (2) at least one split XR application running on the client device. Further, the set of rendering latencies may be a set of rendering statistics associated with latencies for the split XR process with the server, the set of encoding latencies may be a set of encoding statistics associated with the latencies for the split XR process with the server, and the set of network latencies may be a set of network statistics associated with the latencies for the split XR process with the server.

At 1620, client device 1602 may calculate, based on the first indication, (1) a first offset between a first rendering start time and a first target wake time (TWT) start time for a first TWT configuration and (2) a set of second offsets between a set of second rendering start times and a set of second TWT start times for a second TWT configuration, where the first TWT configuration includes one TWT window and the second TWT configuration includes two TWT windows. In some aspects, calculating the first offset between the first rendering start time and the first TWT start time for the first TWT configuration may comprise calculating a difference between the first rendering start time and the first TWT start time. Also, calculating the set of second offsets between the set of second rendering start times and the set of second TWT start times for the second TWT configuration may comprise calculating a difference between an initial second rendering start time and an initial second TWT start time; and calculating a difference between at least one subsequent second rendering start time and at least one subsequent second TWT start time. Further, calculating the set of second offsets between the set of second rendering start times and the set of second TWT start times for the second TWT configuration may comprise calculating a sum of the difference between the initial second rendering start time and the initial second TWT start time and the difference between the at least one subsequent second rendering start time and the at least one subsequent second TWT start time.

At 1630, client device 1602 may estimate, based on the calculation of the first offset and the set of second offsets, a first motion-to-render-to-photon (m2r2p) latency for the first TWT configuration and a second m2r2p latency for the second TWT configuration.

Also, at 1630, client device 1602 may calculate a difference between the first m2r2p latency for the first TWT configuration and the second m2r2p latency for the second TWT configuration; and determine whether the difference is less than an m2r2p threshold. In some aspects, selecting the first TWT configuration or the second TWT configuration may comprise selecting the first TWT configuration or the second TWT configuration based on the determination of whether the difference is less than the m2r2p threshold. Also, the m2r2p threshold may be associated with a power level at the client device or a battery level at the client device.

At 1640, client device 1602 may adjust the m2r2p threshold if the power level at the client device is less than a power threshold or if the battery level at the client device is less than a battery threshold; and transmit, to the server, an indication of the adjusted m2r2p threshold if the power level at the client device is less than the power threshold or if the battery level at the client device is less than the battery threshold.

At 1650, client device 1602 may estimate, based on the calculation of the first offset and the set of second offsets, a first server processing time for the first TWT configuration and a second server processing time for the second TWT configuration.

Also, at 1650, client device 1602 may calculate a difference between the first server processing time for the first TWT configuration and the second server processing time for the second TWT configuration; and determine whether the difference is less than a server processing threshold. In some aspects, selecting the first TWT configuration or the second TWT configuration may comprise selecting the first TWT configuration or the second TWT configuration based on the determination of whether the difference is less than the server processing threshold. Also, the processing threshold may be associated with a power level at the client device or a battery level at the client device.

At 1660, client device 1602 may adjust the server processing threshold if the power level at the client device is less than a power threshold or if the battery level at the client device is less than a battery threshold; and transmit, to the server, an indication of the adjusted server processing threshold if the power level at the client device is less than the power threshold or if the battery level at the client device is less than the battery threshold.

At 1670, client device 1602 may select, based on the calculation of the first offset and the set of second offsets, the first TWT configuration or the second TWT configuration for the split XR process with the server.

At 1680, client device 1602 may output a second indication of the selection of the first TWT configuration or the second TWT configuration. In some aspects, outputting the second indication of the selection of the first TWT configuration or the second TWT configuration may comprise transmitting, to a modem at the server, the second indication of the selection of the first TWT configuration or the second TWT configuration (e.g., client device 1602 may transmit indication 1682 to server 1604). Also, outputting the second indication of the selection of the first TWT configuration or the second TWT configuration may comprise storing, in a modem at the client device, the second indication of the selection of the first TWT configuration or the second TWT configuration (e.g., client device 1602 may store indication 1684 in memory 1606).

Also, at 1680, client device 1602 may communicate, with the server via the split XR process, based on the selection of the first TWT configuration or the second TWT configuration.

FIG. 17 is a flowchart 1700 of an example method of display processing in accordance with one or more techniques of this disclosure. The method may be performed by a client device, a headset, HMD, AR glasses, a server, phone, smartphone, a DPU (or other display processor), a CPU (or other central processor), a DPU driver, a DDIC, a GPU (or other graphics processor), an apparatus for display processing, a wireless communication device, and/or any apparatus that may perform frame processing as used in connection with the examples of FIGS. 1-16.

At 1702, the client device may obtain a first indication of at least one of a set of rendering latencies, a set of encoding latencies, or a set of network latencies for a split extended reality (XR) process with a server, as described in connection with the examples in FIGS. 1-16. For example, as described in 1610 of FIG. 16, client device 1602 may obtain a first indication of at least one of a set of rendering latencies, a set of encoding latencies, or a set of network latencies for a split extended reality (XR) process with a server. Further, step 1702 may be performed by display processor 127 in FIG. 1. In some aspects, obtaining the first indication of at least one of the set of rendering latencies, the set of encoding latencies, or the set of network latencies may comprise receiving, from the server or at least one compute device, the first indication of at least one of the set of rendering latencies, the set of encoding latencies, or the set of network latencies. Also, the split XR process may include at least one of (1) a split XR pipeline between the client device and the server or (2) at least one split XR application running on the client device. Further, the set of rendering latencies may be a set of rendering statistics associated with latencies for the split XR process with the server, the set of encoding latencies may be a set of encoding statistics associated with the latencies for the split XR process with the server, and the set of network latencies may be a set of network statistics associated with the latencies for the split XR process with the server.

At 1704, the client device may calculate, based on the first indication, (1) a first offset between a first rendering start time and a first target wake time (TWT) start time for a first TWT configuration and (2) a set of second offsets between a set of second rendering start times and a set of second TWT start times for a second TWT configuration, where the first TWT configuration includes one TWT window and the second TWT configuration includes two TWT windows, as described in connection with the examples in FIGS. 1-16. For example, as described in 1620 of FIG. 16, client device 1602 may calculate, based on the first indication, (1) a first offset between a first rendering start time and a first target wake time (TWT) start time for a first TWT configuration and (2) a set of second offsets between a set of second rendering start times and a set of second TWT start times for a second TWT configuration, where the first TWT configuration includes one TWT window and the second TWT configuration includes two TWT windows. Further, step 1704 may be performed by display processor 127 in FIG. 1. In some aspects, calculating the first offset between the first rendering start time and the first TWT start time for the first TWT configuration may comprise calculating a difference between the first rendering start time and the first TWT start time. Also, calculating the set of second offsets between the set of second rendering start times and the set of second TWT start times for the second TWT configuration may comprise calculating a difference between an initial second rendering start time and an initial second TWT start time; and calculating a difference between at least one subsequent second rendering start time and at least one subsequent second TWT start time. Further, calculating the set of second offsets between the set of second rendering start times and the set of second TWT start times for the second TWT configuration may comprise calculating a sum of the difference between the initial second rendering start time and the initial second TWT start time and the difference between the at least one subsequent second rendering start time and the at least one subsequent second TWT start time.

At 1714, the client device may select, based on the calculation of the first offset and the set of second offsets, the first TWT configuration or the second TWT configuration for the split XR process with the server, as described in connection with the examples in FIGS. 1-16. For example, as described in 1670 of FIG. 16, client device 1602 may select, based on the calculation of the first offset and the set of second offsets, the first TWT configuration or the second TWT configuration for the split XR process with the server. Further, step 1714 may be performed by display processor 127 in FIG. 1.

At 1716, the client device may output a second indication of the selection of the first TWT configuration or the second TWT configuration, as described in connection with the examples in FIGS. 1-16. For example, as described in 1680 of FIG. 16, client device 1602 may output a second indication of the selection of the first TWT configuration or the second TWT configuration. Further, step 1716 may be performed by display processor 127 in FIG. 1. In some aspects, outputting the second indication of the selection of the first TWT configuration or the second TWT configuration may comprise transmitting, to a modem at the server, the second indication of the selection of the first TWT configuration or the second TWT configuration. Also, outputting the second indication of the selection of the first TWT configuration or the second TWT configuration may comprise storing, in a modem at the client device, the second indication of the selection of the first TWT configuration or the second TWT configuration.

Also, at 1716, the client device may communicate, with the server via the split XR process, based on the selection of the first TWT configuration or the second TWT configuration, as described in connection with the examples in FIGS. 1-16. For example, as described in 1680 of FIG. 16, client device 1602 may communicate, with the server via the split XR process, based on the selection of the first TWT configuration or the second TWT configuration. Further, step 1716 may be performed by display processor 127 in FIG. 1.

FIG. 18 is a flowchart 1800 of an example method of display processing in accordance with one or more techniques of this disclosure. The method may be performed by a client device, a headset, HMD, AR glasses, a server, phone, smartphone, a DPU (or other display processor), a CPU (or other central processor), a DPU driver, a DDIC, a GPU (or other graphics processor), an apparatus for display processing, a wireless communication device, and/or any apparatus that may perform frame processing as used in connection with the examples of FIGS. 1-16.

At 1802, the client device may obtain a first indication of at least one of a set of rendering latencies, a set of encoding latencies, or a set of network latencies for a split extended reality (XR) process with a server, as described in connection with the examples in FIGS. 1-16. For example, as described in 1610 of FIG. 16, client device 1602 may obtain a first indication of at least one of a set of rendering latencies, a set of encoding latencies, or a set of network latencies for a split extended reality (XR) process with a server. Further, step 1802 may be performed by display processor 127 in FIG. 1. In some aspects, obtaining the first indication of at least one of the set of rendering latencies, the set of encoding latencies, or the set of network latencies may comprise receiving, from the server or at least one compute device, the first indication of at least one of the set of rendering latencies, the set of encoding latencies, or the set of network latencies. Also, the split XR process may include at least one of (1) a split XR pipeline between the client device and the server or (2) at least one split XR application running on the client device. Further, the set of rendering latencies may be a set of rendering statistics associated with latencies for the split XR process with the server, the set of encoding latencies may be a set of encoding statistics associated with the latencies for the split XR process with the server, and the set of network latencies may be a set of network statistics associated with the latencies for the split XR process with the server.

At 1804, the client device may calculate, based on the first indication, (1) a first offset between a first rendering start time and a first target wake time (TWT) start time for a first TWT configuration and (2) a set of second offsets between a set of second rendering start times and a set of second TWT start times for a second TWT configuration, where the first TWT configuration includes one TWT window and the second TWT configuration includes two TWT windows, as described in connection with the examples in FIGS. 1-16. For example, as described in 1620 of FIG. 16, client device 1602 may calculate, based on the first indication, (1) a first offset between a first rendering start time and a first target wake time (TWT) start time for a first TWT configuration and (2) a set of second offsets between a set of second rendering start times and a set of second TWT start times for a second TWT configuration, where the first TWT configuration includes one TWT window and the second TWT configuration includes two TWT windows. Further, step 1804 may be performed by display processor 127 in FIG. 1. In some aspects, calculating the first offset between the first rendering start time and the first TWT start time for the first TWT configuration may comprise calculating a difference between the first rendering start time and the first TWT start time. Also, calculating the set of second offsets between the set of second rendering start times and the set of second TWT start times for the second TWT configuration may comprise calculating a difference between an initial second rendering start time and an initial second TWT start time; and calculating a difference between at least one subsequent second rendering start time and at least one subsequent second TWT start time. Further, calculating the set of second offsets between the set of second rendering start times and the set of second TWT start times for the second TWT configuration may comprise calculating a sum of the difference between the initial second rendering start time and the initial second TWT start time and the difference between the at least one subsequent second rendering start time and the at least one subsequent second TWT start time.

At 1806, the client device may estimate, based on the calculation of the first offset and the set of second offsets, a first motion-to-render-to-photon (m2r2p) latency for the first TWT configuration and a second m2r2p latency for the second TWT configuration, as described in connection with the examples in FIGS. 1-16. For example, as described in 1630 of FIG. 16, client device 1602 may estimate, based on the calculation of the first offset and the set of second offsets, a first motion-to-render-to-photon (m2r2p) latency for the first TWT configuration and a second m2r2p latency for the second TWT configuration. Further, step 1806 may be performed by display processor 127 in FIG. 1.

Also, at 1806, the client device may calculate a difference between the first m2r2p latency for the first TWT configuration and the second m2r2p latency for the second TWT configuration; and determine whether the difference is less than an m2r2p threshold, as described in connection with the examples in FIGS. 1-16. For example, as described in 1630 of FIG. 16, client device 1602 may calculate a difference between the first m2r2p latency for the first TWT configuration and the second m2r2p latency for the second TWT configuration; and determine whether the difference is less than an m2r2p threshold. Further, step 1806 may be performed by display processor 127 in FIG. 1. In some aspects, selecting the first TWT configuration or the second TWT configuration may comprise selecting the first TWT configuration or the second TWT configuration based on the determination of whether the difference is less than the m2r2p threshold. Also, the m2r2p threshold may be associated with a power level at the client device or a battery level at the client device.

At 1808, the client device may adjust the m2r2p threshold if the power level at the client device is less than a power threshold or if the battery level at the client device is less than a battery threshold; and transmit, to the server, an indication of the adjusted m2r2p threshold if the power level at the client device is less than the power threshold or if the battery level at the client device is less than the battery threshold, as described in connection with the examples in FIGS. 1-16. For example, as described in 1640 of FIG. 16, client device 1602 may adjust the m2r2p threshold if the power level at the client device is less than a power threshold or if the battery level at the client device is less than a battery threshold; and transmit, to the server, an indication of the adjusted m2r2p threshold if the power level at the client device is less than the power threshold or if the battery level at the client device is less than the battery threshold. Further, step 1808 may be performed by display processor 127 in FIG. 1.

At 1810, the client device may estimate, based on the calculation of the first offset and the set of second offsets, a first server processing time for the first TWT configuration and a second server processing time for the second TWT configuration, as described in connection with the examples in FIGS. 1-16. For example, as described in 1650 of FIG. 16, client device 1602 may estimate, based on the calculation of the first offset and the set of second offsets, a first server processing time for the first TWT configuration and a second server processing time for the second TWT configuration. Further, step 1810 may be performed by display processor 127 in FIG. 1.

Also, at 1810, the client device may calculate a difference between the first server processing time for the first TWT configuration and the second server processing time for the second TWT configuration; and determine whether the difference is less than a server processing threshold, as described in connection with the examples in FIGS. 1-16. For example, as described in 1650 of FIG. 16, client device 1602 may calculate a difference between the first server processing time for the first TWT configuration and the second server processing time for the second TWT configuration; and determine whether the difference is less than a server processing threshold. Further, step 1810 may be performed by display processor 127 in FIG. 1. In some aspects, selecting the first TWT configuration or the second TWT configuration may comprise selecting the first TWT configuration or the second TWT configuration based on the determination of whether the difference is less than the server processing threshold. Also, the processing threshold may be associated with a power level at the client device or a battery level at the client device.

At 1812, the client device may adjust the server processing threshold if the power level at the client device is less than a power threshold or if the battery level at the client device is less than a battery threshold; and transmit, to the server, an indication of the adjusted server processing threshold if the power level at the client device is less than the power threshold or if the battery level at the client device is less than the battery threshold, as described in connection with the examples in FIGS. 1-16. For example, as described in 1660 of FIG. 16, client device 1602 may adjust the server processing threshold if the power level at the client device is less than a power threshold or if the battery level at the client device is less than a battery threshold; and transmit, to the server, an indication of the adjusted server processing threshold if the power level at the client device is less than the power threshold or if the battery level at the client device is less than the battery threshold. Further, step 1812 may be performed by display processor 127 in FIG. 1.

At 1814, the client device may select, based on the calculation of the first offset and the set of second offsets, the first TWT configuration or the second TWT configuration for the split XR process with the server, as described in connection with the examples in FIGS. 1-16. For example, as described in 1670 of FIG. 16, client device 1602 may select, based on the calculation of the first offset and the set of second offsets, the first TWT configuration or the second TWT configuration for the split XR process with the server. Further, step 1814 may be performed by display processor 127 in FIG. 1.

At 1816, the client device may output a second indication of the selection of the first TWT configuration or the second TWT configuration, as described in connection with the examples in FIGS. 1-16. For example, as described in 1680 of FIG. 16, client device 1602 may output a second indication of the selection of the first TWT configuration or the second TWT configuration. Further, step 1816 may be performed by display processor 127 in FIG. 1. In some aspects, outputting the second indication of the selection of the first TWT configuration or the second TWT configuration may comprise transmitting, to a modem at the server, the second indication of the selection of the first TWT configuration or the second TWT configuration. Also, outputting the second indication of the selection of the first TWT configuration or the second TWT configuration may comprise storing, in a modem at the client device, the second indication of the selection of the first TWT configuration or the second TWT configuration.

Also, at 1816, the client device may communicate, with the server via the split XR process, based on the selection of the first TWT configuration or the second TWT configuration, as described in connection with the examples in FIGS. 1-16. For example, as described in 1680 of FIG. 16, client device 1602 may communicate, with the server via the split XR process, based on the selection of the first TWT configuration or the second TWT configuration. Further, step 1816 may be performed by display processor 127 in FIG. 1.

Figure 19:
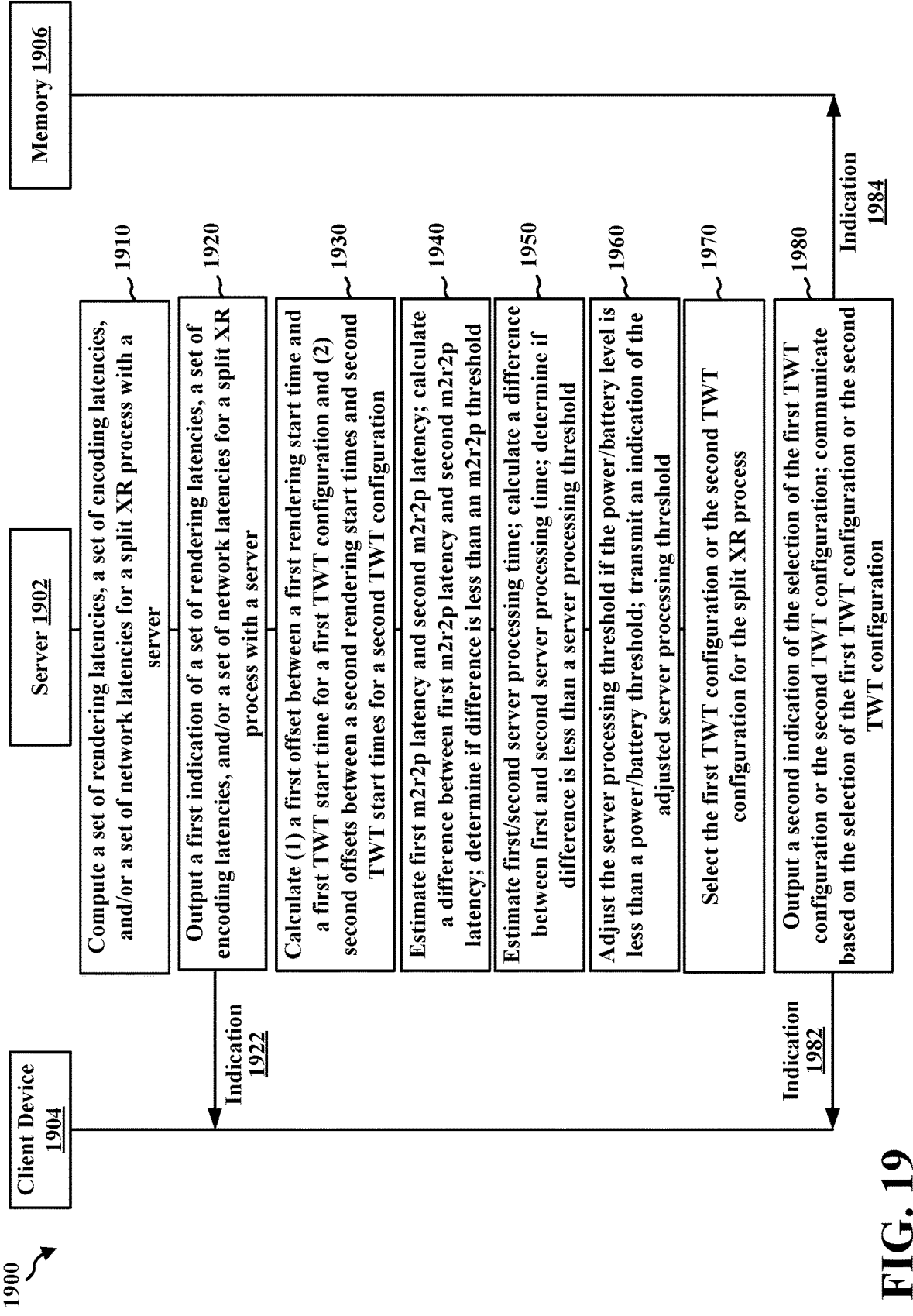
FIG. 19 is a communication flow diagram illustrating example communications between a client device, a server, and a memory.

FIG. 19 is a communication flow diagram 1900 of display processing in accordance with one or more techniques of this disclosure. As shown in FIG. 19, diagram 1900 includes example communications between server 1902 (e.g., a server, phone, smartphone, a client, a headset, HMD, or AR glasses), client device 1904 (e.g., a client, a headset, HMD, AR glasses, a server, phone, or smartphone), and memory 1906 (e.g., a memory or a cache), in accordance with one or more techniques of this disclosure.

At 1910, server 1902 may compute at least one of a set of rendering latencies, a set of encoding latencies, or a set of network latencies for a split extended reality (XR) process with a client device.

At 1920, server 1902 may output a first indication of at least one of the set of rendering latencies, the set of encoding latencies, or the set of network latencies for the split XR process with the client device (e.g., server 1902 may transmit indication 1922 to client device 1904). In some aspects, outputting the first indication of at least one of the set of rendering latencies, the set of encoding latencies, or the set of network latencies may comprise transmitting, to the client device or at least one compute device, the first indication of at least one of the set of rendering latencies, the set of encoding latencies, or the set of network latencies. Also, the split XR process may include at least one of (1) a split XR pipeline between the client device and the server or (2) at least one split XR application running on the client device. Further, the set of rendering latencies may be a set of rendering statistics associated with latencies for the split XR process with the server, the set of encoding latencies may be a set of encoding statistics associated with the latencies for the split XR process with the server, and the set of network latencies may be a set of network statistics associated with the latencies for the split XR process with the client device.

At 1930, server 1902 may calculate, based on the first indication, (1) a first offset between a first rendering start time and a first target wake time (TWT) start time for a first TWT configuration and (2) a set of second offsets between a set of second rendering start times and a set of second TWT start times for a second TWT configuration, where the first TWT configuration includes one TWT window and the second TWT configuration includes two TWT windows. In some aspects, calculating the first offset between the first rendering start time and the first TWT start time for the first TWT configuration may comprise calculating a difference between the first rendering start time and the first TWT start time. Also, calculating the set of second offsets between the set of second rendering start times and the set of second TWT start times for the second TWT configuration may comprise calculating a difference between an initial second rendering start time and an initial second TWT start time; and calculating a difference between at least one subsequent second rendering start time and at least one subsequent second TWT start time. Further, calculating the set of second offsets between the set of second rendering start times and the set of second TWT start times for the second TWT configuration may comprise calculating a sum of the difference between the initial second rendering start time and the initial second TWT start time and the difference between the at least one subsequent second rendering start time and the at least one subsequent second TWT start time.

At 1940, server 1902 may estimate, based on the calculation of the first offset and the set of second offsets, a first motion-to-render-to-photon (m2r2p) latency for the first TWT configuration and a second m2r2p latency for the second TWT configuration.

Also, at 1940, server 1902 may calculate a difference between the first m2r2p latency for the first TWT configuration and the second m2r2p latency for the second TWT configuration; and determine whether the difference is less than an m2r2p threshold. In some aspects, selecting the first TWT configuration or the second TWT configuration may comprise selecting the first TWT configuration or the second TWT configuration based on the determination of whether the difference is less than the m2r2p threshold. Also, the m2r2p threshold may be associated with a power level at the client device or a battery level at the client device.

At 1950, server 1902 may estimate, based on the calculation of the first offset and the set of second offsets, a first server processing time for the first TWT configuration and a second server processing time for the second TWT configuration.

Also, at 1950, server 1902 may calculate a difference between the first server processing time for the first TWT configuration and the second server processing time for the second TWT configuration; and determine whether the difference is less than a server processing threshold. In some aspects, selecting the first TWT configuration or the second TWT configuration may comprise selecting the first TWT configuration or the second TWT configuration based on the determination of whether the difference is less than the server processing threshold. Also, the processing threshold may be associated with a power level at the client device or a battery level at the client device.

At 1960, server 1902 may adjust the server processing threshold if the power level at the client device is less than a power threshold or if the battery level at the client device is less than a battery threshold; and transmit, to the client device, an indication of the adjusted server processing threshold if the power level at the client device is less than the power threshold or if the battery level at the client device is less than the battery threshold.

At 1970, server 1902 may select, based on the calculation of the first offset and the set of second offsets, the first TWT configuration or the second TWT configuration for the split XR process with the client device.

At 1980, server 1902 may output a second indication of the selection of the first TWT configuration or the second TWT configuration. In some aspects, outputting the second indication of the selection of the first TWT configuration or the second TWT configuration may comprise transmitting, to a modem at the client device, the second indication of the selection of the first TWT configuration or the second TWT configuration (e.g., server 1902 may transmit indication 1982 to client device 1904). Also, outputting the second indication of the selection of the first TWT configuration or the second TWT configuration may comprise storing, in a modem at the server, the second indication of the selection of the first TWT configuration or the second TWT configuration (e.g., server 1902 may store indication 1984 in memory 1906).

Also, at 1980, server 1902 may communicate, with the client device via the split XR process, based on the selection of the first TWT configuration or the second TWT configuration.

FIG. 20 is a flowchart 2000 of an example method of display processing in accordance with one or more techniques of this disclosure. The method may be performed by a server, phone, smartphone, a client device, a headset, HMD, AR glasses, a DPU (or other display processor), a CPU (or other central processor), a DPU driver, a DDIC, a GPU (or other graphics processor), an apparatus for display processing, a wireless communication device, and/or any apparatus that may perform frame processing as used in connection with the examples of FIGS. 1-19.

At 2002, the server may compute at least one of a set of rendering latencies, a set of encoding latencies, or a set of network latencies for a split extended reality (XR) process with a client device, as described in connection with the examples in FIGS. 1-19. For example, as described in 1910 of FIG. 19, server 1902 may compute at least one of a set of rendering latencies, a set of encoding latencies, or a set of network latencies for a split extended reality (XR) process with a client device. Further, step 2002 may be performed by display processor 127 in FIG. 1.

At 2004, the server may output a first indication of at least one of the set of rendering latencies, the set of encoding latencies, or the set of network latencies for the split XR process with the client device, as described in connection with the examples in FIGS. 1-19. For example, as described in 1920 of FIG. 19, server 1902 may output a first indication of at least one of the set of rendering latencies, the set of encoding latencies, or the set of network latencies for the split XR process with the client device. Further, step 2004 may be performed by display processor 127 in FIG. 1. In some aspects, outputting the first indication of at least one of the set of rendering latencies, the set of encoding latencies, or the set of network latencies may comprise transmitting, to the client device or at least one compute device, the first indication of at least one of the set of rendering latencies, the set of encoding latencies, or the set of network latencies. Also, the split XR process may include at least one of (1) a split XR pipeline between the client device and the server or (2) at least one split XR application running on the client device. Further, the set of rendering latencies may be a set of rendering statistics associated with latencies for the split XR process with the server, the set of encoding latencies may be a set of encoding statistics associated with the latencies for the split XR process with the server, and the set of network latencies may be a set of network statistics associated with the latencies for the split XR process with the client device.

At 2014, the server may select, based on the calculation of the first offset and the set of second offsets, the first TWT configuration or the second TWT configuration for the split XR process with the client device, as described in connection with the examples in FIGS. 1-19. For example, as described in 1970 of FIG. 19, server 1902 may select, based on the calculation of the first offset and the set of second offsets, the first TWT configuration or the second TWT configuration for the split XR process with the client device. Further, step 2014 may be performed by display processor 127 in FIG. 1.

At 2016, the server may output a second indication of the selection of the first TWT configuration or the second TWT configuration, as described in connection with the examples in FIGS. 1-19. For example, as described in 1980 of FIG. 19, server 1902 may output a second indication of the selection of the first TWT configuration or the second TWT configuration. Further, step 2016 may be performed by display processor 127 in FIG. 1. In some aspects, outputting the second indication of the selection of the first TWT configuration or the second TWT configuration may comprise transmitting, to a modem at the client device, the second indication of the selection of the first TWT configuration or the second TWT configuration. Also, outputting the second indication of the selection of the first TWT configuration or the second TWT configuration may comprise storing, in a modem at the server, the second indication of the selection of the first TWT configuration or the second TWT configuration.

Also, at 2016, the server may communicate, with the client device via the split XR process, based on the selection of the first TWT configuration or the second TWT configuration, as described in connection with the examples in FIGS. 1-19. For example, as described in 1980 of FIG. 19, server 1902 may communicate, with the client device via the split XR process, based on the selection of the first TWT configuration or the second TWT configuration. Further, step 2016 may be performed by display processor 127 in FIG. 1.

FIG. 21 is a flowchart 2100 of an example method of display processing in accordance with one or more techniques of this disclosure. The method may be performed by a server, phone, smartphone, a client device, a headset, HMD, AR glasses, a DPU (or other display processor), a CPU (or other central processor), a DPU driver, a DDIC, a GPU (or other graphics processor), an apparatus for display processing, a wireless communication device, and/or any apparatus that may perform frame processing as used in connection with the examples of FIGS. 1-19.

At 2102, the server may compute at least one of a set of rendering latencies, a set of encoding latencies, or a set of network latencies for a split extended reality (XR) process with a client device, as described in connection with the examples in FIGS. 1-19. For example, as described in 1910 of FIG. 19, server 1902 may compute at least one of a set of rendering latencies, a set of encoding latencies, or a set of network latencies for a split extended reality (XR) process with a client device. Further, step 2102 may be performed by display processor 127 in FIG. 1.

At 2104, the server may output a first indication of at least one of the set of rendering latencies, the set of encoding latencies, or the set of network latencies for the split XR process with the client device, as described in connection with the examples in FIGS. 1-19. For example, as described in 1920 of FIG. 19, server 1902 may output a first indication of at least one of the set of rendering latencies, the set of encoding latencies, or the set of network latencies for the split XR process with the client device. Further, step 2104 may be performed by display processor 127 in FIG. 1. In some aspects, outputting the first indication of at least one of the set of rendering latencies, the set of encoding latencies, or the set of network latencies may comprise transmitting, to the client device or at least one compute device, the first indication of at least one of the set of rendering latencies, the set of encoding latencies, or the set of network latencies. Also, the split XR process may include at least one of (1) a split XR pipeline between the client device and the server or (2) at least one split XR application running on the client device. Further, the set of rendering latencies may be a set of rendering statistics associated with latencies for the split XR process with the server, the set of encoding latencies may be a set of encoding statistics associated with the latencies for the split XR process with the server, and the set of network latencies may be a set of network statistics associated with the latencies for the split XR process with the client device.

At 2106, the server may calculate, based on the first indication, (1) a first offset between a first rendering start time and a first target wake time (TWT) start time for a first TWT configuration and (2) a set of second offsets between a set of second rendering start times and a set of second TWT start times for a second TWT configuration, where the first TWT configuration includes one TWT window and the second TWT configuration includes two TWT windows, as described in connection with the examples in FIGS. 1-19. For example, as described in 1930 of FIG. 19, server 1902 may calculate, based on the first indication, (1) a first offset between a first rendering start time and a first target wake time (TWT) start time for a first TWT configuration and (2) a set of second offsets between a set of second rendering start times and a set of second TWT start times for a second TWT configuration, where the first TWT configuration includes one TWT window and the second TWT configuration includes two TWT windows. Further, step 2106 may be performed by display processor 127 in FIG. 1. In some aspects, calculating the first offset between the first rendering start time and the first TWT start time for the first TWT configuration may comprise calculating a difference between the first rendering start time and the first TWT start time. Also, calculating the set of second offsets between the set of second rendering start times and the set of second TWT start times for the second TWT configuration may comprise calculating a difference between an initial second rendering start time and an initial second TWT start time; and calculating a difference between at least one subsequent second rendering start time and at least one subsequent second TWT start time. Further, calculating the set of second offsets between the set of second rendering start times and the set of second TWT start times for the second TWT configuration may comprise calculating a sum of the difference between the initial second rendering start time and the initial second TWT start time and the difference between the at least one subsequent second rendering start time and the at least one subsequent second TWT start time.

At 2108, the server may estimate, based on the calculation of the first offset and the set of second offsets, a first motion-to-render-to-photon (m2r2p) latency for the first TWT configuration and a second m2r2p latency for the second TWT configuration, as described in connection with the examples in FIGS. 1-19. For example, as described in 1940 of FIG. 19, server 1902 may estimate, based on the calculation of the first offset and the set of second offsets, a first motion-to-render-to-photon (m2r2p) latency for the first TWT configuration and a second m2r2p latency for the second TWT configuration. Further, step 2108 may be performed by display processor 127 in FIG. 1.

Also, at 2108, the server may calculate a difference between the first m2r2p latency for the first TWT configuration and the second m2r2p latency for the second TWT configuration; and determine whether the difference is less than an m2r2p threshold. In some aspects, selecting the first TWT configuration or the second TWT configuration may comprise selecting the first TWT configuration or the second TWT configuration based on the determination of whether the difference is less than the m2r2p threshold, as described in connection with the examples in FIGS. 1-19. For example, as described in 1940 of FIG. 19, server 1902 may calculate a difference between the first m2r2p latency for the first TWT configuration and the second m2r2p latency for the second TWT configuration; and determine whether the difference is less than an m2r2p threshold. Further, step 2108 may be performed by display processor 127 in FIG. 1. Also, the m2r2p threshold may be associated with a power level at the client device or a battery level at the client device.

At 2110, the server may estimate, based on the calculation of the first offset and the set of second offsets, a first server processing time for the first TWT configuration and a second server processing time for the second TWT configuration, as described in connection with the examples in FIGS. 1-19. For example, as described in 1950 of FIG. 19, server 1902 may estimate, based on the calculation of the first offset and the set of second offsets, a first server processing time for the first TWT configuration and a second server processing time for the second TWT configuration. Further, step 2110 may be performed by display processor 127 in FIG. 1.

Also, at 2110, the server may calculate a difference between the first server processing time for the first TWT configuration and the second server processing time for the second TWT configuration; and determine whether the difference is less than a server processing threshold, as described in connection with the examples in FIGS. 1-19. For example, as described in 1950 of FIG. 19, server 1902 may calculate a difference between the first server processing time for the first TWT configuration and the second server processing time for the second TWT configuration; and determine whether the difference is less than a server processing threshold. Further, step 2110 may be performed by display processor 127 in FIG. 1. In some aspects, selecting the first TWT configuration or the second TWT configuration may comprise selecting the first TWT configuration or the second TWT configuration based on the determination of whether the difference is less than the server processing threshold. Also, the processing threshold may be associated with a power level at the client device or a battery level at the client device.

At 2112, the server may adjust the server processing threshold if the power level at the client device is less than a power threshold or if the battery level at the client device is less than a battery threshold; and transmit, to the client device, an indication of the adjusted server processing threshold if the power level at the client device is less than the power threshold or if the battery level at the client device is less than the battery threshold, as described in connection with the examples in FIGS. 1-19. For example, as described in 1960 of FIG. 19, server 1902 may adjust the server processing threshold if the power level at the client device is less than a power threshold or if the battery level at the client device is less than a battery threshold; and transmit, to the client device, an indication of the adjusted server processing threshold if the power level at the client device is less than the power threshold or if the battery level at the client device is less than the battery threshold. Further, step 2112 may be performed by display processor 127 in FIG. 1.

At 2114, the server may select, based on the calculation of the first offset and the set of second offsets, the first TWT configuration or the second TWT configuration for the split XR process with the client device, as described in connection with the examples in FIGS. 1-19. For example, as described in 1970 of FIG. 19, server 1902 may select, based on the calculation of the first offset and the set of second offsets, the first TWT configuration or the second TWT configuration for the split XR process with the client device. Further, step 2114 may be performed by display processor 127 in FIG. 1.

At 2116, the server may output a second indication of the selection of the first TWT configuration or the second TWT configuration, as described in connection with the examples in FIGS. 1-19. For example, as described in 1980 of FIG. 19, server 1902 may output a second indication of the selection of the first TWT configuration or the second TWT configuration. Further, step 2116 may be performed by display processor 127 in FIG. 1. In some aspects, outputting the second indication of the selection of the first TWT configuration or the second TWT configuration may comprise transmitting, to a modem at the client device, the second indication of the selection of the first TWT configuration or the second TWT configuration. Also, outputting the second indication of the selection of the first TWT configuration or the second TWT configuration may comprise storing, in a modem at the server, the second indication of the selection of the first TWT configuration or the second TWT configuration.

Also, at 2116, the server may communicate, with the client device via the split XR process, based on the selection of the first TWT configuration or the second TWT configuration, as described in connection with the examples in FIGS. 1-19. For example, as described in 1980 of FIG. 19, server 1902 may communicate, with the client device via the split XR process, based on the selection of the first TWT configuration or the second TWT configuration. Further, step 2116 may be performed by display processor 127 in FIG. 1.

In configurations, a method or an apparatus for display processing is provided. The apparatus may be a client device, a headset, HMD, AR glasses, a server, phone, smartphone, a DPU (or other display processor), a CPU (or other central processor), a DPU driver, a DDIC, a GPU (or other graphics processor), an apparatus for display processing, a wireless communication device, and/or some other processor that may perform display processing. In aspects, the apparatus may be the display processor 127 within the device 104, or may be some other hardware within the device 104 or another device. The apparatus, e.g., display processor 127, may include means for obtaining a first indication of at least one of a set of rendering latencies, a set of encoding latencies, or a set of network latencies for a split extended reality (XR) process with a server. The apparatus, e.g., display processor 127, may also include means for calculating, based on the first indication, (1) a first offset between a first rendering start time and a first target wake time (TWT) start time for a first TWT configuration and (2) a set of second offsets between a set of second rendering start times and a set of second TWT start times for a second TWT configuration, where the first TWT configuration includes one TWT window and the second TWT configuration includes two TWT windows. The apparatus, e.g., display processor 127, may also include means for selecting, based on the calculation of the first offset and the set of second offsets, the first TWT configuration or the second TWT configuration for the split XR process with the server. The apparatus, e.g., display processor 127, may also include means for outputting a second indication of the selection of the first TWT configuration or the second TWT configuration. The apparatus, e.g., display processor 127, may also include means for estimating, based on the calculation of the first offset and the set of second offsets, a first motion-to-render-to-photon (m2r2p) latency for the first TWT configuration and a second m2r2p latency for the second TWT configuration. The apparatus, e.g., display processor 127, may also include means for calculating a difference between the first m2r2p latency for the first TWT configuration and the second m2r2p latency for the second TWT configuration; and determining whether the difference is less than an m2r2p threshold. The apparatus, e.g., display processor 127, may also include means for adjusting the m2r2p threshold if the power level at the client device is less than a power threshold or if the battery level at the client device is less than a battery threshold; and transmitting, to the server, an indication of the adjusted m2r2p threshold if the power level at the client device is less than the power threshold or if the battery level at the client device is less than the battery threshold. The apparatus, e.g., display processor 127, may also include means for estimating, based on the calculation of the first offset and the set of second offsets, a first server processing time for the first TWT configuration and a second server processing time for the second TWT configuration. The apparatus, e.g., display processor 127, may also include means for calculating a difference between the first server processing time for the first TWT configuration and the second server processing time for the second TWT configuration; and determining whether the difference is less than a server processing threshold. The apparatus, e.g., display processor 127, may also include means for adjusting the server processing threshold if the power level at the client device is less than a power threshold or if the battery level at the client device is less than a battery threshold; and transmitting, to the server, an indication of the adjusted server processing threshold if the power level at the client device is less than the power threshold or if the battery level at the client device is less than the battery threshold. The apparatus, e.g., display processor 127, may also include means for communicating, with the server via the split XR process, based on the selection of the first TWT configuration or the second TWT configuration. The apparatus, e.g., display processor 127, may also include means for computing at least one of a set of rendering latencies, a set of encoding latencies, or a set of network latencies for a split extended reality (XR) process with a client device. The apparatus, e.g., display processor 127, may also include means for outputting a first indication of at least one of the set of rendering latencies, the set of encoding latencies, or the set of network latencies for the split XR process with the client device. The apparatus, e.g., display processor 127, may also include means for calculating, based on the first indication, (1) a first offset between a first rendering start time and a first target wake time (TWT) start time for a first TWT configuration and (2) a set of second offsets between a set of second rendering start times and a set of second TWT start times for a second TWT configuration, where the first TWT configuration includes one TWT window and the second TWT configuration includes two TWT windows. The apparatus, e.g., display processor 127, may also include means for selecting, based on the calculation of the first offset and the set of second offsets, the first TWT configuration or the second TWT configuration for the split XR process with the client device. The apparatus, e.g., display processor 127, may also include means for outputting a second indication of the selection of the first TWT configuration or the second TWT configuration. The apparatus, e.g., display processor 127, may also include means for estimating, based on the calculation of the first offset and the set of second offsets, a first motion-to-render-to-photon (m2r2p) latency for the first TWT configuration and a second m2r2p latency for the second TWT configuration. The apparatus, e.g., display processor 127, may also include means for calculating a difference between the first m2r2p latency for the first TWT configuration and the second m2r2p latency for the second TWT configuration; and determining whether the difference is less than an m2r2p threshold. The apparatus, e.g., display processor 127, may also include means for estimating, based on the calculation of the first offset and the set of second offsets, a first server processing time for the first TWT configuration and a second server processing time for the second TWT configuration. The apparatus, e.g., display processor 127, may also include means for calculating a difference between the first server processing time for the first TWT configuration and the second server processing time for the second TWT configuration; and determining whether the difference is less than a server processing threshold. The apparatus, e.g., display processor 127, may also include means for adjusting the server processing threshold if the power level at the client device is less than a power threshold or if the battery level at the client device is less than a battery threshold; and transmitting, to the client device, an indication of the adjusted server processing threshold if the power level at the client device is less than the power threshold or if the battery level at the client device is less than the battery threshold. The apparatus, e.g., display processor 127, may also include means for communicating, with the client device via the split XR process, based on the selection of the first TWT configuration or the second TWT configuration.

The subject matter described herein may be implemented to realize one or more benefits or advantages. For instance, the described display processing techniques may be used by a client device, a headset, HMD, AR glasses, a server, phone, smartphone, a DPU (or other display processor), a CPU (or other central processor), a DPU driver, a DDIC, a GPU (or other graphics processor), an apparatus for display processing, a wireless communication device, or some other processor that may perform display processing to implement the dual TWT window techniques described herein. This may also be accomplished at a low cost compared to other display processing techniques. Moreover, the display processing techniques herein may improve or speed up data processing or execution. Further, the display processing techniques herein may improve resource or data utilization and/or resource efficiency. Additionally, aspects of the present disclosure may utilize dual TWT window techniques in order to improve memory bandwidth efficiency and/or increase processing speed at a client device, a server, a GPU, a DPU and/or a CPU.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects.

Unless specifically stated otherwise, the term "some" refers to one or more and the term "or" may be interpreted as "and/or" where context does not dictate otherwise. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

In one or more examples, the functions described herein may be implemented in hardware, software, firmware, or any combination thereof. For example, although the term "processing unit" has been used throughout this disclosure, such processing units may be implemented in hardware, software, firmware, or any combination thereof. If any function, processing unit, technique described herein, or other module is implemented in software, the function, processing unit, technique described herein, or other module may be stored on or transmitted over as one or more instructions or code on a computer-readable medium.

In accordance with this disclosure, the term "or" may be interpreted as "and/or" where context does not dictate otherwise. Additionally, while phrases such as "one or more" or "at least one" or the like may have been used for some features disclosed herein but not others, the features for which such language was not used may be interpreted to have such a meaning implied where context does not dictate otherwise.

In one or more examples, the functions described herein may be implemented in hardware, software, firmware, or any combination thereof. For example, although the term "processing unit" has been used throughout this disclosure, such processing units may be implemented in hardware, software, firmware, or any combination thereof. If any function, processing unit, technique described herein, or other module is implemented in software, the function, processing unit, technique described herein, or other module may be stored on or transmitted over as one or more instructions or code on a computer-readable medium. Computer-readable media may include computer data storage media or communication media including any medium that facilitates transfer of a computer program from one place to another. In this manner, computer-readable media generally may correspond to (1) tangible computer-readable storage media, which is non-transitory or (2) a communication medium such as a signal or carrier wave. Data storage media may be any available media that may be accessed by one or more computers or one or more processors to retrieve instructions, code and/or data structures for implementation of the techniques described in this disclosure. By way of example, and not limitation, such computer-readable media may comprise RAM, ROM, EEPROM, CD-ROM or other optical disk storage, magnetic disk storage or other magnetic storage devices. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media. A computer program product may include a computer-readable medium.

The code may be executed by one or more processors, such as one or more digital signal processors (DSPs), general purpose microprocessors, application specific integrated circuits (ASICs), arithmetic logic units (ALUs), field programmable logic arrays (FPGAs), or other equivalent integrated or discrete logic circuitry. Accordingly, the term "processor," as used herein may refer to any of the foregoing structure or any other structure suitable for implementation of the techniques described herein. Also, the techniques could be fully implemented in one or more circuits or logic elements.

The techniques of this disclosure may be implemented in a wide variety of devices or apparatuses, including a wireless handset, an integrated circuit (IC) or a set of ICs, e.g., a chip set. Various components, modules or units are described in this disclosure to emphasize functional aspects of devices configured to perform the disclosed techniques, but do not necessarily need realization by different hardware units. Rather, as described above, various units may be combined in any hardware unit or provided by a collection of inter-operative hardware units, including one or more processors as described above, in conjunction with suitable software and/or firmware. Accordingly, the term "processor," as used herein may refer to any of the foregoing structure or any other structure suitable for implementation of the techniques described herein. Also, the techniques may be fully implemented in one or more circuits or logic elements.

The following aspects are illustrative only and may be combined with other aspects or teachings described herein, without limitation.

Aspect 1 is an apparatus for display processing at a client device, including at least one memory; and at least one processor coupled to the at least one memory and, based at least in part on information stored in the at least one memory, the at least one processor, individually or in any combination, is configured to: obtain a first indication of at least one of a set of rendering latencies, a set of encoding latencies, or a set of network latencies for a split extended reality (XR) process with a server; calculate, based on the first indication, (1) a first offset between a first rendering start time and a first target wake time (TWT) start time for a first TWT configuration and (2) a set of second offsets between a set of second rendering start times and a set of second TWT start times for a second TWT configuration, wherein the first TWT configuration includes one TWT window and the second TWT configuration includes two TWT windows; select, based on the calculation of the first offset and the set of second offsets, the first TWT configuration or the second TWT configuration for the split XR process with the server; and output a second indication of the selection of the first TWT configuration or the second TWT configuration.

Aspect 2 is the apparatus of aspect 1, wherein to calculate the first offset between the first rendering start time and the first TWT start time for the first TWT configuration, the at least one processor, individually or in any combination, is configured to: calculate a difference between the first rendering start time and the first TWT start time; and wherein to calculate the set of second offsets between the set of second rendering start times and the set of second TWT start times for the second TWT configuration, the at least one processor, individually or in any combination, is configured to: calculate a difference between an initial second rendering start time and an initial second TWT start time; and calculate a difference between at least one subsequent second rendering start time and at least one subsequent second TWT start time.

Aspect 3 is the apparatus of aspect 2, wherein to calculate the set of second offsets between the set of second rendering start times and the set of second TWT start times for the second TWT configuration, the at least one processor, individually or in any combination, is configured to calculate a sum of the difference between the initial second rendering start time and the initial second TWT start time and the difference between the at least one subsequent second rendering start time and the at least one subsequent second TWT start time.

Aspect 4 is the apparatus of any of aspects 1 to 3, wherein the at least one processor, individually or in any combination, is further configured to: estimate, based on the calculation of the first offset and the set of second offsets, a first motion-to-render-to-photon (m2r2p) latency for the first TWT configuration and a second m2r2p latency for the second TWT configuration.

Aspect 5 is the apparatus of aspect 4, wherein the at least one processor, individually or in any combination, is further configured to: calculate a difference between the first m2r2p latency for the first TWT configuration and the second m2r2p latency for the second TWT configuration; and determine whether the difference is less than an m2r2p threshold.

Aspect 6 is the apparatus of aspect 5, wherein to select the first TWT configuration or the second TWT configuration, the at least one processor, individually or in any combination, is configured to: select the first TWT configuration or the second TWT configuration based on the determination of whether the difference is less than the m2r2p threshold.

Aspect 7 is the apparatus of any of aspects 5 to 6, wherein the m2r2p threshold is associated with a power level at the client device or a battery level at the client device.

Aspect 8 is the apparatus of aspect 7, wherein the at least one processor, individually or in any combination, is further configured to: adjust the m2r2p threshold if the power level at the client device is less than a power threshold or if the battery level at the client device is less than a battery threshold; and transmit, to the server, an indication of the adjusted m2r2p threshold if the power level at the client device is less than the power threshold or if the battery level at the client device is less than the battery threshold.

Aspect 9 is the apparatus of any of aspects 1 to 8, wherein the at least one processor, individually or in any combination, is further configured to: estimate, based on the calculation of the first offset and the set of second offsets, a first server processing time for the first TWT configuration and a second server processing time for the second TWT configuration.

Aspect 10 is the apparatus of aspect 9, wherein the at least one processor, individually or in any combination, is further configured to: calculate a difference between the first server processing time for the first TWT configuration and the second server processing time for the second TWT configuration; and determine whether the difference is less than a server processing threshold.

Aspect 11 is the apparatus of aspect 10, wherein to select the first TWT configuration or the second TWT configuration, the at least one processor, individually or in any combination, is configured to: select the first TWT configuration or the second TWT configuration based on the determination of whether the difference is less than the server processing threshold.

Aspect 12 is the apparatus of any of aspects 10 to 11, wherein the processing threshold is associated with a power level at the client device or a battery level at the client device.

Aspect 13 is the apparatus of aspect 12, wherein the at least one processor, individually or in any combination, is further configured to: adjust the server processing threshold if the power level at the client device is less than a power threshold or if the battery level at the client device is less than a battery threshold; and transmit, to the server, an indication of the adjusted server processing threshold if the power level at the client device is less than the power threshold or if the battery level at the client device is less than the battery threshold.

Aspect 14 is the apparatus of any of aspects 1 to 13, wherein the at least one processor, individually or in any combination, is further configured to: communicate, with the server via the split XR process, based on the selection of the first TWT configuration or the second TWT configuration.

Aspect 15 is the apparatus of any of aspects 1 to 14, wherein to obtain the first indication of at least one of the set of rendering latencies, the set of encoding latencies, or the set of network latencies, the at least one processor, individually or in any combination, is configured to: receive, from the server or at least one compute device, the first indication of at least one of the set of rendering latencies, the set of encoding latencies, or the set of network latencies.

Aspect 16 is the apparatus of any of aspects 1 to 15, wherein the split XR process includes at least one of (1) a split XR pipeline between the client device and the server or (2) at least one split XR application running on the client device.

Aspect 17 is the apparatus of any of aspects 1 to 16, wherein the set of rendering latencies is a set of rendering statistics associated with latencies for the split XR process with the server, wherein the set of encoding latencies is a set of encoding statistics associated with the latencies for the split XR process with the server, and wherein the set of network latencies is a set of network statistics associated with the latencies for the split XR process with the server.

Aspect 18 is the apparatus of any of aspects 1 to 17, further comprising at least one of an antenna or a transceiver coupled to the at least one processor, wherein to output the second indication of the selection of the first TWT configuration or the second TWT configuration, the at least one processor, individually or in any combination, is configured to: transmit, to a modem at the server via at least one of the antenna or the transceiver, the second indication of the selection of the first TWT configuration or the second TWT configuration; or store, in a modem at the client device, the second indication of the selection of the first TWT configuration or the second TWT configuration.

Aspect 19 is an apparatus for display processing at a server, including at least one memory; and at least one processor coupled to the at least one memory and, based at least in part on information stored in the at least one memory, the at least one processor, individually or in any combination, is configured to: compute at least one of a set of rendering latencies, a set of encoding latencies, or a set of network latencies for a split extended reality (XR) process with a client device; output a first indication of at least one of the set of rendering latencies, the set of encoding latencies, or the set of network latencies for the split XR process with the client device; calculate, based on the first indication, (1) a first offset between a first rendering start time and a first target wake time (TWT) start time for a first TWT configuration and (2) a set of second offsets between a set of second rendering start times and a set of second TWT start times for a second TWT configuration, wherein the first TWT configuration includes one TWT window and the second TWT configuration includes two TWT windows;

select, based on the calculation of the first offset and the set of second offsets, the first TWT configuration or the second TWT configuration for the split XR process with the client device; and output a second indication of the selection of the first TWT configuration or the second TWT configuration.

Aspect 20 is the apparatus of aspect 19, wherein to calculate the first offset between the first rendering start time and the first TWT start time for the first TWT configuration, the at least one processor, individually or in any combination, is configured to: calculate a difference between the first rendering start time and the first TWT start time; and wherein to calculate the set of second offsets between the set of second rendering start times and the set of second TWT start times for the second TWT configuration, the at least one processor, individually or in any combination, is configured to: calculate a difference between an initial second rendering start time and an initial second TWT start time; and calculate a difference between at least one subsequent second rendering start time and at least one subsequent second TWT start time.

Aspect 21 is the apparatus of aspect 20, wherein to calculate the set of second offsets between the set of second rendering start times and the set of second TWT start times for the second TWT configuration, the at least one processor, individually or in any combination, is configured to calculate a sum of the difference between the initial second rendering start time and the initial second TWT start time and the difference between the at least one subsequent second rendering start time and the at least one subsequent second TWT start time.

Aspect 22 is the apparatus of any of aspects 19 to 21, wherein the at least one processor, individually or in any combination, is further configured to: estimate, based on the calculation of the first offset and the set of second offsets, a first motion-to-render-to-photon (m2r2p) latency for the first TWT configuration and a second m2r2p latency for the second TWT configuration; calculate a difference between the first m2r2p latency for the first TWT configuration and the second m2r2p latency for the second TWT configuration; and determine whether the difference is less than an m2r2p threshold.

Aspect 23 is the apparatus of aspect 22, wherein to select the first TWT configuration or the second TWT configuration, the at least one processor, individually or in any combination, is configured to select the first TWT configuration or the second TWT configuration based on the determination of whether the difference is less than the m2r2p threshold; or wherein the m2r2p threshold is associated with a power level at the client device or a battery level at the client device.

Aspect 24 is the apparatus of any of aspects 19 to 23, wherein the at least one processor, individually or in any combination, is further configured to: estimate, based on the calculation of the first offset and the set of second offsets, a first server processing time for the first TWT configuration and a second server processing time for the second TWT configuration; calculate a difference between the first server processing time for the first TWT configuration and the second server processing time for the second TWT configuration; determine whether the difference is less than a server processing threshold; wherein to select the first TWT configuration or the second TWT configuration, the at least one processor, individually or in any combination, is configured to select the first TWT configuration or the second TWT configuration based on the determination of whether the difference is less than the server processing threshold; or wherein the processing threshold is associated with a power level at the client device or a battery level at the client device.

Aspect 25 is the apparatus of aspect 24, wherein the at least one processor, individually or in any combination, is further configured to: adjust the server processing threshold if the power level at the client device is less than a power threshold or if the battery level at the client device is less than a battery threshold; and transmit, to the client device, an indication of the adjusted server processing threshold if the power level at the client device is less than the power threshold or if the battery level at the client device is less than the battery threshold.

Aspect 26 is the apparatus of any of aspects 19 to 25, wherein the at least one processor, individually or in any combination, is further configured to: communicate, with the client device via the split XR process, based on the selection of the first TWT configuration or the second TWT configuration.

Aspect 27 is the apparatus of any of aspects 19 to 26, wherein to output the first indication of at least one of the set of rendering latencies, the set of encoding latencies, or the set of network latencies, the at least one processor, individually or in any combination, is configured to transmit, to the client device or at least one compute device, the first indication of at least one of the set of rendering latencies, the set of encoding latencies, or the set of network latencies; wherein the split XR process includes at least one of (1) a split XR pipeline between the client device and the server or (2) at least one split XR application running on the client device; or wherein the set of rendering latencies is a set of rendering statistics associated with latencies for the split XR process with the server, wherein the set of encoding latencies is a set of encoding statistics associated with the latencies for the split XR process with the server, and wherein the set of network latencies is a set of network statistics associated with the latencies for the split XR process with the client device.

Aspect 28 is the apparatus of any of aspects 19 to 27, further comprising at least one of an antenna or a transceiver coupled to the at least one processor, wherein to output the second indication of the selection of the first TWT configuration or the second TWT configuration, the at least one processor, individually or in any combination, is configured to: transmit, to a modem at the client device via at least one of the antenna or the transceiver, the second indication of the selection of the first TWT configuration or the second TWT configuration; or store, in a modem at the server, the second indication of the selection of the first TWT configuration or the second TWT configuration.

Aspect 29 is a method of display processing for implementing any of aspects 1 to 28.

Aspect 30 is an apparatus for display processing including means for implementing any of aspects 1 to 28.

Aspect 31 is a computer-readable medium (e.g., a non-transitory computer-readable medium) storing computer executable code, the code when executed by at least one processor causes the at least one processor to implement any of aspects 1 to 28.

What is claimed is:

1. An apparatus for display processing at a client device, comprising:
   at least one memory; and
   at least one processor coupled to the at least one memory and, based at least in part on information stored in the at least one memory, the at least one processor, individually or in any combination, is configured to:

obtain a first indication of at least one of a set of rendering latencies, a set of encoding latencies, or a set of network latencies for a split extended reality (XR) process with a server;

calculate, based on the first indication, (1) a first offset between a first rendering start time and a first target wake time (TWT) start time for a first TWT configuration and (2) a set of second offsets between a set of second rendering start times and a set of second TWT start times for a second TWT configuration, wherein the first TWT configuration includes one TWT window and the second TWT configuration includes two TWT windows;

select, based on the calculation of the first offset and the set of second offsets, the first TWT configuration or the second TWT configuration for the split XR process with the server; and output a second indication of the selection of the first TWT configuration or the second TWT configuration.

2. The apparatus of claim 1, wherein to calculate the first offset between the first rendering start time and the first TWT start time for the first TWT configuration, the at least one processor, individually or in any combination, is configured to: calculate a difference between the first rendering start time and the first TWT start time; and wherein to calculate the set of second offsets between the set of second rendering start times and the set of second TWT start times for the second TWT configuration, the at least one processor, individually or in any combination, is configured to: calculate a difference between an initial second rendering start time and an initial second TWT start time; and calculate a difference between at least one subsequent second rendering start time and at least one subsequent second TWT start time.

3. The apparatus of claim 2, wherein to calculate the set of second offsets between the set of second rendering start times and the set of second TWT start times for the second TWT configuration, the at least one processor, individually or in any combination, is configured to calculate a sum of the difference between the initial second rendering start time and the initial second TWT start time and the difference between the at least one subsequent second rendering start time and the at least one subsequent second TWT start time.

4. The apparatus of claim 1, wherein the at least one processor, individually or in any combination, is further configured to:
   estimate, based on the calculation of the first offset and the set of second offsets, a first motion-to-render-to-photon (m2r2p) latency for the first TWT configuration and a second m2r2p latency for the second TWT configuration.

5. The apparatus of claim 4, wherein the at least one processor, individually or in any combination, is further configured to:
   calculate a difference between the first m2r2p latency for the first TWT configuration and the second m2r2p latency for the second TWT configuration; and
   determine whether the difference is less than an m2r2p threshold.

6. The apparatus of claim 5, wherein to select the first TWT configuration or the second TWT configuration, the at least one processor, individually or in any combination, is configured to: select the first TWT configuration or the second TWT configuration based on the determination of whether the difference is less than the m2r2p threshold.

7. The apparatus of claim 5, wherein the m2r2p threshold is associated with a power level at the client device or a battery level at the client device.

8. The apparatus of claim 7, wherein the at least one processor, individually or in any combination, is further configured to:

adjust the m2r2p threshold if the power level at the client device is less than a power threshold or if the battery level at the client device is less than a battery threshold; and transmit, to the server, an indication of the adjusted m2r2p threshold if the power level at the client device is less than the power threshold or if the battery level at the client device is less than the battery threshold.

9. The apparatus of claim 1, wherein the at least one processor, individually or in any combination, is further configured to:

estimate, based on the calculation of the first offset and the set of second offsets, a first server processing time for the first TWT configuration and a second server processing time for the second TWT configuration.

10. The apparatus of claim 9, wherein the at least one processor, individually or in any combination, is further configured to:

calculate a difference between the first server processing time for the first TWT configuration and the second server processing time for the second TWT configuration; and determine whether the difference is less than a server processing threshold.

11. The apparatus of claim 10, wherein to select the first TWT configuration or the second TWT configuration, the at least one processor, individually or in any combination, is configured to: select the first TWT configuration or the second TWT configuration based on the determination of whether the difference is less than the server processing threshold.

12. The apparatus of claim 10, wherein the processing threshold is associated with a power level at the client device or a battery level at the client device.

13. The apparatus of claim 12, wherein the at least one processor, individually or in any combination, is further configured to:

adjust the server processing threshold if the power level at the client device is less than a power threshold or if the battery level at the client device is less than a battery threshold; and transmit, to the server, an indication of the adjusted server processing threshold if the power level at the client device is less than the power threshold or if the battery level at the client device is less than the battery threshold.

14. The apparatus of claim 1, wherein the at least one processor, individually or in any combination, is further configured to:

communicate, with the server via the split XR process, based on the selection of the first TWT configuration or the second TWT configuration.

15. The apparatus of claim 1, wherein to obtain the first indication of at least one of the set of rendering latencies, the set of encoding latencies, or the set of network latencies, the at least one processor, individually or in any combination, is configured to: receive, from the server or at least one compute device, the first indication of at least one of the set of rendering latencies, the set of encoding latencies, or the set of network latencies.

16. The apparatus of claim 1, wherein the split XR process includes at least one of (1) a split XR pipeline between the client device and the server or (2) at least one split XR application running on the client device.

17. The apparatus of claim 1, wherein the set of rendering latencies is a set of rendering statistics associated with latencies for the split XR process with the server, wherein the set of encoding latencies is a set of encoding statistics associated with the latencies for the split XR process with the server, and wherein the set of network latencies is a set of network statistics associated with the latencies for the split XR process with the server.

18. The apparatus of claim 1, further comprising at least one of an antenna or a transceiver coupled to the at least one processor, wherein to output the second indication of the selection of the first TWT configuration or the second TWT configuration, the at least one processor, individually or in any combination, is configured to:

transmit, to a modem at the server via at least one of the antenna or the transceiver, the second indication of the selection of the first TWT configuration or the second TWT configuration; or store, in a modem at the client device, the second indication of the selection of the first TWT configuration or the second TWT configuration.

19. An apparatus for display processing at a server, comprising:

at least one memory; and at least one processor coupled to the at least one memory and, based at least in part on information stored in the at least one memory, the at least one processor, individually or in any combination, is configured to:

compute at least one of a set of rendering latencies, a set of encoding latencies, or a set of network latencies for a split extended reality (XR) process with a client device;

output a first indication of at least one of the set of rendering latencies, the set of encoding latencies, or the set of network latencies for the split XR process with the client device;

calculate, based on the first indication, (1) a first offset between a first rendering start time and a first target wake time (TWT) start time for a first TWT configuration and (2) a set of second offsets between a set of second rendering start times and a set of second TWT start times for a second TWT configuration, wherein the first TWT configuration includes one TWT window and the second TWT configuration includes two TWT windows;

select, based on the calculation of the first offset and the set of second offsets, the first TWT configuration or the second TWT configuration for the split XR process with the client device; and output a second indication of the selection of the first TWT configuration or the second TWT configuration.

20. The apparatus of claim 19, wherein to calculate the first offset between the first rendering start time and the first TWT start time for the first TWT configuration, the at least one processor, individually or in any combination, is configured to: calculate a difference between the first rendering start time and the first TWT start time; and wherein to calculate the set of second offsets between the set of second rendering start times and the set of second TWT start times for the second TWT configuration, the at least one processor, individually or in any combination, is configured to: calculate a difference between an initial second rendering start time and an initial second TWT start time; and calculate a difference between at least one subsequent second rendering start time and at least one subsequent second TWT start time.

21. The apparatus of claim 20, wherein to calculate the set of second offsets between the set of second rendering start times and the set of second TWT start times for the second TWT configuration, the at least one processor, individually or in any combination, is configured to calculate a sum of the difference between the initial second rendering start time and the initial second TWT start time and the difference between the at least one subsequent second rendering start time and the at least one subsequent second TWT start time.

22. The apparatus of claim 19, wherein the at least one processor, individually or in any combination, is further configured to:

estimate, based on the calculation of the first offset and the set of second offsets, a first motion-to-render-to-photon (m2r2p) latency for the first TWT configuration and a second m2r2p latency for the second TWT configuration;

calculate a difference between the first m2r2p latency for the first TWT configuration and the second m2r2p latency for the second TWT configuration; and determine whether the difference is less than an m2r2p threshold.

23. The apparatus of claim 22, wherein to select the first TWT configuration or the second TWT configuration, the at least one processor, individually or in any combination, is configured to select the first TWT configuration or the second TWT configuration based on the determination of whether the difference is less than the m2r2p threshold; or wherein the m2r2p threshold is associated with a power level at the client device or a battery level at the client device.

24. The apparatus of claim 19, wherein the at least one processor, individually or in any combination, is further configured to:

estimate, based on the calculation of the first offset and the set of second offsets, a first server processing time for the first TWT configuration and a second server processing time for the second TWT configuration;

calculate a difference between the first server processing time for the first TWT configuration and the second server processing time for the second TWT configuration;

determine whether the difference is less than a server processing threshold;

wherein to select the first TWT configuration or the second TWT configuration, the at least one processor, individually or in any combination, is configured to select the first TWT configuration or the second TWT configuration based on the determination of whether the difference is less than the server processing threshold; or wherein the processing threshold is associated with a power level at the client device or a battery level at the client device.

25. The apparatus of claim 24, wherein the at least one processor, individually or in any combination, is further configured to:

adjust the server processing threshold if the power level at the client device is less than a power threshold or if the battery level at the client device is less than a battery threshold; and transmit, to the client device, an indication of the adjusted server processing threshold if the power level at the client device is less than the power threshold or if the battery level at the client device is less than the battery threshold.

26. The apparatus of claim 19, wherein the at least one processor, individually or in any combination, is further configured to:

communicate, with the client device via the split XR process, based on the selection of the first TWT configuration or the second TWT configuration.

27. The apparatus of claim 19, wherein to output the first indication of at least one of the set of rendering latencies, the set of encoding latencies, or the set of network latencies, the at least one processor, individually or in any combination, is configured to transmit, to the client device or at least one compute device, the first indication of at least one of the set of rendering latencies, the set of encoding latencies, or the set of network latencies;

wherein the split XR process includes at least one of (1) a split XR pipeline between the client device and the server or (2) at least one split XR application running on the client device; or wherein the set of rendering latencies is a set of rendering statistics associated with latencies for the split XR process with the server, wherein the set of encoding latencies is a set of encoding statistics associated with the latencies for the split XR process with the server, and wherein the set of network latencies is a set of network statistics associated with the latencies for the split XR process with the client device.

28. The apparatus of claim 19, further comprising at least one of an antenna or a transceiver coupled to the at least one processor, wherein to output the second indication of the selection of the first TWT configuration or the second TWT configuration, the at least one processor, individually or in any combination, is configured to:

transmit, to a modem at the client device via at least one of the antenna or the transceiver, the second indication of the selection of the first TWT configuration or the second TWT configuration; or store, in a modem at the server, the second indication of the selection of the first TWT configuration or the second TWT configuration.

29. A method of display processing at a client device, comprising:

obtaining a first indication of at least one of a set of rendering latencies, a set of encoding latencies, or a set of network latencies for a split extended reality (XR) process with a server;

calculating, based on the first indication, (1) a first offset between a first rendering start time and a first target wake time (TWT) start time for a first TWT configuration and (2) a set of second offsets between a set of second rendering start times and a set of second TWT start times for a second TWT configuration, wherein the first TWT configuration includes one TWT window and the second TWT configuration includes two TWT windows;

selecting, based on the calculation of the first offset and the set of second offsets, the first TWT configuration or the second TWT configuration for the split XR process with the server; and outputting a second indication of the selection of the first TWT configuration or the second TWT configuration.

30. A method of display processing at a server, comprising:

computing at least one of a set of rendering latencies, a set of encoding latencies, or a set of network latencies for a split extended reality (XR) process with a client device;

outputting a first indication of at least one of the set of rendering latencies, the set of encoding latencies, or the set of network latencies for the split XR process with the client device;

calculating, based on the first indication, (1) a first offset between a first rendering start time and a first target wake time (TWT) start time for a first TWT configuration and (2) a set of second offsets between a set of second rendering start times and a set of second TWT start times for a second TWT configuration, wherein the first TWT configuration includes one TWT window and the second TWT configuration includes two TWT windows;

selecting, based on the calculation of the first offset and the set of second offsets, the first TWT configuration or the second TWT configuration for the split XR process with the client device; and outputting a second indication of the selection of the first TWT configuration or the second TWT configuration.

* * * * *